United States Patent [19]
Huang et al.

[11] Patent Number: 5,966,714
[45] Date of Patent: *Oct. 12, 1999

[54] METHOD AND APPARATUS FOR SCALING LARGE ELECTRONIC MAIL DATABASES FOR DEVICES WITH LIMITED STORAGE

[75] Inventors: Chu-Yi Huang, Beaverton; David A. Romrell; Michael Man-Hak Tso, both of Hillsboro, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/640,334

[22] Filed: Apr. 30, 1996

Related U.S. Application Data

[63] Continuation-in-part of application No. 08/431,500, Apr. 28, 1995, Pat. No. 5,706,509.

[51] Int. Cl.⁶ ..................................................... G06F 17/30
[52] U.S. Cl. ................... 707/201; 707/200; 395/182.18; 395/670; 395/676; 395/680
[58] Field of Search ............................. 395/617, 182.18, 395/670, 676, 680; 364/200; 707/200, 201

[56] References Cited

U.S. PATENT DOCUMENTS

| | | | |
|---|---|---|---|
| 4,875,159 | 10/1989 | Cary et al. | 364/200 |
| 5,377,354 | 12/1994 | Scannell et al. | 395/650 |
| 5,434,994 | 7/1995 | Shaheen et al. | 707/201 |
| 5,452,448 | 9/1995 | Sakuraba et al. | 707/201 |
| 5,469,503 | 11/1995 | Butensky et al. | 379/265 |
| 5,473,772 | 12/1995 | Halliwell et al. | 395/712 |
| 5,490,270 | 2/1996 | Devarakonda et al. | 707/201 |
| 5,592,664 | 1/1997 | Starkey | 395/617 |

OTHER PUBLICATIONS

Microsoft, "System Guide", pp. 228–250, Jan. 1985.

*Primary Examiner*—Anton Fetting
*Assistant Examiner*—Jean M. Corrielus
*Attorney, Agent, or Firm*—Blakely, Sokoloff, Taylor & Zafman

[57] ABSTRACT

A method and an apparatus for scaling E-mail (electronic mail) address book databases for devices with limited storage capacity and synchronization of a first set of mail with a second set of mail at the message/folder level. A memory contains a mail subsetter for automatically generating a default personal address book and a mail synchronizer for application independent E-mail synchronization. A pseudo unique identification is generated for each message or folder in the mail boxes to be synchronized. An event log is then generated for each mail box. The memory also has a Synchronization mechanism for making the first set of data and the second set of data equivalent by using the information in the Change List generated by the Change Detection Mechanism. A processor runs the mail synchronizer.

52 Claims, 50 Drawing Sheets

FIG.1d

PAB Example

| SrcID | Email Address | SrcID | Name | SrcID | Home Phone | Score | Mod. Time |
|---|---|---|---|---|---|---|---|
| 2 | jdoe@mycomp.com | 2 | Jon Doe | 3 | 514-555-9134 | 154 | Date & Time |
| 2 | asmith@mycomp.com | 2 | Allen Smith | 3 | 514-555-1234 | 132 | Date & Time |
| 2 | jlewis@mycomp.com | 2 | Jeff Lewis | 3 | 514-555-0542 | 120 | Date & Time |
| 2 | bivey@mycomp.com | 2 | Bill Ivey | 3 | 514-555-0133 | 83 | Date & Time |
| 2 | mellis@mycomp.com | 2 | Mike Ellis | 3 | 514-555-4376 | 72 | Date & Time |
| 2 | jcarter@mycomp.com | 2 | Jim Carter | 3 | 514-555-8327 | 43 | Date & Time |
| 4 | lrose@school.edu | 4 | Lucy Rose | 4 | 502-555-7372 | 21 | Date & Time |
| 1 | amies@newcomp.com | 1 | Andy Miles | 0 | <empty> | 8 | Date & Time |

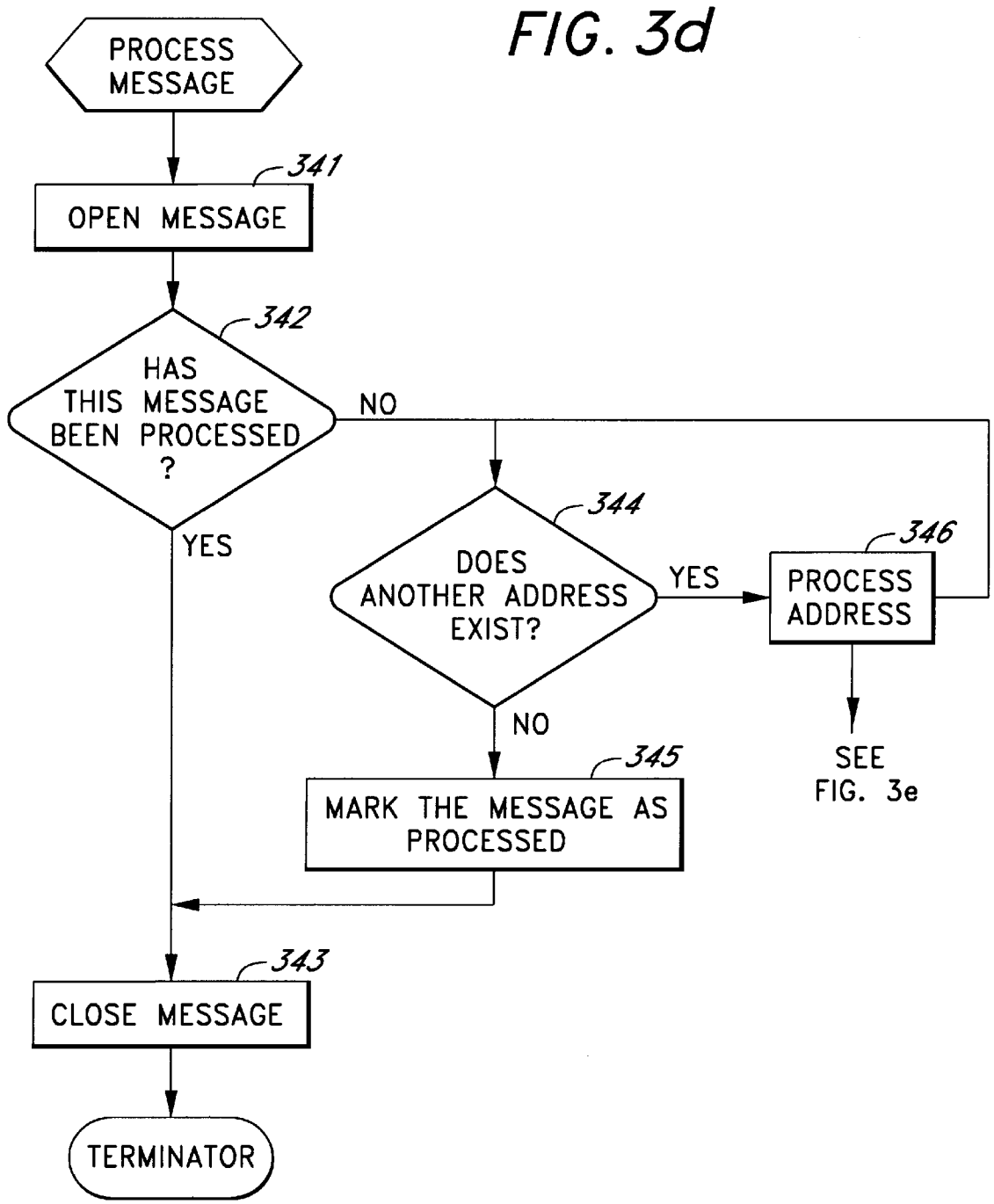

FIG. 4a

Source ID Table — 391

| Source ID | Meaning |
|---|---|
| 0 | Empty Field |
| 1 | Manual Entry |
| 2 | MAB=VIM, m:\ccmail\database |
| 3 | PIM=ECCO, c:\ecco\myfile.eco |
| 4 | CONTACT DATABASE=ACT, c:\act\contacts |

FIG. 4b

Change List Example For DAB — 392

| Email Address | Command | Time Stamp | Data |
|---|---|---|---|
| Jdoe@comp.com | Add | 9/19/95 13:32:33 | Name=Jone Doe, Phone=555-555-5555,... |
| Fsmith@comp.com | Add | 9/19/95 13:33:21 | Name=Fred Smith, Phone=555-55-6666,... |
| Jdoe@comp.com | Modify | 9/19/95 14:12:42 | Name=Jone Doe, Phone=555-666-6666,... |

FIG. 4c

Change List for DABI

| ADDR | COMMAND | TIME STAMP | DATA |
|------|---------|------------|------|
| Sally | Del | 13:40 | Name, Phone,...... |
| Mike | Add | 13:50 | Name, Phone,...... |
| Dan | Modify | 15:00 | Name, Phone,...... |

FIG. 4d

Merged List (Sorted by time-then processed)

| SRC | ADDR | COMMAND | TIME STAMP | DATA |
|-----|------|---------|------------|------|
| DAB | JOE | ADD | 13:32 | Name, Phone,...... |
| DAB | F SMITH | ADD | 13:33 | Name, Phone,...... |
| DABI | SALLY | DEL | 13:40 | Name, Phone,...... |
| DABI | MIKE | ADD | 12:50 | Name, Phone,...... |
| DAB | JON DOE | MODIFY | 14:12 | Name, Phone,...... |
| DABI | DAVE | MODIFY | 15:00 | Name, Phone,...... |

| Rm | Updated | Rm' | |
|----|---------|-----|---|
| Rp | Deleted | | |
| Rt | Updated | Rt' | |
| | Created | Ru | |

250     251     252     253

CL0

| Rx | Updated | Rx' | |
|----|---------|-----|---|
| Rz | Deleted | | |
| | Created | Ry | |
| | Received | Rz | |

| Case # | MBO Change | MB1 Change | MBO Result | MB1 Result |
|---|---|---|---|---|
| 1 | Create R1 | No Change | R1+ | (R1+) |
| 2 | Modify R1->R1' | No Change | R1->R1' | (R1->R1') |
| 3 | Delete R1 | No Change | R1- | (R1-) |
| 4 | Modify Key R1->R1' | No Change | R1->R1' | (R1-, R1'+) |
| 5 | No Change | Create R1 | R1+ | R1+ |
| 6 | No Change | Modify R1->R1' | (R1->R1') | R1->R1' |
| 7 | No Change | Delete R1 | (R1-) | R1- |
| 8 | No Change | Modify Key R1->R1' | (R1->R1') | R1->R1' |
| 9 | Create R1 | Create R1 | R1+ | R1+ |
| 10 | Create R1 | Create R2 | R1+, (R1'+) | (R1+), R1'+ |
| 11 | Modify R1->R1' | Modify R1->R1' | R1->R1' | R1->R1' |
| 12 | Modify R1->R1' | Modify R1->R1'' | R1->R1', (R1''+) | R1->R1'', (R1'+) |
| 13 | Modify R1->R1' | Delete R1 | R1-, (R1'+) | (R1-), R2+ |
| 14 | Modify Key R1->R2 | Create R1 | R1-, R2+ | R1->R1', (R2+) |
| 15 | Modify Key R1->R2 | Modify R1->R1' | R1-, R2+, (R1'+) | R1->R1', (R2+) |
| 16 | Modify Key R1->R2 | Modify Key R1->R3 | R1-, R2+ | R1->R2 |
| 17 | Modify Key R1->R2 | Modify Key R1->R3 | R1-, R2+, (R3+) | R1->R3, (R2+) |
| 18 | Modify Key R1->R2 | Delete R1 | R1-, R2+ | R1-, (R2+) |
| 19 | Delete R1 | Modify R1->R1' | R1-, (R1'+) | R1->R1' |
| 20 | Delete R1 | Delete R1 | R1- | R1- |

| Case # | MBO Change | MB1 Change | MBO Result | MB1 Result |
|---|---|---|---|---|
| 21 | Create RR1 | No Change | RR1+ | RR1+ |
| 22 | Modify RR1->RR1' | No Change | RR1->RR1' | RR1->RR1' |
| 23 | Delete RR1 | No Change | RR1- | RR1- |
| 24 | Modify Key RR1->RR1' | No Change | RR1->RR1' | RR1-, RR1'+ |
| 25 | No Change | Create RR1 | RR1+ | RR1+ |
| 26 | No Change | Modify RR1->RR1' | RR1->RR1' | RR1->RR1' |
| 27 | No Change | Delete RR1 | RR1- | RR1- |
| 28 | No Change | Modify Key RR1->RR1' | RR1->RR1' | RR1->RR1' |
| 29 | Create RR1 | Create RR1 | RR1+ | RR1+ |
| 30 | Create RR1 | Create RR1' | RR1+, RR1'+ | RR1+, RR1'+ |
| 31 | Create RR1 | Modify RR2->RR2' | RR1+, RR2->RR2' | RR1+, RR2->RR2' |
| 32 | Create RR1 | Modify RR2->RR1 | RR2->RR1 | RR2->RR1 |
| 33 | Create RR1 | Modify Key RR1->RR3 | RR1+, RR2->R3 | RR1+, RR2->R3 |
| 34 | Create RR1 | Delete RR2 | RR1+, RR2- | RR1+, RR2- |
| 35 | Modify RR1->RR1' | Modify RR1->RR1" | RR1->RR1' | RR1->RR1", RR1'+ |
| 36 | Modify RR1->RR1' | Modify RR1->RR1' | RR1->RR1' | RR1->RR1' |
| 37 | Modify RR1->RR1' | Modify RR2->RR1 | RR1->RR1', RR2->RR1 | RR2->RR1', RR1'+ |
| 38 | Modify RR1->RR1' | Modify RR2->RR2' | RR1->RR1', RR2->RR2' | RR1->RR1', RR2->RR2' |
| 39 | Modify RR1->RR1' | Modify Key RR1->R3 | RR1->RR1' | RR1->R3, RR1'+ |
| 40 | Modify RR1->RR1' | Create RR1' | RR1->RR1' | RR1'+ |
| 41 | Modify RR1->RR1' | Create RR2 | RR1->RR1', RR2+ | RR1->RR1', RR2+ |
| 42 | Modify RR1->RR1' | Delete RR1 | RR1->RR1' | RR1->RR1' |
| 43 | Modify RR1->RR1' | Delete RR2 | RR1->RR1', RR2- | RR1->RR1', RR2- |
| 44 | Modify Key RR2->R3 | Create R3 | RR2, R3+ | R3+, RR2- |
| 45 | Modify Key RR2->R3 | Modify Key RR2->R3 | RR2->R3 | RR2->R3 |
| 46 | Modify Key RR2->R3 | Modify RR2->R4 | RR2-, R3+, R4+ | RR2->R4, R3+ |
| 47 | Modify Key RR2->R3 | Modify RR2->RR2' | RR2-, R3+, RR2'+ | RR2->RR2', R3+ |
| 48 | Modify Key RR2->R3 | Delete RR2 | RR2-, R3+ | R3+ |
| 49 | Delete RR1 | Create RR2 | RR2+ | RR1-, RR2+ |
| 50 | Delete RR1 | Modify RR1->RR1' | RR1-, RR1'+ | RR1->RR1' |
| 51 | Delete RR1 | Modify Key RR1->R3 | RR1-, R3+ | RR1->R3 |
| 52 | Delete RR1 | Delete RR1 | RR1- | RR1- |
| 53 | Delete RR1 | Delete RR2 | RR1-, RR2- | RR1-, RR2- |

METHOD AND APPARATUS FOR SCALING LARGE ELECTRONIC MAIL DATABASES FOR DEVICES WITH LIMITED STORAGE

This application is a Continuation-In-Part of application Ser. No. 08/431,500 entitled APPLICATION INDEPENDENT RECORD LEVEL SYNCHRONIZATION filed Apr. 28, 1995, now U.S. Pat. No. 5,706,509.

BACKGROUND OF THE INVENTION

1. Field of the Invention

The invention relates to E-mail (electronic mail) systems. More particularly, the present invention is related to the method and apparatus for scaling E-mail address book databases for devices with limited storage capacity.

2. Background

E-mail (electronic mail) is one of the most popular data use application for data and voice telephones, in particular, for cellular telephones. However, telephones are typically limited in storage capacity. An average advanced cellular phone (such as a SmartPhone) being designed has less than one mega byte (MB) of storage available for use by a user. In contrast, a typical electronic address database using corporate environments are very large.

Given the storage constraints of devices such as a SmartPhone and the desirability for access to a large electronic address database, it is desirable to have some type of a default personal address book. Currently, there are a couple of E-mail systems which may be used to offer some type of method for generating a default personal address book. However, neither of the systems are easy to use. For example, cc: Mail Mobile System from Lotus Development Corporation and cc: Mail Remote System from Lotus Development Corporation duplicate the address database (generally several mega-bytes in size) on a notebook PC (Personal Computer), or require the user to generate their own address book there is no subsetting offered by the systems. Additionally the E-mail systems do not work with devices with limited storage such as is found in SmartPhones.

MS Mail system from Microsoft allows subsetting using personal address books, however, with this method and apparatus, the user must manually select and move entries in the network database to his or her personal address book. Additionally, the method and apparatus clearly does not scale to large databases such as for corporations, where there may be a large number of employees. More specifically, manually finding, selecting and moving, for example one hundred people regularly from a large list of employees is not only inefficient and slow but ultimately unusable in a corporate or large organizational environment, e.g. with tens of thousands of employees.

Additionally, MS Mail does not provide synchronization for the personal address book and the network database. For example, if John Doe is in both a user's personal address book and in a network database and if John Doe's name is deleted from the network database, his name will remain in the user's personal address book. Hence, the user will not know that John Doe is no longer available until a mail is transmitted to him and the mail is returned as "undeliverable" or "user unknown".

CC: Mail from Lotus Development Corporation provides synchronization but it is very inefficient. Synchronization is performed on-line with CC: Mail, i.e. when a user is connected and requires that the entire database be reconciled. Exemplary circumstances requiring reconciliation include when new records are added such as for new employees, when records have been deleted such as to account for employee attrition, and when updates are made such as for changed telephone numbers. Scanning a large database for change takes tens of minutes and since synchronization must be performed periodically, use of CC: Mail Remote or Mobile in a large organizational environment becomes impractical.

Therefore it is desirable to have a method and an apparatus for scaling E-mail address book databases for devices with limited storage capacity by providing an easy to use method for generating default personal address books automatically and to provide an efficient method for keeping the personal address books synchronized with a main database.

BRIEF SUMMARY OF THE INVENTION

A method and an apparatus for scaling E-mail (electronic mail) address book databases for devices with limited storage capacity and synchronization of a first set of mail with a second set of mail at the message/folder level. A memory contains a mail subsetter for automatically generating a default personal address book and a mail synchronizer for application independent E-mail synchronization. A pseudo unique identification is generated for each message or folder in the mail boxes to be synchronized. An event log is then generated for each mail box. The memory also has a Synchronization mechanism for making the first set of data and the second set of data equivalent by using the information in the Change List generated by the Change Detection Mechanism. A processor runs the mail synchronizer.

BRIEF DESCRIPTION OF THE DRAWINGS

FIG. 1d illustrates an exemplary personal address book.

FIG. 2b illustrates a block diagram of the identification (ID) generator illustrated in FIG. 2a.

FIG. 2c is a block diagram of event log generator 334 illustrated in FIG. 2a.

FIG. 3d describes the general steps followed in processing the message (step 338 in FIG. 3c).

FIG. 3i illustrates the general steps followed in processing changes in the mailbox (step 372 of FIG. 3h).

FIG. 4a illustrates an exemplary source ID table 410.

FIG. 4b illustrates an exemplary change list 420 for DAB 132.

FIG. 4c illustrates an exemplary change list for DABI 130.

FIG. 4d illustrates an exemplary merged list created by merging and sorting by time the change list for DAB illustrated in FIG. 4b and the change list for DABI illustrated in FIG. 4c.

FIG. 5b is a flow diagram illustrating the general steps followed by the apparatus illustrated in FIG. 5a.

FIG. 5c illustrates exemplary data structures for exemplary Change Lists CL0 and CL1.

FIG. 12 is a table illustrating the mail synchronization method of the present invention.

FIG. 13 is a table illustrating exemplary mail synchronization scenarios where there are messages/folders with the same Key Field values.

DETAILED DESCRIPTION OF THE INVENTION

The present invention provides a method and an apparatus for a storage efficient mechanism such that users can address E-mail off-line on their SmartPhones or Personal Digital Assistant's (PDA's), without devoting a large amount of storage space for a database or having to frequently consult a remote database for extra E-mail related information such as by looking up E-mail addresses on a network server. The method and the apparatus of the present invention involves automatically generating, storing and maintaining a subset of a large address book containing E-mail addresses locally on a client device with limited storage space such as a SmartPhone. The advantage of storing the E-mail addresses locally on the client device is that users can address and compose E-mail off-line. This reduces connection time and cost required to send messages. Periodically, the data in the personal address book is synchronized with data in a master address book. The present invention therefore provides an easy-to-use method for generating a default personal address book automatically and an efficient method for keeping a personal address book synchronized with a master database.

Figure 1A:
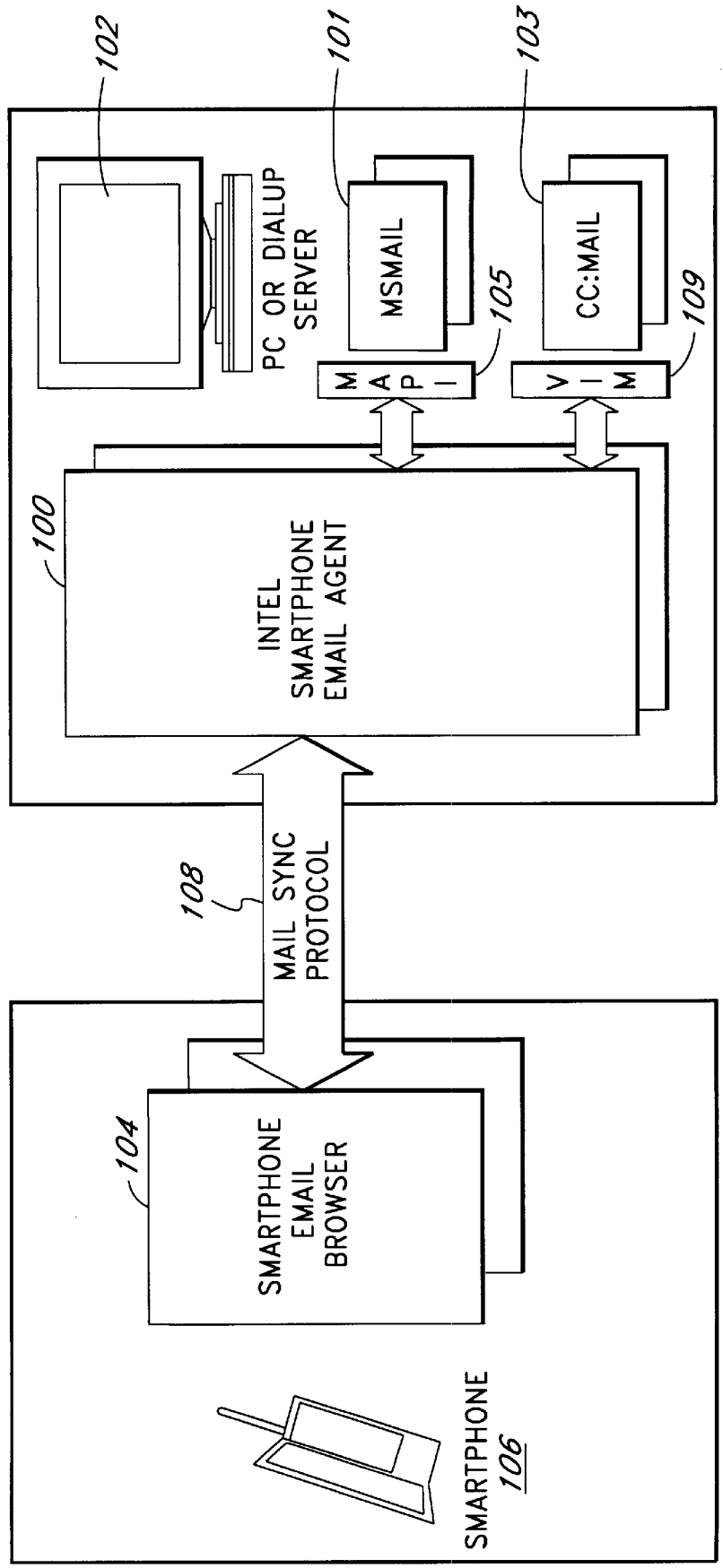
FIG. 1a illustrates the architecture of the present invention.

FIG. 1a is an exemplary system block diagram illustrating the method and apparatus of the present invention. The present invention stores a subset of a given large address book (also referred herein as a master address book) locally on a SmartPhone or any other client device such as a PDA (Personal Digital Assistant) to decrease connection time and enhance responsiveness to E-mail address requests.

E-mail agent 100 runs continuously on a user's PC (personal computer) or network server 102, periodically checking for new messages. Additionally, E-mail agent 100 takes appropriate actions such as to notify the user if a message is urgent. E-mail agent 100 is coupled to MAPI (Messaging Application Programming Interface) 105 which is a standard API (Application Programming Interface) for transferring and manipulating mail messages, MS Mail 101 which is an application used to access mail through MAPI (Mail Application Program Interface), VIM (Vendor Independent Messaging) 109 which is also a standard API for transferring and manipulating mail messages and cc: Mail 103 which is an application based on VIM for accessing mail. The system is designed so that other mail API's and applications can be supported.

E-mail client application 104 runs on client device 106 such as a SmartPhone and allows a user to compose messages, access his or her network E-mails and to manage message folders. Periodically, E-mail client application 104 and E-mail agent 100 connect through a telephone call (or through serial cable, LAN, etc.) to synchronize their states.

Figure 1B:
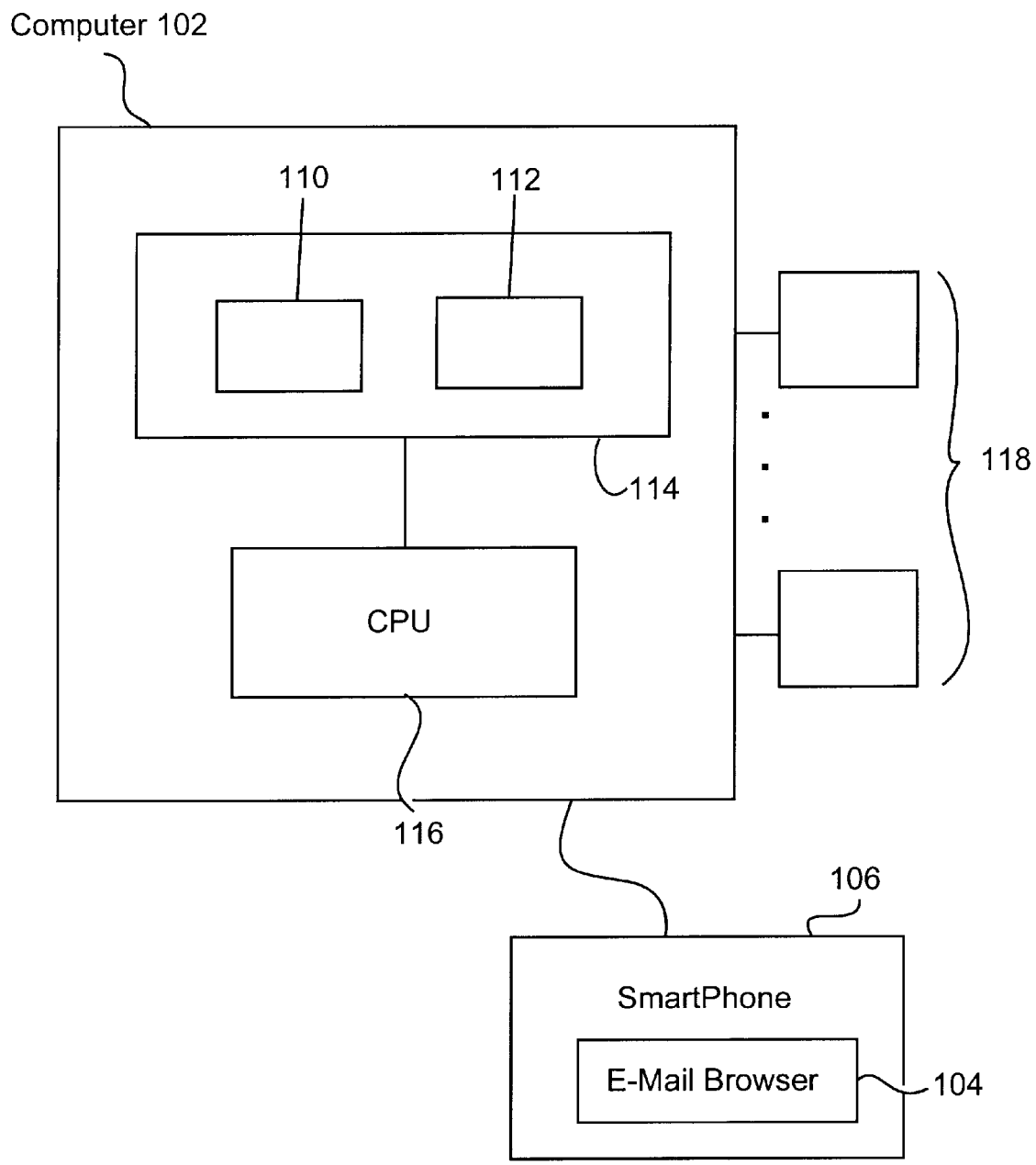
FIG. 1b illustrates an exemplary system block diagram with an implementation of the present invention.

FIG. 1b illustrates an exemplary system block diagram of the present invention. Computer 102 has memory 114 coupled to CPU 116. Memory 114 has mail synchronization 112 and various other elements 110 (also referred herein as subsetter 110) for subsetting a large E-mail address book to generate a smaller E-mail address book for client device 106. Further, computer 102 may have various peripheral devices 118 such as a keyboard and/or a display device. Computer 102 is also coupled to client device 118 as was illustrated in FIG. 1a.

Figure 1C:
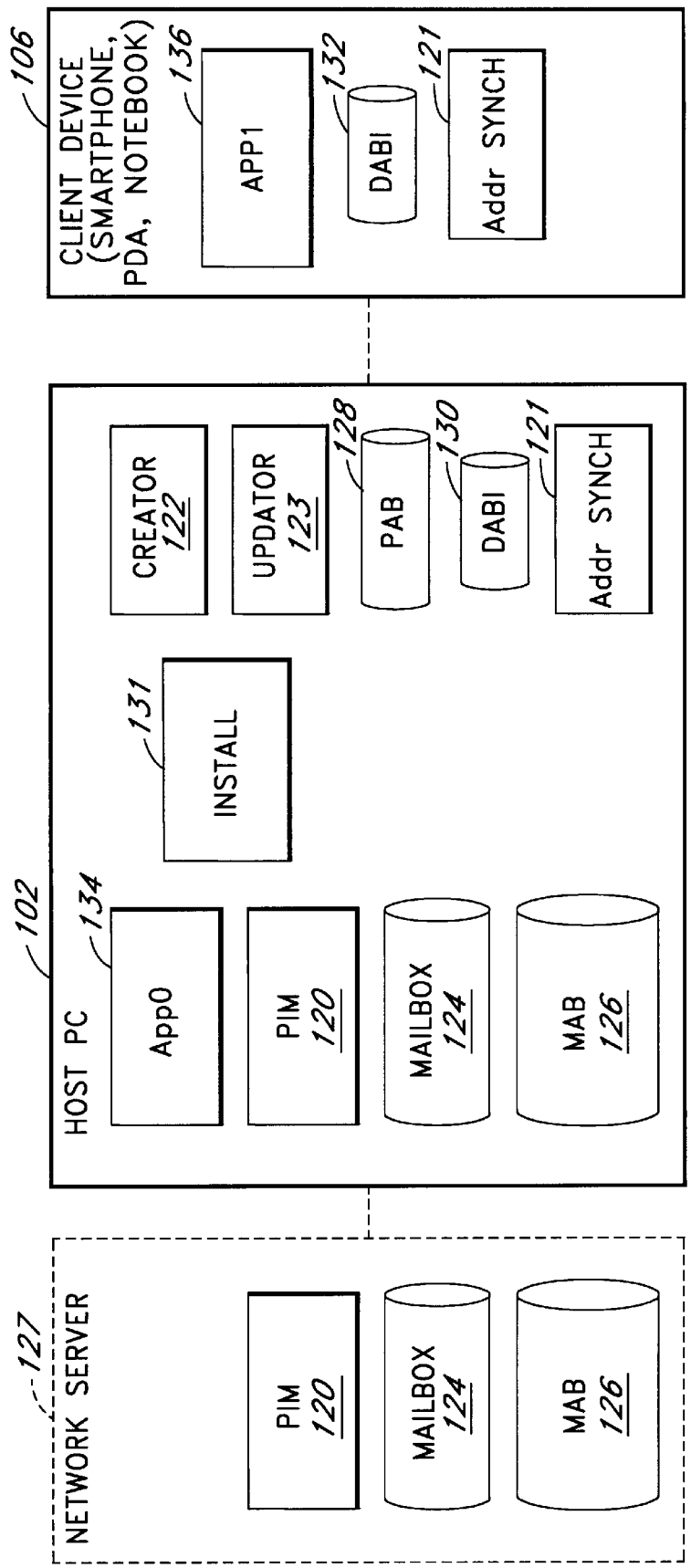
FIG. 1c illustrates an exemplary system block diagram of the present invention.

FIG 1c illustrates various components of the present invention residing on host device 102 and client device 106 respectively. Host device (desktop or server) 102 has PIM (Personal Information Manager) 120 which stores contact names and numbers (i.e. addressing information). Host PC 102 also has creator 122 for initial creation of personal address book (PAB) 128, updator 123 for maintaining changes to PAB 128 based on new messages and changes in the network databases, mailbox 124 for storing all received and sent mail messages and MAB (master address book) 126 for storing E-mail directory information. MAB 126 may be a corporate address book if a user is on a LAN (local area network) or may be a personal "master address book" of a user if the user is at a stand alone PC. PAB (Personal Address Book) 128 in host device 102 is for storing addresses, names, numbers, etc., (i.e. addressing information). PAB 128 may be periodically updated for changes to its address entries. Source ID (identification) table 127 is a list of sources from which data for PAB 128 may be obtained. Sources of data for PAB 128 may be by user manual entry, from MAB 126, from PIM 120, etc. Each source is given a unique identifying number. Additionally, host device 102 also has DABI (Device Address Book Image) 130 which may be stored in PAB 128 and is equivalent to the size of the limited storage area of DAB (Device Address Book) 132 of client device 106.

More specifically, DABI 130 of host device 102 is a mirror image of DAB 132 of client device 106. In one embodiment of the present invention, DABI 130 is part of PAB 128 (i.e. a subset of PAB 128). In this embodiment, whenever PAB 128 is updated, DABI 130 is automatically updated as well. In another embodiment of the present invention, DABI 130 may be separate from PAB 128. In this alternate embodiment, DABI 130 may be updated according to the changes made to PAB 128. In both embodiments, whenever DABI 130 of host device 102 is updated, DABI 130 of host device 102 and DAB 132 of client device 106 are synchronized with each other using address synchronizer 121. During synchronization, if an address in DAB 132 of host device 102 is no longer in DABI 130 of client device 106, then the corresponding entry in DAB 132 is deleted. Otherwise, if an address in DAB 132 of host device 102 is in DABI 130 of client device 106, then the entire corresponding entry in DAB 132 is replaced with the corresponding updated entry in DABI 130.

Client device 106 may be various remote client devices such as a SmartPhone, a PDA or a notebook PC. Both host PC 102 and client device 106 have an application (e.g. E-mail systems), app0 134 and app1 136 respectively, for which the subsetting and the synchronization of the address books are being performed.

PIM 120, Mailbox 124 and MAB 126 may reside on network server 127 instead of on host PC 102. More specifically, modules illustrated in host PC 102 may exist locally (on host PC 102) or remotely (on network server 127) and it is assumed that a network will take care of remote access if needed (i.e. for Mounting Network Volumes, Remote Procedure Calls, etc.). Such network implementation may be understood by a person skilled in the art given the detailed description of the present invention illustrated herein.

FIG. 1*d* illustrates an exemplary PAB 128 of the present invention. Each address entry 133 has various fields 135, source IDs 137 and address entry ranking score 139. The illustrated exemplary fields 135 are E-mail address field, name field and home phone field. Each field 135 has a corresponding source ID 137 which identifies what the source of the contents of field 135 is.

DABI 130 of host device 102 and DAB 132 of client device 132 are subsets of PAB 128 and are formatted similar to PAB 128 with various fields 135 associated with selected address entries 133.

With the present invention, it is assumed that a user of client and host device 106 and 102 is likely to want to communicate with those users with whom he or she has communicated with in the past. As part of installation module 131 for installing a client device E-mail host device connection (described in FIG. 1*e* and the accompanying description), all the E-mail messages in a given user's E-mail folders and archives are scanned and a list of E-mail addresses including mailing list names which are all the cohorts the user has corresponded with are compiled. The list also includes all the recipients copied on the messages.

The names and mailing lists of cohorts communicated with are then used to match against the names in MAB 126 of a E-mail system such as CC: Mail 103 or MS Mail 101. The matching address entries are then automatically pulled out to form PAB 128. Each matching address entry 133 in PAB 128 contains the same information as the corresponding MAB 126 entry, such as phone numbers, mail stops, etc. Additional information may also be retrieved from other applications (i.e. sources) which include address books, such as external contact databases or personal information managers (PIMs) 120. For non-matching entries' (cohorts that are not in MAB 126) additional information such as phone number, mail stop, etc. for fields 135, may be retrieved from other sources (e.g. a contact database or PIM 120). The user may also be prompted to manually add additional information that was not included in MAB 126, the contact database, or PIM 120.

Further, a user may optionally edit, add or delete address entries 133 from PAB 128 The user can also optionally specify PIM 120 to be used to import additional contact information for the records in MAB 126. PIM 120 is also used if there is no data in the corporate address book.

Since client device 106 such as SmartPhones have limited storage that may not be able to store the entire PAB 128, two capabilities are used to resolve this problem. First, only selected fields 135 of the additional information for address entries 135 are copied to DAB 132 of client device 106 from PAB 128 (i.e. DABI 130), minimizing the memory used by each address entry 133. Second, PAB 128 is maintained as a ranked list according to address ranking score 139, and only the highest ranked entries (most likely used) are copied into DAB 132 of client device 106.

To keep PAB 128 synchronized automatically, the present invention stores a duplicate of the user's PAB 128 on his or her PC 102 or network server 127. When a new E-mail is received, the present invention automatically checks if the sender and other users copied on the message are in the compiled PAB 128. If so, the present invention updates the priority listing by updating address ranking score 139. If not, the addresses are added to PAB 128 in the same manner as described above. Periodically, such as once a day, the present invention checks the PC copy of the user's PAB 128 against MAB 126.

Any entries including mailing lists which have been deleted from the network database (e.g. when a given user is no longer with the company) are deleted from the user's PAB 128. Any entries which have been changed such as when a user has a new phone number are updated. Likewise, changes in fields from contact databases or PIM's are also deleted and updated. The changes to the PAB are queued on PC 102 and periodically transmitted to client device 106 for updates. Since it is very time consuming to periodically check the PC copy of the user's PAB 128 against MAB 126 and to perform the deletion and updates, updates to PAB 128 may be performed when the user is not using his or her PC 102.

Additionally, a user may manually add additional information (i.e. contents of fields 135 of PAB 128) when new entries are added to PAB 128. Since the update is being performed as a background task (possibly on the server), the manually added fields 135 are left blank and a queue of address entries 133 needing information is kept so the user can later be notified and add the fields 135.

Occasionally, a user may need to address a person not in his or her PAB 128. In this case the user is given two options. The first option is to have E-mail client application 104 dial-up to connect to E-mail agent 100 and browse the entries stored in PAB 128, MAB 126, or PIM 120. The second option is to allow the user to manually type and use an address without searching any address books. The latter option is useful for new contacts that would not be in an address book.

Figure 1E:
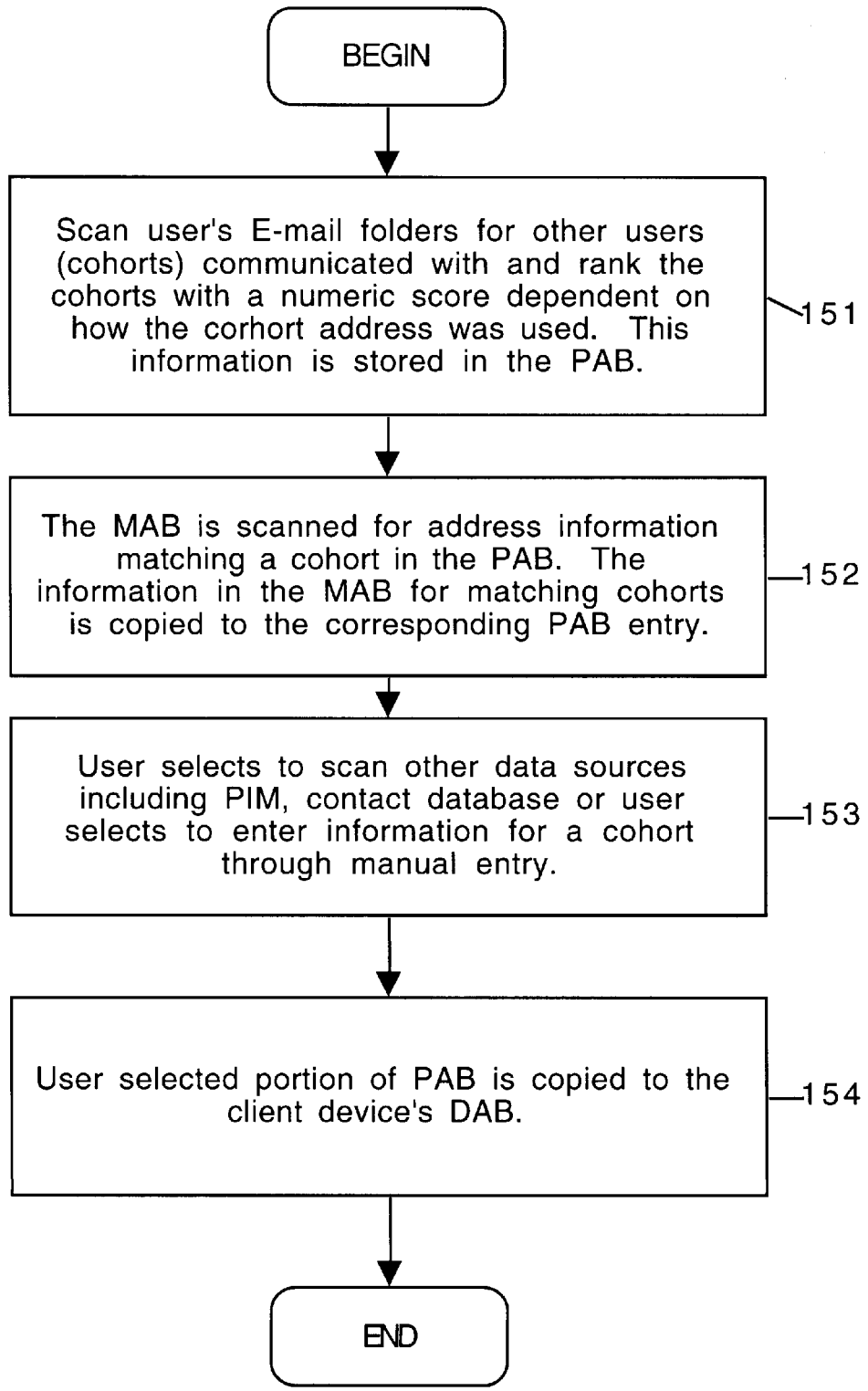
FIG. 1e illustrates the general steps followed in an exemplary installation procedure installing the present invention's client device address book (DAB).

FIG. 1e illustrates the general steps followed in an exemplary installation procedure installing the present invention's client device E mail host device connection. In step 151, a user's E-mail folders are scanned to find all the cohorts that have been communicated with. Each cohort is added to PAB 128 with a numeric score reflecting how the address was used (i.e. author of received message, destination of sent message, copied on sent message, etc.). If the cohort was already in the list, then the score is increased. The result is a ranked list of all cohorts communicated with in the form of address ranking score 139.

In step 152, MAB 126 is scanned. For illustration purposes, it is assumed that MAB 126 is a corporate E-mail directory. As entries are found that match the cohorts' addresses, additional information in the corporate E-mail directory is copied to PAB 128. For example, the full name of the address is copied, along with the employee ID, mail stop, department, and phone number. For those address entries not found in the corporate E-mail directory (for example, off-site E-mail cohorts and recent new hires), no additional information is added during this stage of the installation procedure.

In step 153, the user is given the option to include additional information that was not included in the corporate E-mail directory. If this option is selected, then the user is prompted for PIM 120, contact database, or manual entry as the source (or sources) of this additional information. Installation module 131 scans the known sources for the cohorts communicated with. For example, a user may select to find additional information from a PIM such as ECCO from NetManage or from manual entry if empty fields are found.

The additional fields selected in ECCO contain home phone numbers, cellular phone numbers and mail addresses. As entries are found in the ECCO database, they are also copied into PAB 128. Along with each file stored in PAB 128, there is a corresponding identifier 137 that indicates the source of the information contained in that field (MAB 126, PIM, Database, Manual Entry, etc.). The identifier is used later for synchronization of changes back to the source as will be described later. After scanning all known sources of additional information, there may still be empty fields. The user can optionally enter this information manually.

In step 154, installation module 131 copies a portion of PAB 128 (i.e. DABI 130) to client device 106. The result is DAB 132. First the user selects which fields of the PAB 128 should be included in DAB 132. For example, only the full name, work number, cellular number and home phone number fields of PAB 128 may be selected. Installation module 131 then computes how many entries can be copied onto DAB 132 of client device 106 and copies only these entries starting with the highest ranking entry.

FIGS. 2a through 2d, and 5 through 13 illustrate an exemplary method and apparatus for data synchronization which may be adapted for use in the present invention's address synchronization process. Given the detailed description disclosed herein, such implementation of the address synchronization process of the present invention may be readily understood by a person skilled in the art.

Figure 2A:
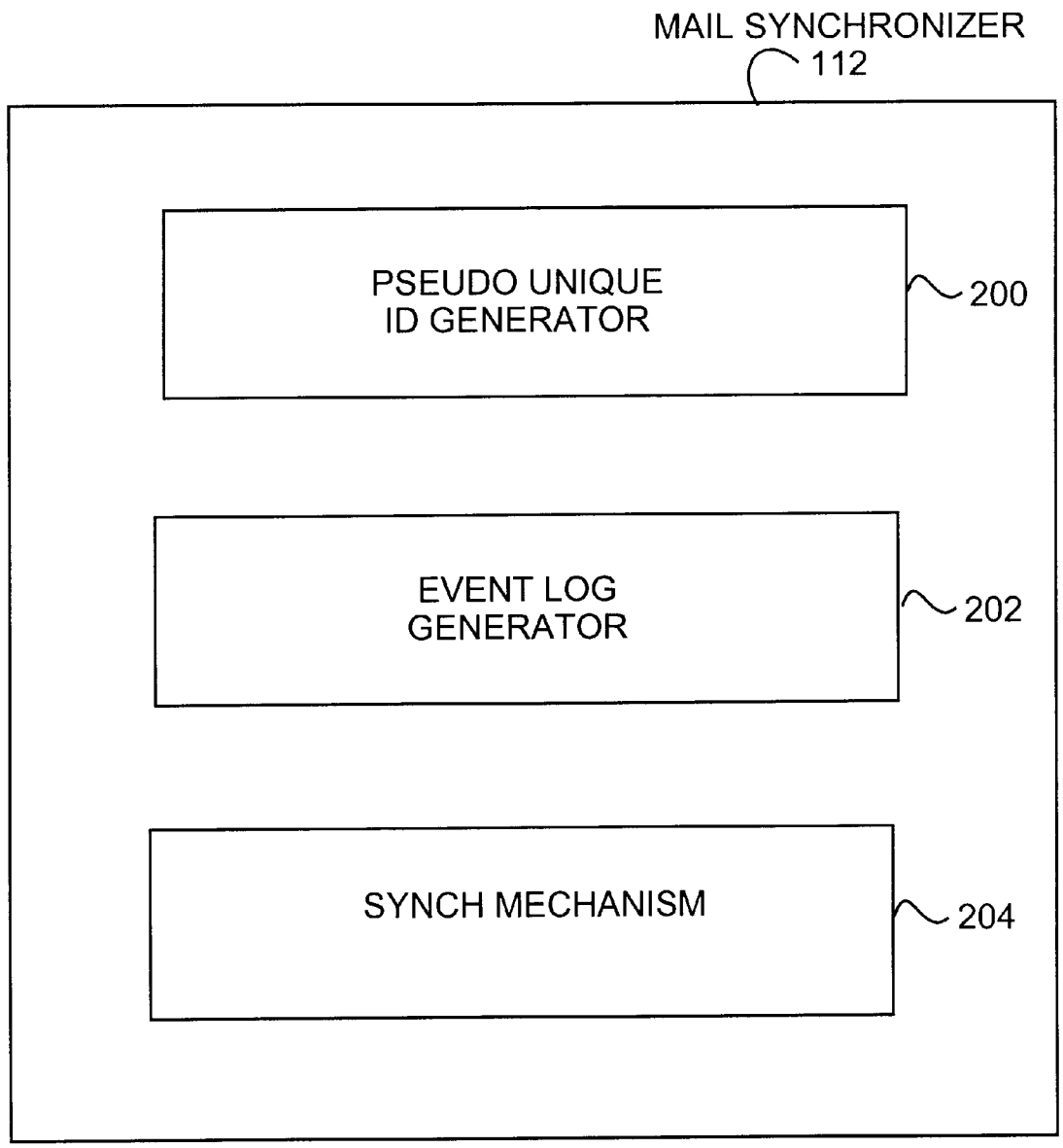
FIG. 2a illustrates an exemplary block diagram of the mail synchronizer of the present invention.

FIG. 2a is a block diagram illustrating a mail synchronizer. Mail synchronizer 112 synchronizes changes made independently on an e-mail system on two separate computers or two different e-mail systems on the same computer. Pseudo unique ID (identification) generator 200 generates a pseudo unique ID for each mail or folder in a mail box for an e-mail system. Event log generator 202 generates an event log by generating events for each ID (i.e. for each mail or folder). Synch mechanism 204 synchronizes the mail boxes using the generated event logs.

Figure 2B:
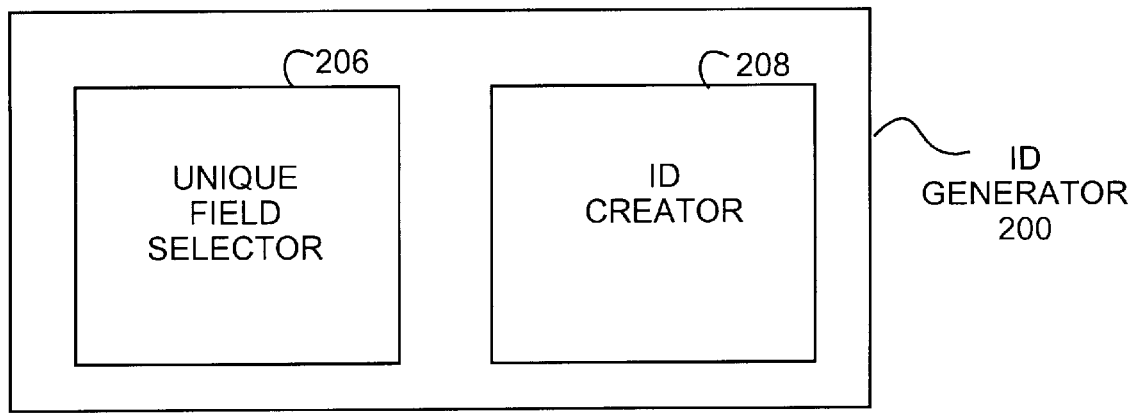

FIG. 2b illustrates a block diagram of the ID generator illustrated in FIG. 2a. ID generator 200 has unique attribute selector 206 and ID creator 208. Unique attribute selector 206 selects an attribute that is most likely to be unique given a mail or a folder. ID creator 208 generates an ID for each mail or folder in a mail box.

Figure 2C:
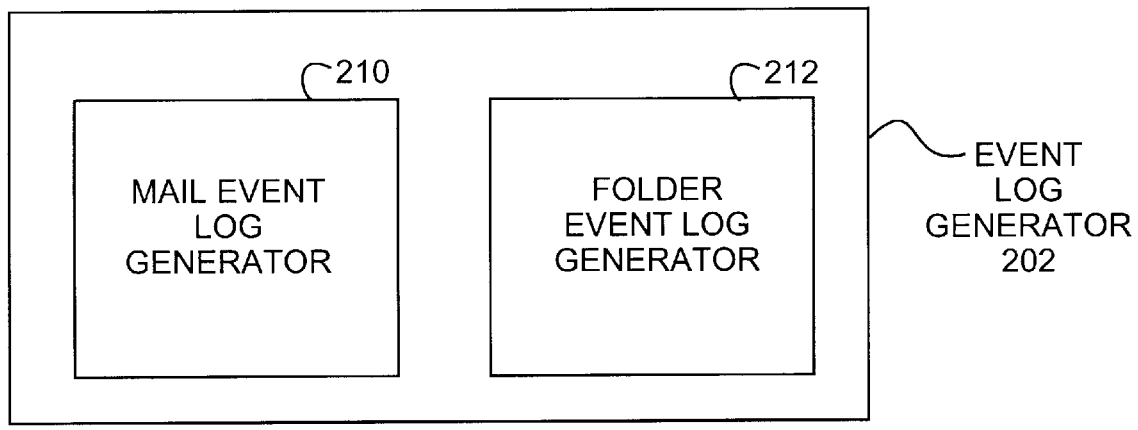

FIG. 2c is a block diagram of the event log generator illustrated in FIG. 2a. Event log generator 202 has mail event log generator 210 and folder event log generator 212. Mail event log generator 210 generates an event for the event log for each mail in mail boxes to be synchronized. Folder event log generator 212 generates an event for the event log for each folder in the mail boxes to be synchronized.

Figure 2D:
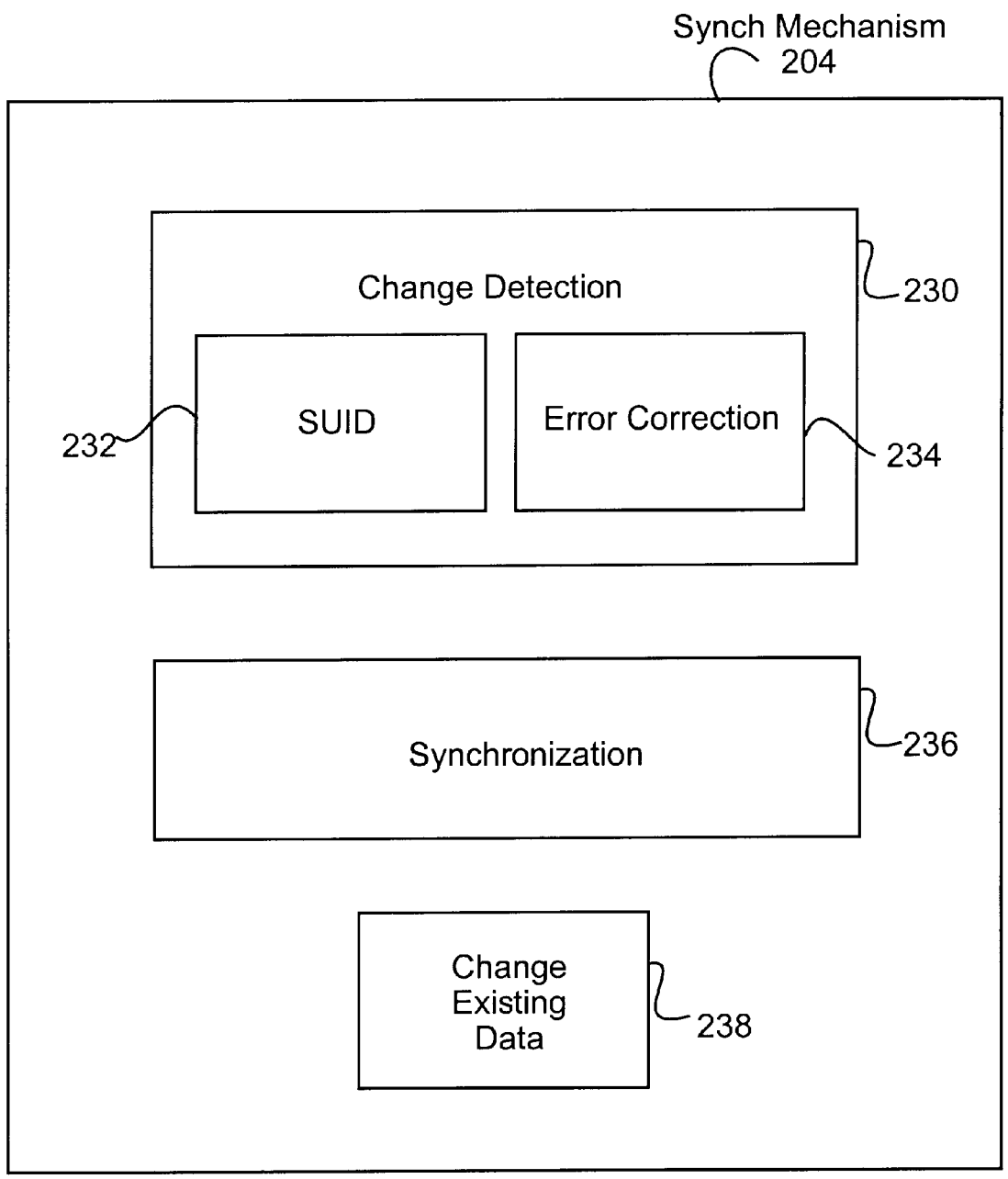
FIG. 2d is an exemplary block diagram of the synch mechanism of the present invention.

FIG. 2d is a block diagram of the synch mechanism of the present invention illustrated in FIG. 2a. Synch mechanism 204 has sub-parts, Change Detection mechanism 230, Error Detection mechanism 234, Change Existing Data mechanism 238 and Synchronization mechanism 236. Change Detection mechanism 230 detects the changes which have occurred to a given mail box since the last synchronization. Error Detection 234 identifies incorrect updates and creates performed by Change Detection mechanism 230. Error conditions triggering Error Detection 234 include when a record's Key Attribute has changed in MB0' and/or when more than one message/folder is sharing the same Key Attribute values (an example of a non-unique identifier case is described in more detail below). Synchronization mechanism 236, performs the synchronization of data sets, given information regarding the mail boxes produced by Change Detection mechanism 230. Change Existing Data 238 modifies existing data to make the mail boxes equivalent.

Figure 3A:
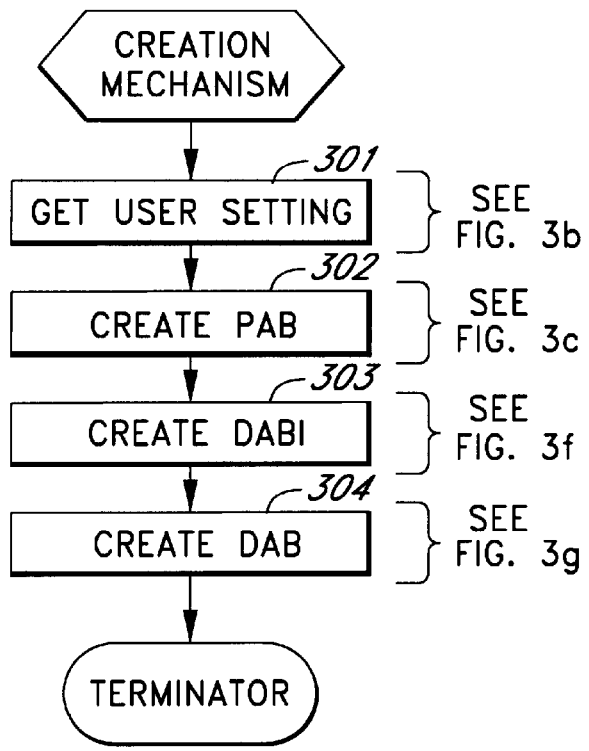
FIG. 3a illustrates the general steps followed by the creation mechanism (creator) 122 illustrated in FIG. 1c.
Figure 3B:
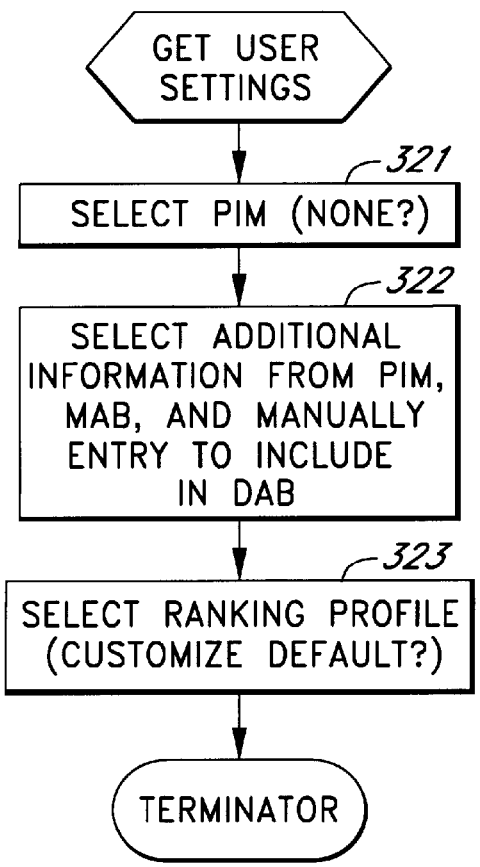
FIG. 3b illustrates general steps followed in obtaining user settings (step 301 of flow diagram in FIG. 3a).

FIG. 3a illustrates the general steps followed by the creation mechanism (creator) 122 illustrated in FIG. 1c. In step 301, user setting according to the general steps followed in FIG. 3b is obtained. (For a detailed description of the steps followed, turn to FIG. 3b and the accompanying description). In step 302, PAB (Personal Address Book) 128 is created following the general steps illustrated and described in FIG. 3c. In step 303, DABI (Device Address Book Image) 130 is created following the general steps illustrated in FIG. 3f. In step 304, DAB (Device Address Book) 132 is created following the general steps illustrated and described in FIG. 3g.

FIG. 3b illustrates the general steps followed in obtaining user settings (step 301 of flow diagram in FIG. 3a). In step 321, additional information sources are selected. The sources may include, but are not limited to, personal information managers, contact databases, or manual entry. In step 322, the user specifies what data fields are to be included in the device address book. The data fields are hereinafter referred to as "Additional Information" they are in addition to the required E-mail address field. A sample of what additional fields the user may select includes, but are not limited to, full name, work address, home address, work phone numbers, home phone number, cellular number, pager number, employee identification, birthday mail stop fields.

In step 323, the ranking profile is selected. The ranking profile consists of the score to be given to each entry depending on how an entry was used. For example, a cohort that is copied on a message may have a score of one, while a cohort that is a destination may have a score of three. A sample list of scored characteristics include, but are not limited to, the "TO" address of an authored message, the "TO" address of a received message, the "CC" (carbon copied) address of an authored message, the "CC" address of a received message, the "BCC" (blind carbon copied) address on an authored message, the "AUTHOR" address of a received mail. The score can also be adjusted based on other message characteristics including, the size of the message, the urgency of the message, text within the message ("FYI:", "RE:", "FWD:", etc.), and other such characteristics. The score may also be affected by how long ago the address was used. For example, the score might be decreased by a multiple of the age of the message. A cohort that has not been communicated with for a month may have a score decreased by thirty, while a cohort that received communication yesterday would only be decreased by one. This would allow the ranked list to keep those who are most recently corresponded with in the top of the list. The user may also have the advanced option to customize this ranking profile and the score associated with each characteristic.

Figure 3C:
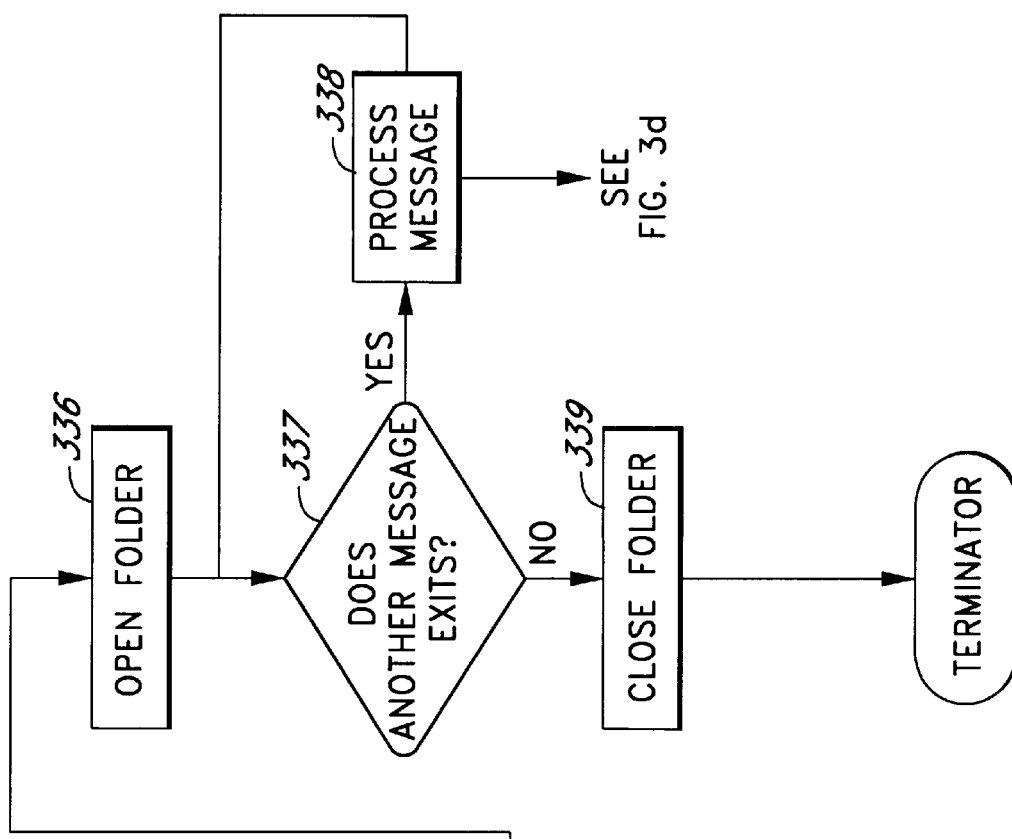
FIG. 3c illustrates the general steps followed including a personal address book (PAB) (step 302 illustrated in flow diagram FIG. 3a).
Figure 3C:
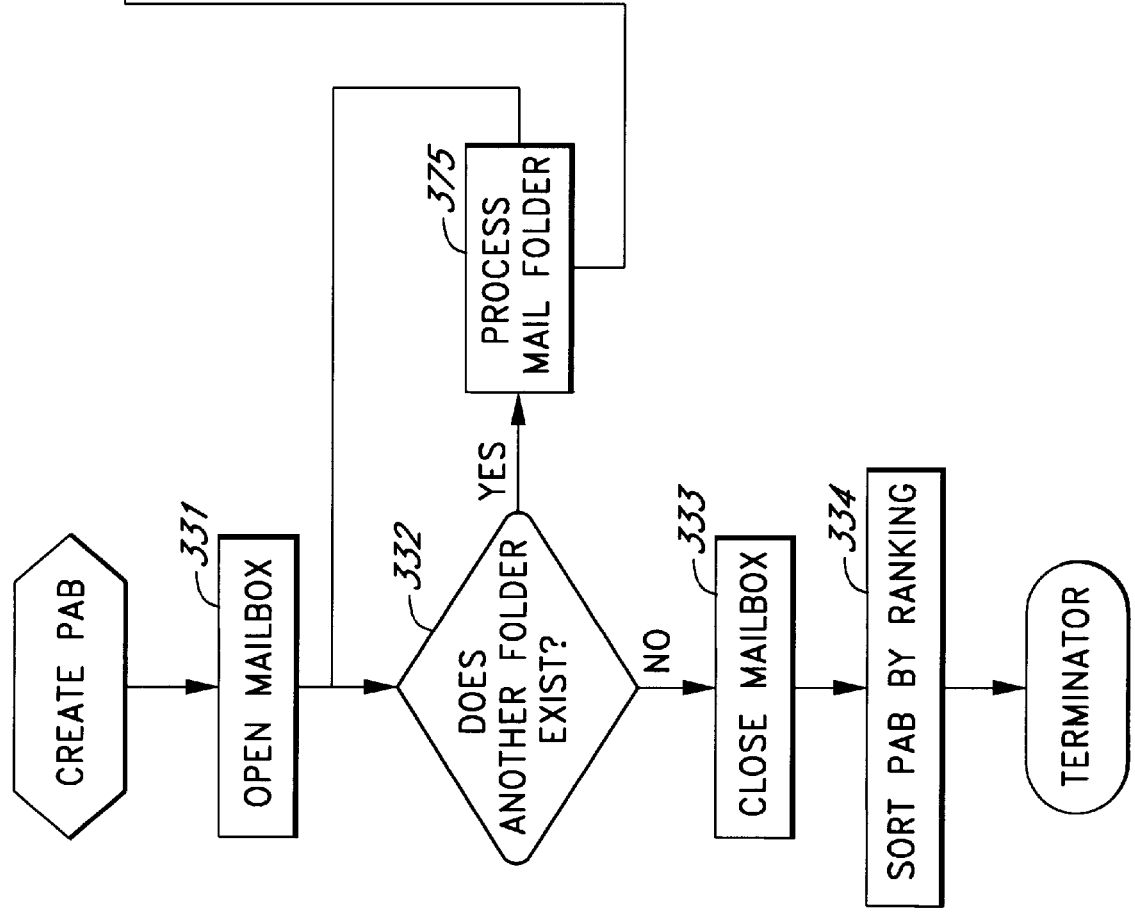

FIG. 3c illustrates the general steps followed to create PAB 128 (step 302 illustrated in flow diagram FIG. 3a). In step 331, a mailbox is opened. In step 332, it is determined whether or not another folder exists. If another folder does not exist, then in step 333, the mailbox is closed. In step 334, PAB 128 is sorted by ranking. If there is another folder, then in step 335, the mail folder is processed. In step 336, the folder is opened. In step 337, it is determined whether there is another message. If there is no other message, then in step 339, the folder is closed. Otherwise if there is another message, then in step 338, the message is processed and the general steps are repeated.

FIG. 3d describes the general steps followed in processing a message (step 338 in FIG. 3c). In step 341, the message is opened. In step 342, it is determined whether the message has been processed. If the message has been processed, then in step 343, the message is closed. Otherwise, if the message has not been processed, then in step 344, it is determined whether or not another address for the message exists. If there are no other addresses for the message, then in step 345, the message is marked as processed and in step 343, the message is closed. Otherwise, if there is another address, then in step 346, the address is processed.

Figure 3E:
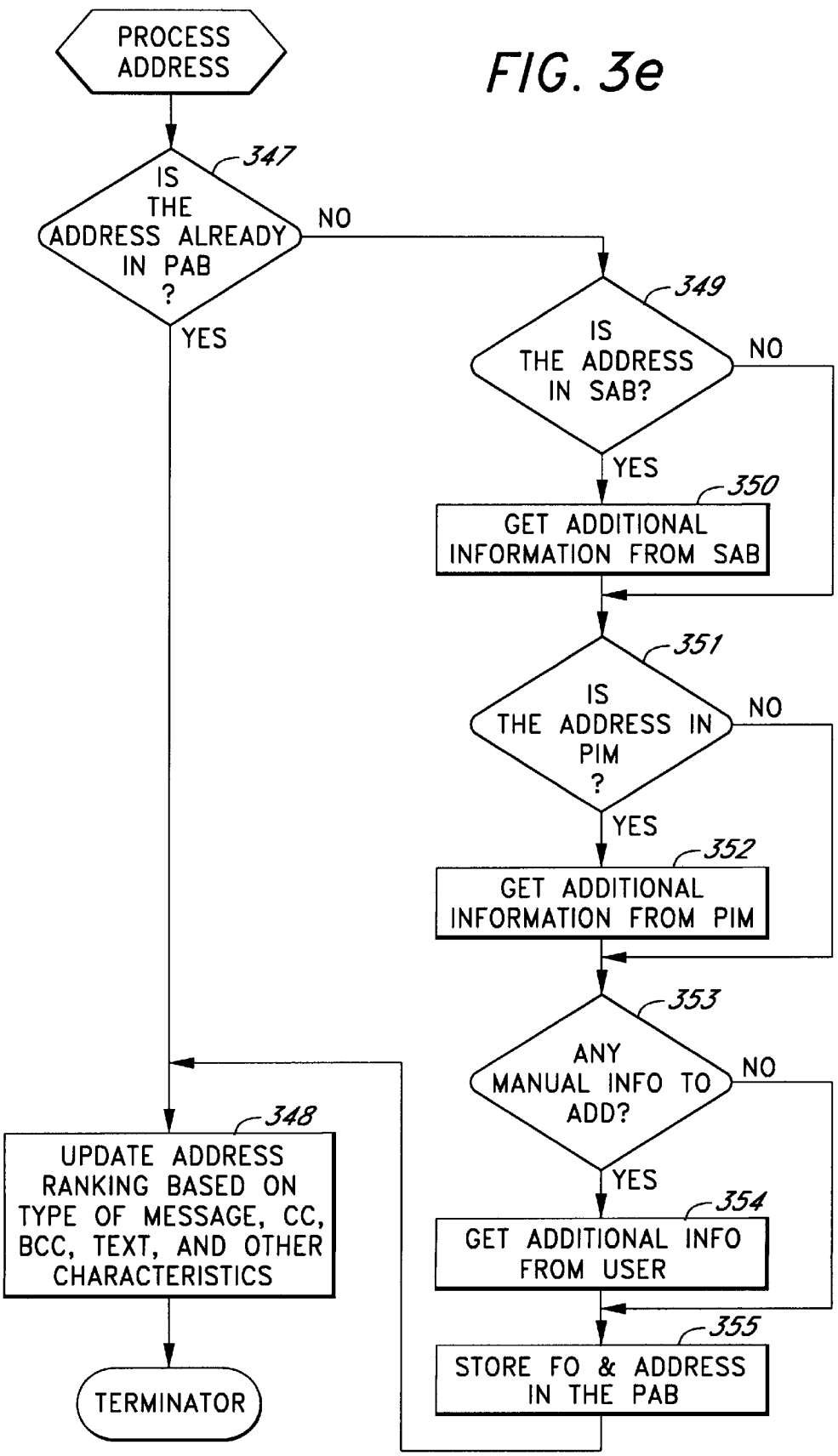
FIG. 3e describes the general steps by which an address is processed (step 346 of flow diagram illustrated in FIG. 3d).

FIG. 3e describes the general steps by which an address is processed (step 346 of flow diagram illustrated in FIG. 3d). In step 347, it is determined whether there is an address already in PAB 128 for the message. If there is already an address for the message in the PAB 128, then in step 348, the address ranking is updated based upon the type of address, ("TO", "CC", "BCC", "AUTHOR", etc.) and the other characteristics of the message (size, urgency, text included, etc.). Otherwise, if the address is not already in PAB 128, then in step 349, it is determined whether or not the address is in MAB 126. If the address is in MAB 126, then in step 350, additional information is obtained from MAB 126 regarding the address.

In step 351, it is determined whether or not the address is in an additional information source (PIM, contact database, etc.). If the address of the message is in an additional data source, then in step 352, additional information regarding the address is obtained from the additional source. In step 353, if there is any manual information (i.e. input from user) to be added regarding the address, then in step 354, additional information is obtained from the user.

In step 355, the information for the address is stored in PAB 128 along with the information source ID. (Turn to FIG. 1d for example 390 of PAB 128). The information source ID will be used later to identify the source of the data in the corresponding field. The information source ID is needed so that if the user changes the field in the SmartPhone, the changes can be propagated back into the PAB 128 and into the original data source. The source ID is also used by the updator to identify which data source should be checked for changes. The source ID may be stored as a simple numeric that is assigned to the corresponding source. (Turn to FIG. 4a for example 391 of a source ID table). For example, an ID of zero may indicate an empty field, an ID of one may indicate MAB 126, an ID of two may indicate an ECCO PIM, an ID of three may indicate manual entry. The address ranking is updated based on the type of address ("CC", "BCC", "AUTHOR", "TO", etc.) and other characteristics of the message (Urgency, size, text included, etc.).

The general process of checking mail messages for new addresses is continued until all messages in all folders have been processed.

Figure 3F:
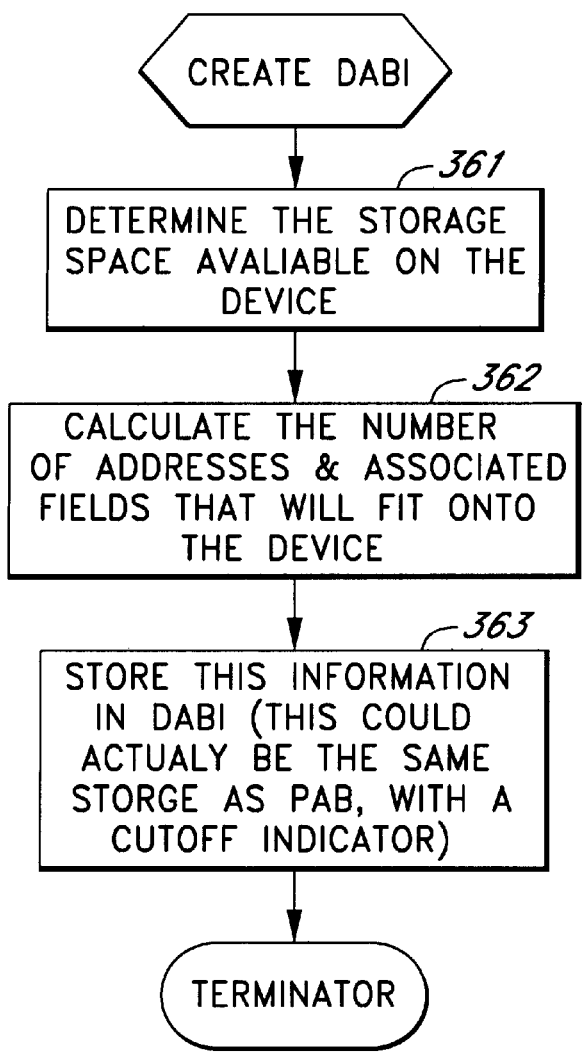
FIG. 3f illustrates the general steps followed including a device address book image (DABI) (step 303 of flow diagram illustrated in FIG. 3a).

FIG. 3f illustrates the general steps followed in creating DABI 130 (step 303 of flow diagram illustrated in FIG. 3a). Step 303 is performed when connected to client device 106 either by dialup, serial or LAN connection. Also, the following capabilities are available through the use of an API. In step 361, the storage space available on the device is determined. In step 362, the number of addresses and the associate fields that will fit onto the device is calculated. In step 363, the calculated information is then stored in DABI 130 (this storage may be the same storage as PAB 128 with indicators to identify which fields should be included in the device address book).

Figure 3G:
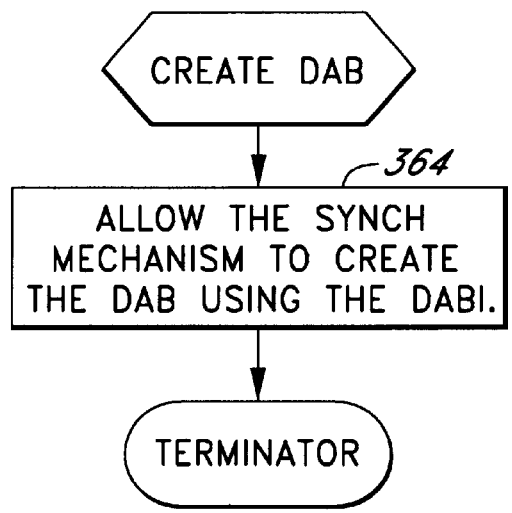
FIG. 3g illustrates general steps in creating a DAB (step 304 of flow diagram of FIG. 3a).

FIG. 3g illustrates general steps in creating DAB 132 (step 304 of flow diagram of FIG. 3a). In step 364, the address synchronizer mechanism 121 is allowed to create DAB 132 using DABI 130. The addresses and additional information that has been modified in DABI 132 are then recorded in a change list as additions, deletions or modifications. As this is the initial creation of DAB 132, the entire change list will contain only additions.

Address synchronizer mechanism 112 (also referred herein as mail synchronizer 112) processes change requests by creating a change list (see FIG. 4b for change list example 392). The change list consists of a list of E-mail addresses, commands, time stamp, and data. The E-mail address is used to uniquely identify the entry that will be changed. The command is used to identify if this is a deletion, addition, or modification. The time stamp is used to resolve synchronization conflicts. This occurs if changes are made on both the device and the desktop without synchronization between the changes. For example, if in the contact database someone changes Frank's mail address, and on the SmartPhone the user changes his phone number, both changes are processed. First, a modification that indicates the mail address is adjusted and then a modification that indicates that the phone number is adjusted are made. The end results is as though both changes occurred. However, it should be noted that if two changes are made to the same field, only the latter of the changes will be of effect.

The changes in the change list may be processed whenever a connection is made. Therefore if a user creates a dial-up connection to browse a large E-mail message, synchronization of DABI 132 with DAB 130 can occur. This synchronization can also be performed over serial or LAN connection. The user can therefore make adjustments on the phone and the changes to DAB 132 will be synchronized with PAB 128. More detail on synchronization can be gained by the descriptions accompanying FIGS. 5 through 13 and by referring to pending application 08/431,500 APPLICATION INDEPENDENT RECORD LEVEL SYNCHRONIZATION by one of the co-inventors of the present invention, Michael Man-Hak Tso, and assigned to the assignee of the present invention. Said application is hereby incorporated by reference.

Figure 3H:
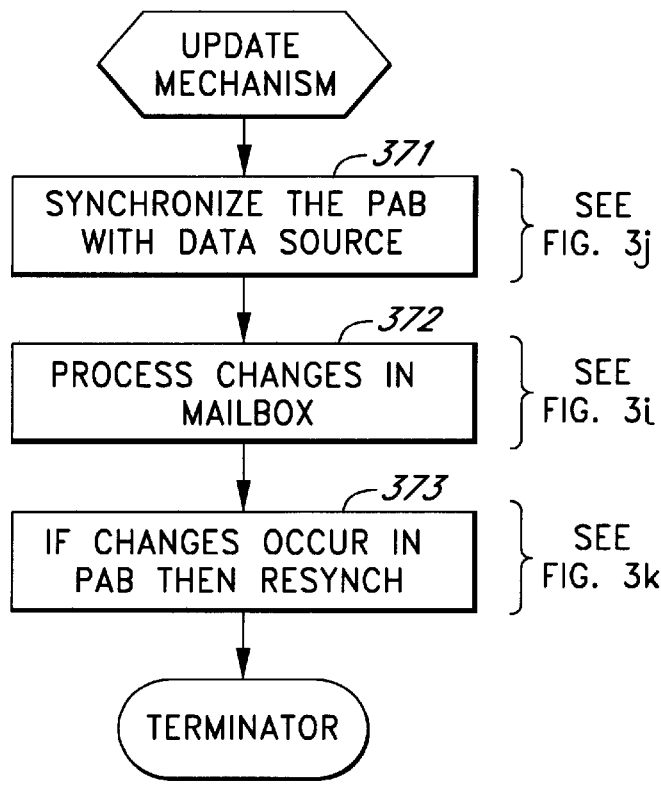
FIG. 3h describes the general steps followed by the update mechanism (updator 123 illustrated in FIG. 1c) of the present invention.

FIG. 3h describes the general steps followed by the update mechanism (updator 123 illustrated in FIG. 1c) of the present invention. In step 371, PAB 128 is synchronized with the MAB, PIM, contact database and other data sources indicated by the source ID table. A more detailed description of this step is illustrated in the flow diagram of FIG. 3j. In step 372, the changes in the mailbox is processed. A more detailed description of this step is illustrated in the flow diagram of FIG. 3i. In step 373, if changes occur in the PAB 128, then the re-synchronization is performed between the PAB 128, DABI 132 and DAB 130 as described earlier (i.e. a more detailed description of this step is illustrated in the flow diagram of FIG. 3j).

Figure 3I:
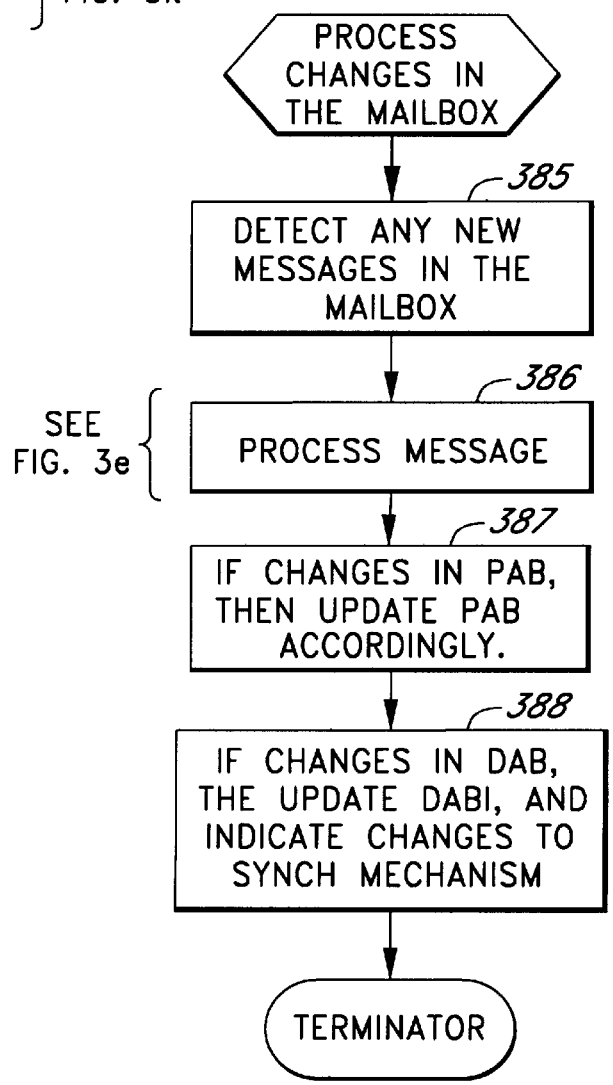
FIG. 3i illustrates the general steps followed in processing changes in the MAB (step 371 of FIG. 3h).

FIG. 3i illustrates the general steps followed in processing changes in the mailbox (step 372 of FIG. 3h). In step 385, new messages in the mailbox is detected. In step 386, the message is processed. The message is processed following the general steps which are illustrated for the flow diagram and the accompanying text for FIG. 3d and new addresses are added. In step 387, if there are changes in PAB 128, then PAB 128 is updated accordingly. In step 388, if there are changes in PAB 128, then DABI 132 is updated and the change is propagated to the DAB 130 through the use of the address synchronizer 112.

Figure 3J:
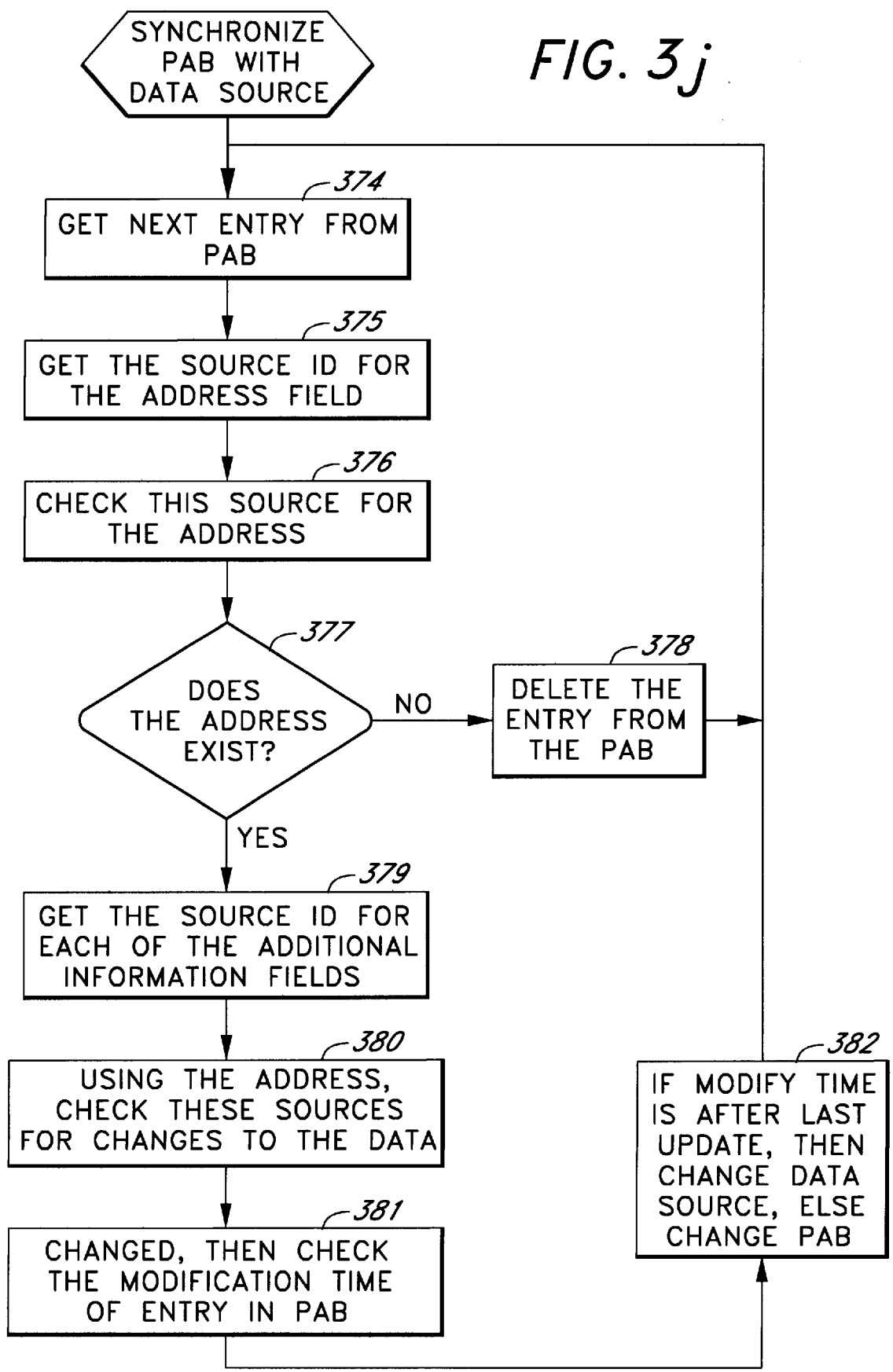
FIG. 3j illustrates the general steps followed in synchronizing PAB with the data source (step 373 of FIG. 3h).

FIG. 3j illustrates the general steps followed in synchronizing PAB 128 with a data source (where data source can be the source of data such as a PIM, a MAB, or manual entry by a user, etc.). An exemplary source ID table 391 illustrating exemplary source IDs and the corresponding data sources is illustrated in FIG. 4a. The general steps illustrated here are a continuation from step 373 of FIG. 3h. In step 374, the next entry from PAB 128 is retrieved. In step 375, the source ID for the address field of the entry retrieved is obtained. The PAB example 390 of FIG. 1d illustrates exemplary fields which may be associated with each entry in PAB 128 and the corresponding source ID. In step 376, the data source identified by the source ID retrieved is checked for the address.

In step 377, if the address no longer exists in the data source, then in step 378, the entry is deleted from PAB 128. (i.e. entry may no longer be valid because the user associated with the particular address is for example no longer with the company associated with the data source or the user has a new address, etc.) Otherwise, if the address is in the data source, then in step 379, the data source ID for each of the additional information fields are retrieved. (i.e. if the address listed in the PAB for that entry is also listed in the corresponding data source, then the user associated with the address is assumed to still be with the company/organization associated with the data source and it is concluded that the address is valid.) In step 380, the address used to retrieve the source ID is used to access entries in the source. The entries in the data sources are checked for changes to the data (i.e. if there are discrepancies between the data in the fields of PAB 128 and the corresponding data in the data source). In step 381, if there are changes to the data in the data sources, then updates are made to PAB 128 or the data source. In step 382, the choice of changing the PAB entry or the data source is made by using a modification time stamp on the PAB entry. If PAB 139 has been modified since the last update with data source, then the data source is updated similar to the PAB entry. Back in step 374, the next entry from PAB 128 is retrieved in order to synchronize PAB 128 entries with the data source. As described earlier, in one implementation of the present invention, DABI 130 is a subset of PAB 128 (i.e. part of PAB 128), in which case updating of PAB 128 is equivalent to updating DABI 130. DAB 132 on a client device such as SmartPhone 102 is then synchronized with DABI 130 using address synchronizer 121. In an alternate embodiment, DABI 130 is separate from PAB 128. In this case, once PAB 128 is updated using the data sources as described above, DABI 130 is updated using PAB 128.

Figure 3K:
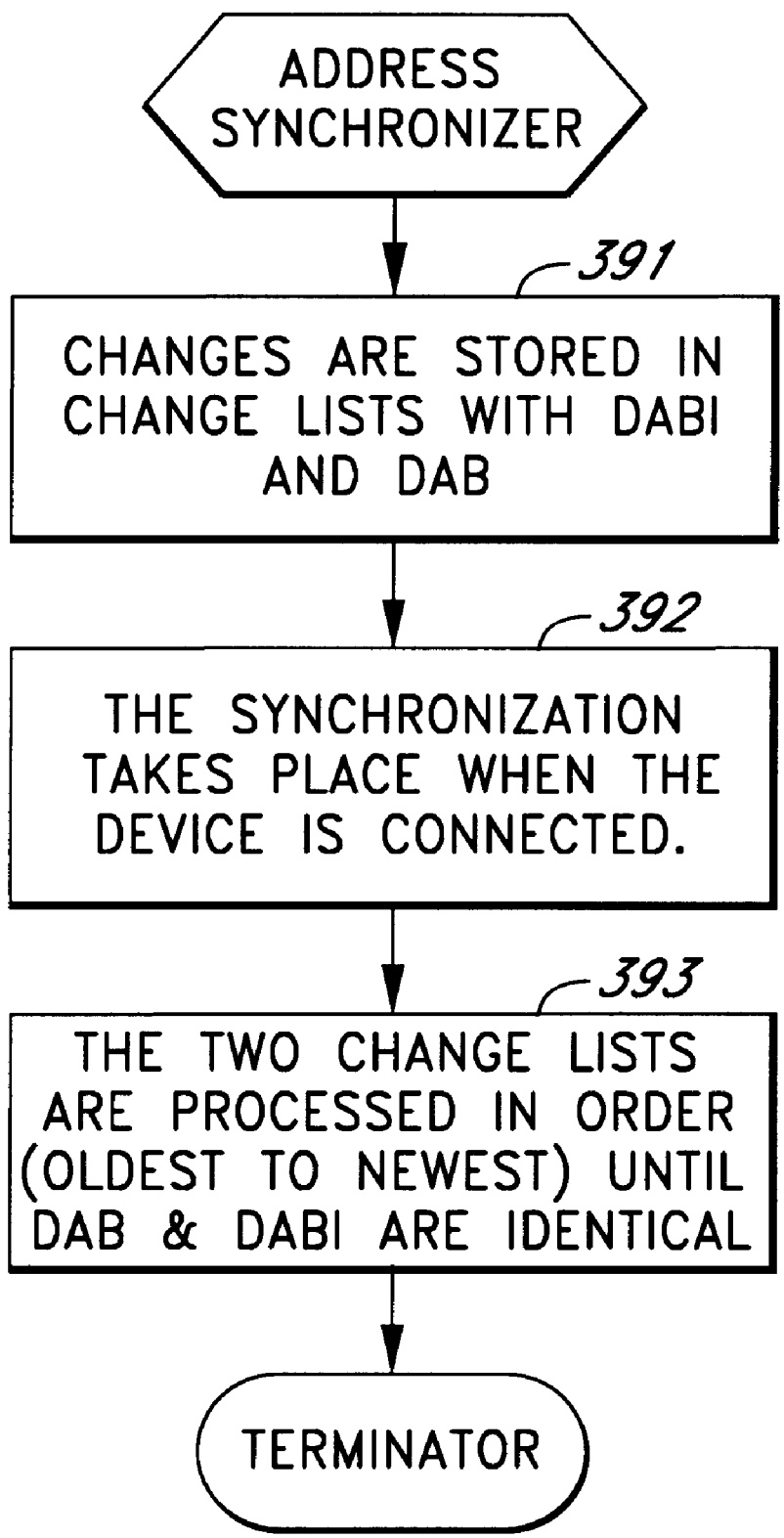
FIG. 3k illustrates the general steps followed by the address synchronizer.

FIG. 3k illustrates the general steps followed by the address synchronizer. In step 391, changes to DAB and DABI are queued up until a connection is made between the two. In step 392, when a connection is made (and user settings indicate synchronization should be performed), then the change lists are processed. In step 393, the two change lists are merged and processed in order (the oldest changes are processed first).

FIG. 4a illustrates an exemplary source ID table 410. FIG. 4b illustrates an exemplary change list 420 for DAB 132. FIG. 4c illustrates an exemplary change list for DABI 130. FIG. 4d illustrates an exemplary merged list created by merging and sorting by time the change list for DAB illustrated in FIG. 4b and the change list for DABI illustrated in FIG. 4c. Further details on how the information between DABI 130 and DAB 132 are synchronized are described in the remainder of the specification.

Figure 5A:
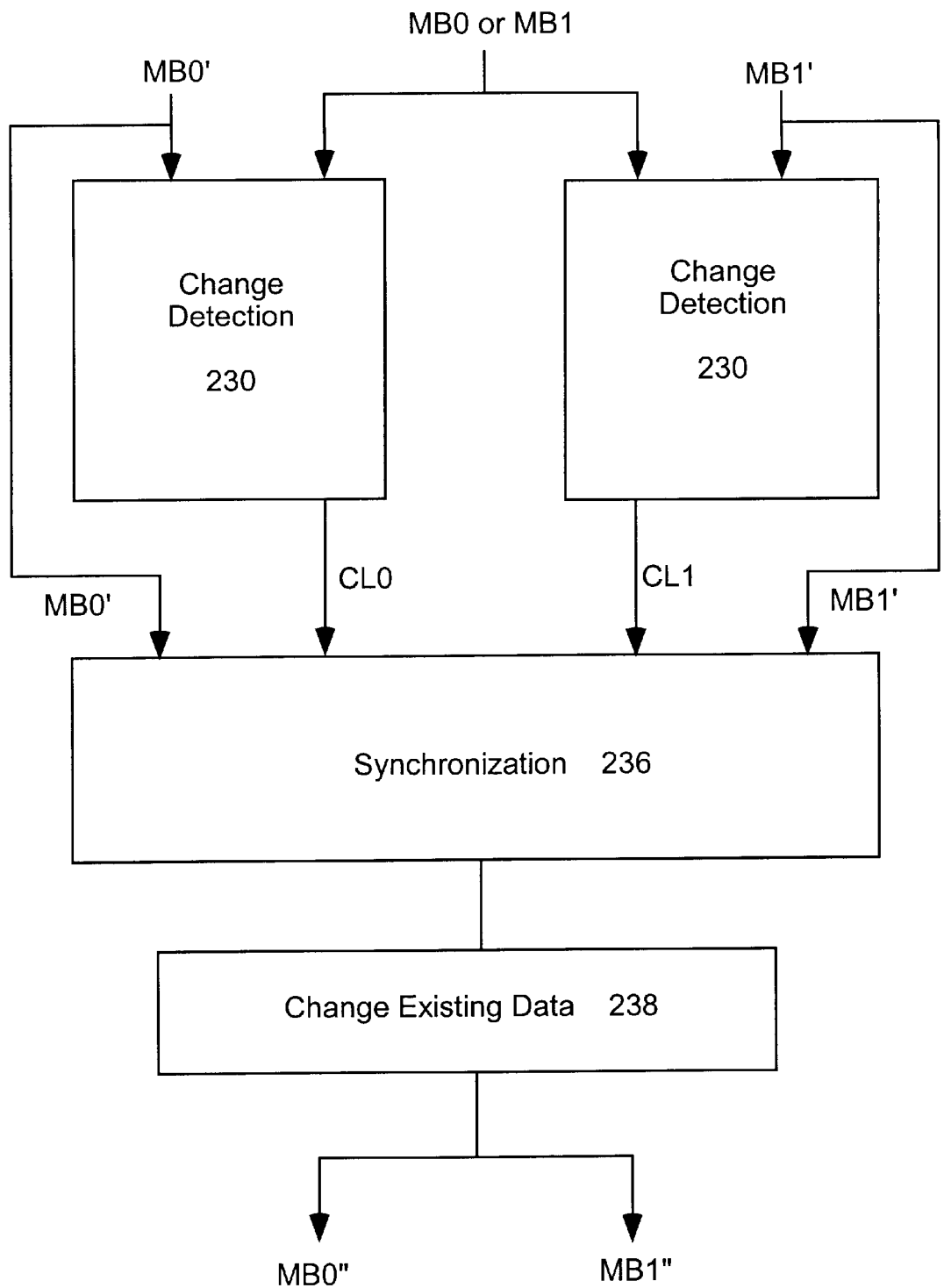
FIG. 5a is a block diagram illustrating an exemplary synchronization apparatus of the present invention.

FIG. 5a illustrates an exemplary mail synch mechanism (also referred herein as an address synchronizer) apparatus. The apparatus has Change Detection mechanism 230 with inputs of mail boxes (or an address book) MB0', MB1' and MB0 or MB1. Change Detection mechanism 230 produces Change List CL0 for MB0 and MB0' and Change List CL1 for MB1 and MB1'. A Change List (CL) is a list of address/message/folder changes for a given mail box address book or (described in more detail in the description accompanying FIG. 5c below). Synchronization mechanism 236 is fed inputs MB0', MB1' and newly produced Change Lists CL0 and CL1. The output of Synchronization mechanism 236 is input to Change Existing Data 238 to produce synchronized mail boxes MB0" and MB1".

Figure 5B:
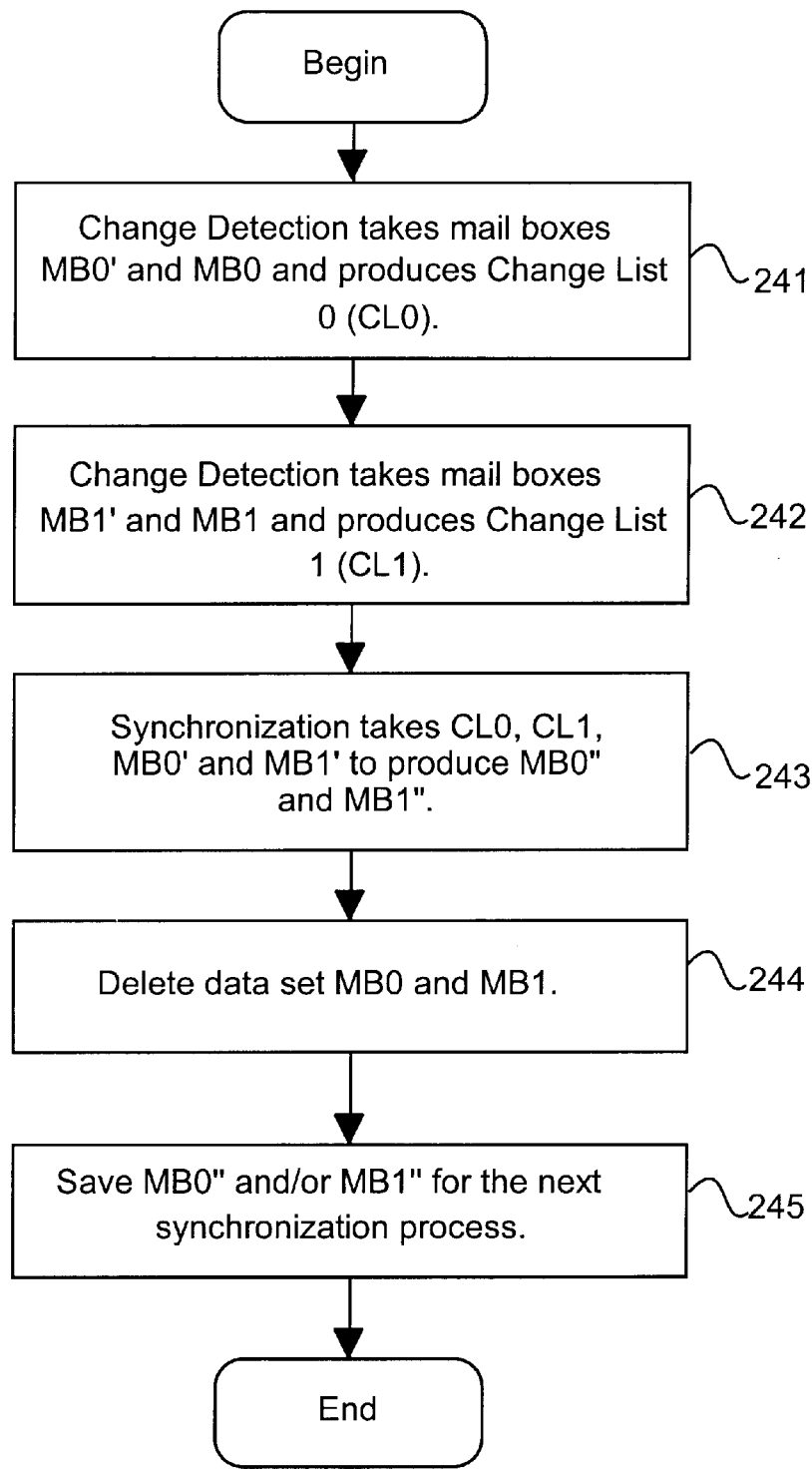

FIG. 5b is a flow diagram illustrating the general steps followed by the mail synch mechanism apparatus of the present invention referenced in FIG. 5a. In step 241, address books or mail boxes MB0, MB1, MB0' and MB1' are input to Change Detection mechanism 230. Address books or mail boxes MB0 and MB1 are equivalent and may be the same file or non existent. MB0' and MB1' are a version of MB0 and MB1 after they have been independently modified. They are saved when synchronization was last run (i.e. when the last time steps 241 through 245 were performed). Change Detection mechanism 230 determines the changes which have been made to address books or mail boxes MB0' and MB0 between synchronizations to produce Change List CL0. In step 242, Change Detection mechanism 230 performs the same operation to produce Change List CL1 from address books or mail boxes MB1' and MB1. In step 243, Synchronization mechanism 236 takes as input, CL0, CL1, MB0' and MB1'. The result of Synchronization mechanism 236 is input to Change Existing Data 238 to produce synchronized address books or mail boxes MB0" and MB1". In step 244, original address books or mail boxes MB0 and MB1 are deleted. In step 245, MB0" and/or MB1" are saved as MB0 and MB1 for the next synchronization process.

FIG. 5c illustrates exemplary data structures for Change Lists CL0 and CL1. In an exemplary data structure for CL0, column 250 contains the original messages/folders address/ from mail box MB0. Only the addresses/messages/folders which have been updated or deleted are listed in this column. Column 251 contains the status of the address/message/folder of the corresponding row and indicates whether the corresponding address/message/folder has been updated or deleted. An entry is also made for address/messages/folders which have been newly created.

For those address/messages/folders which have been created or updated, a corresponding new address/message/folder in address book or mail box MB0' produced as a result of the update or create is listed in column 252. Thus, an address/message/folder Rm from MB0 which has been updated address/produces an updated message/folder Rm' in address book or mail box MB0' in column 252. Deleted message/folder Rp from MB0 is not present in MB0' as illustrated by the corresponding blank entry in column 252. Newly created address/message/folder Ru is listed as a new address/message/folder in address book or mail box MB0' in column 252.

Finally, column 253 indicates whether the synchronization has taken place. The entries for this column initially indicates "no" for corresponding address/messages/folders which have not been processed by Synchronization mechanism 236 (see FIGS. 9a–9e for the general steps followed by Synchronization mechanism 236). After processing by Synchronization mechanism 236, the column entries are changed to "yes" to indicate that the corresponding address/message/folder has been synchronized.

The exemplary data structure illustrated for CL1 has columns 254 through 255 and has the same structure as was described for CL0, with the exception of an event Received in column 255 for messages. This event is particular to messages and does not apply to folders.

In the exemplary Change List (CL) described above, address/messages/folders may be marked as Created, Updated, Deleted, Received (for messages) or Created_Deleted. The Change List lists the changes made to an address book or a mail box (e.g. MB0) to produce a modified address book or mail box (e.g. MB0'). Thus if an address/message/folder in MB0 was Deleted or Updated, the change is reflected in CL0, the Change List showing the differences between MB0 and MB0'. If a new address/message/folder not in MB0 was Created in MB0', this is reflected in CL0 as well.

Although a combination of the operations, Created, Updated and Deleted, may be applied to a record, only the end result at the time of the next synchronization is relevant for the Change List. This may be illustrated with an exemplary address book or mail box MB0'. Address book or mail box MB0' contains the final form of each address/message/folder before the next synchronization and is a mail box containing all the changes made to an original mail box MB0. If an address/message/folder Ru was created in MB0', then modified, the correct change appearing on the Change List CL0 for MB0 and MB0' is Created since the original version of the address book or mail box MB0 did not contain Ru. Thus, even if Ru was modified after creation in address book or mail box MB0', for the purposes of listing the changes made between the original address book or mail box MB0 and the modified version MB0', the difference represented in the list is that a new message/folder Ru was created.

If an address message/folder was created in MB0' and then deleted (Created_Deleted case), the address/message/folder should not appear in the Change List at all, if the Change List is generated retroactively. In the same fashion, if an address/message/folder was modified and then deleted, the address/message/folder should appear in the Change List as Deleted. Change Detection method 230 generates correct answers for all of these cases, as well as any combination of the above.

Figure 5D:
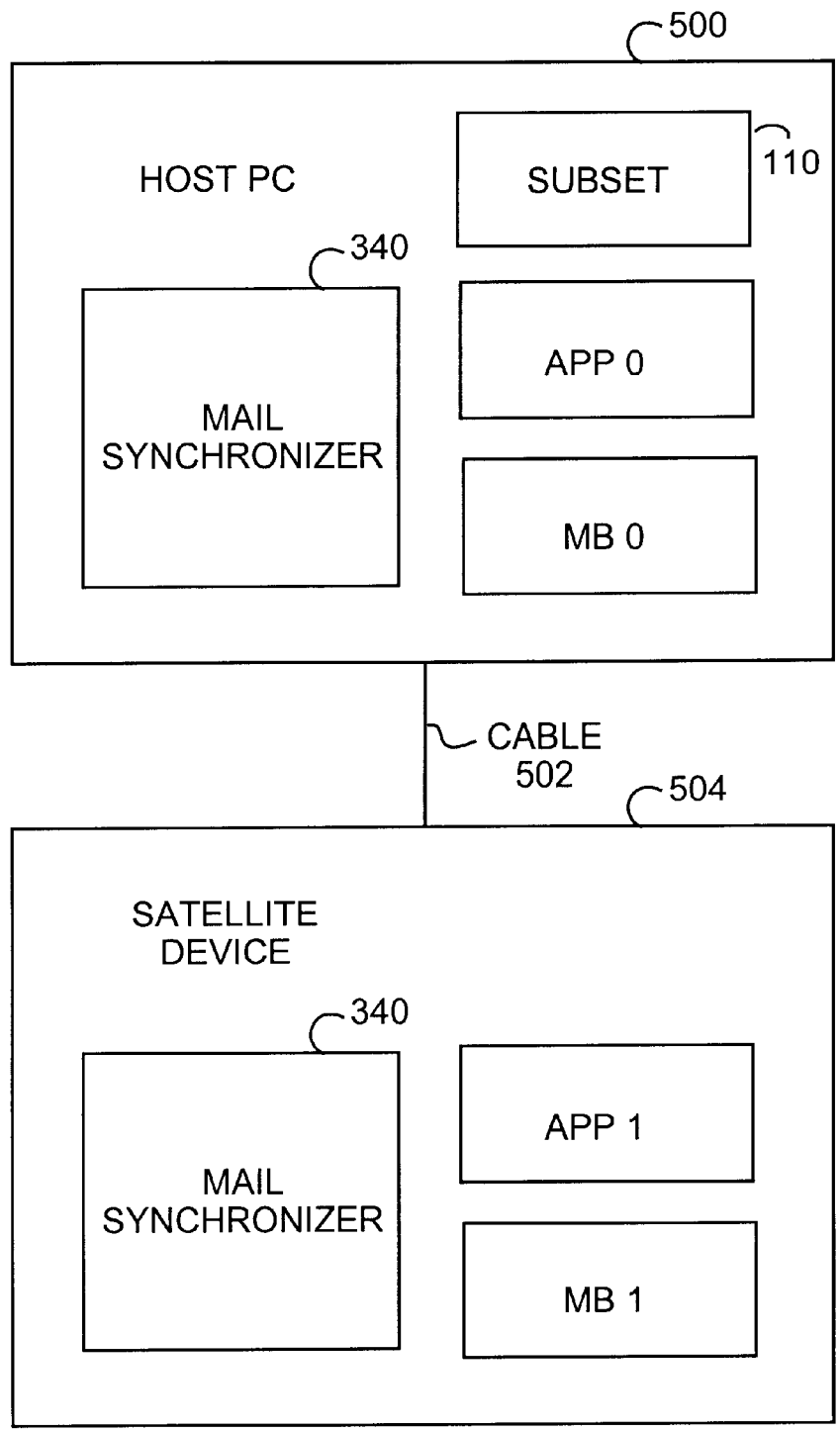
FIGS. 5d–5f are alternate embodiments of a system block diagram illustrating the mail synchronization method and apparatus of the present invention.
Figure 5E:
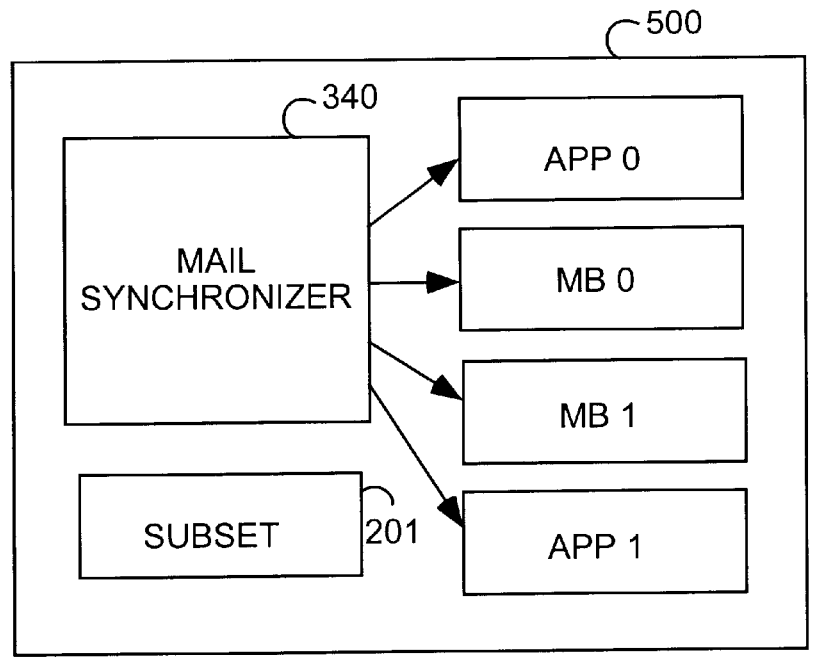
Figure 5F:
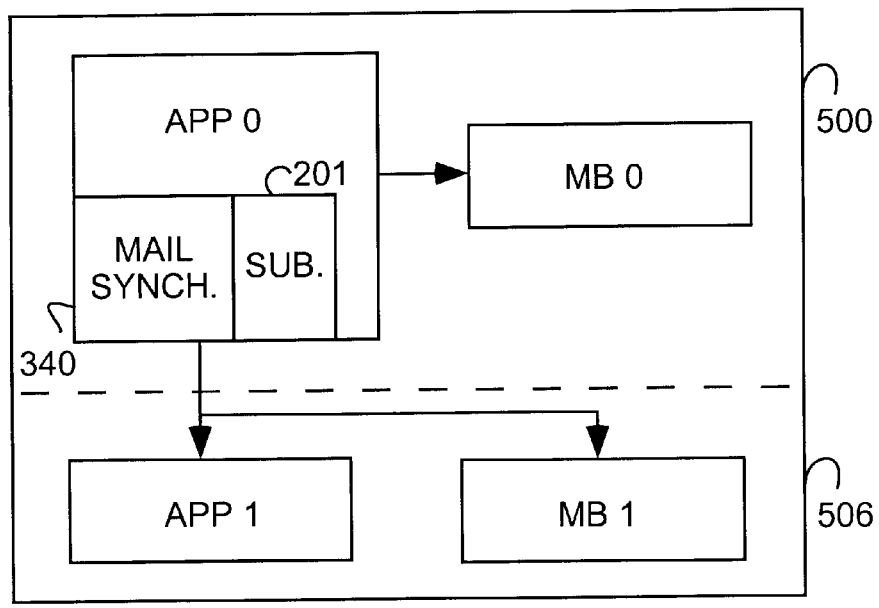

FIGS. 5d–5f are exemplary embodiments of a system block diagram with the implementation of the address book synchronization. The present invention may be used to synchronize addresses/messages/folders between address books or mail boxes MB0 and MB1, belonging to application app0 and application app1 respectively. A variety of configurations are possible. For example, MB0 may reside in a satellite device (e.g. a notebook or a hand held computer, such as an Apple® Newton, a Sharp® Wizard, or a Casio® BOSS) and MB1 may reside on a host computer (e.g. a desktop or a notebook PC) as illustrated in FIG. 5d. Further, MB0 and MB1 may reside on the same system as illustrated in FIG. 5e. MB0 and MB1 may also reside on two different PC's linked by a computer network as illustrated in FIG. 5f. In addition, app0 and app1 may be the same application. The present invention may be implemented for synchronization of any two or more address books or mail boxes and is not limited to the exemplary configurations illustrated herein.

More specifically, FIG. 5d illustrates an embodiment of the present invention where neither app0 nor app1 generates a Change List (CL). Host PC 500 is coupled to satellite device 504 via cable 502. Synchronizer 112 may reside on either host PC 500 or satellite device 504 or on both In an alternative embodiment, one of the applications, app0 or app1, may support synchronization by generating a Change List (CL).

FIG. 5e illustrates an embodiment where synchronizer 112 is implemented as an application residing on PC 500 separate from the applications/e-mail systems being synchronized. This allows users to synchronize data between existing installed applications without having to buy new versions of the applications. Further, users do not have to wait for application vendors to add synchronization support to their applications. The only requirement for this embodiment is that the applications being synchronized provide a means for a third party apparatus to import and export data to and from their native data formats.

Examples of such means include but are not limited to: a published file format, an application programming interface (API), a specialized interface such as Standard Query Language (SQL) used by databases, a Dynamic Data Exchange (DDE), or some communication protocol for transferring information to and from a mobile or remote device. The details on how to implement the importation and exportation of data to and from an application using published formats are application specific and well understood by those skilled in the art.

In an alternative embodiment illustrated in FIG. 5f, synchronizer 112 is implemented as part of one of the applications residing on PC 500 and involved in the synchronization. The only requirement here is that app1 (residing on PC 506) with which app0 (residing on PC 500) is to be synchronized must provide a means for a third party apparatus to import and export data to and from their native formats.

In yet another alternate embodiment, synchronizer 112 may be implemented as part of both app0 and app1, and a predefined communication protocol is used to exchange information such as for a Change List. Other embodiments are possible and are included in the scope of this invention. For these alternative embodiments, the apparatus and methods of the present invention are unchanged, and the only difference is in how the apparatus is packaged. Given the present invention, how the apparatus may be packaged will be readily understood by a person skilled in the art.

Figure 5H:
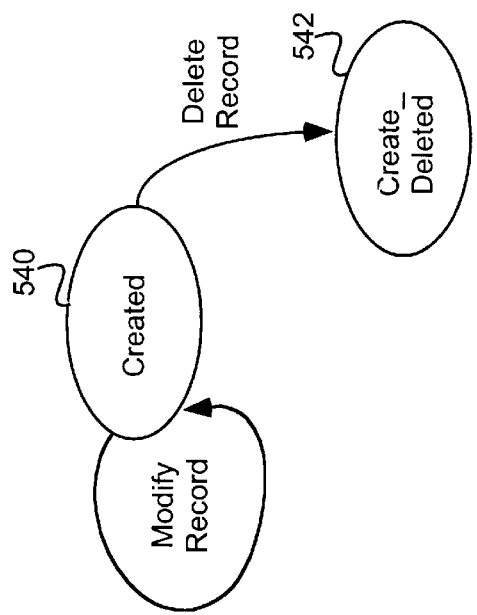
FIGS. 5g and 5h are state transition diagrams illustrating how a change log is truncated to result in exactly one change flag marked for each record.
Figure 5G:
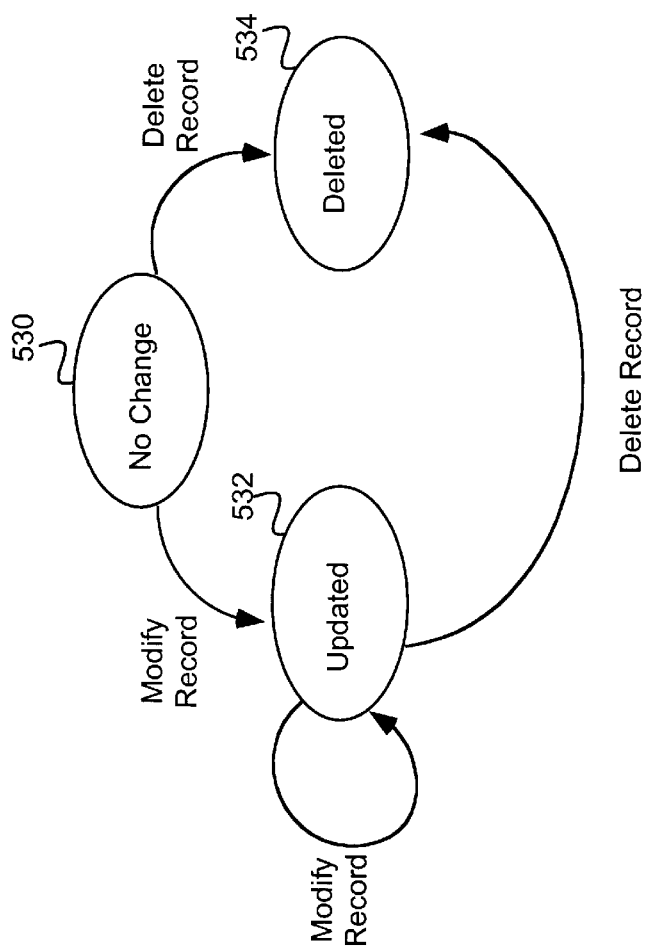

Since the synchronization method of this invention is only concerned with the end resulting difference between MB0' and MB0, rather than the history of all changes that might have happened, a synchronization aware application (such as App1 in FIG. 5f) need not keep a traditional log of all activities for each record. Instead, it is safe to truncate the log such that only the most recent relevant changes are kept. The state transition diagrams in FIGS. 5g and 5h illustrate how the log or more specifically, a Change List as referred to herein, can be truncated such that there is exactly one change flag marked for each record. Truncating the Change List is desirable because it reduces the amount of storage required for the Change List. This is particularly important for memory limited devices, such as hand held computers.

In FIG. 5g, after synchronization at state 530, all addresses/messages/folders are marked "No Change address/." A "No Change address/" message/folder may transition to either "Updated address/" or "Deleted." In state 532, an "Updated" message/folder stays "Updated" unless it becomes "Deleted". In state 534, a "Deleted" address/ message/folder always remains "Deleted."

In FIG. 5h, a newly created address/message/folder is marked "Created" as illustrated in state 540 and remains "Created" unless it is later deleted. If a "Created" address/ message/folder is deleted, it is marked "Created_Deleted" in state 542. Even if a new address/message/folder is later modified, it is still marked "Created" for synchronization purposes. Created_Deleted address/messages/folders are transient and are always ignored during synchronization.

Figure 6A:
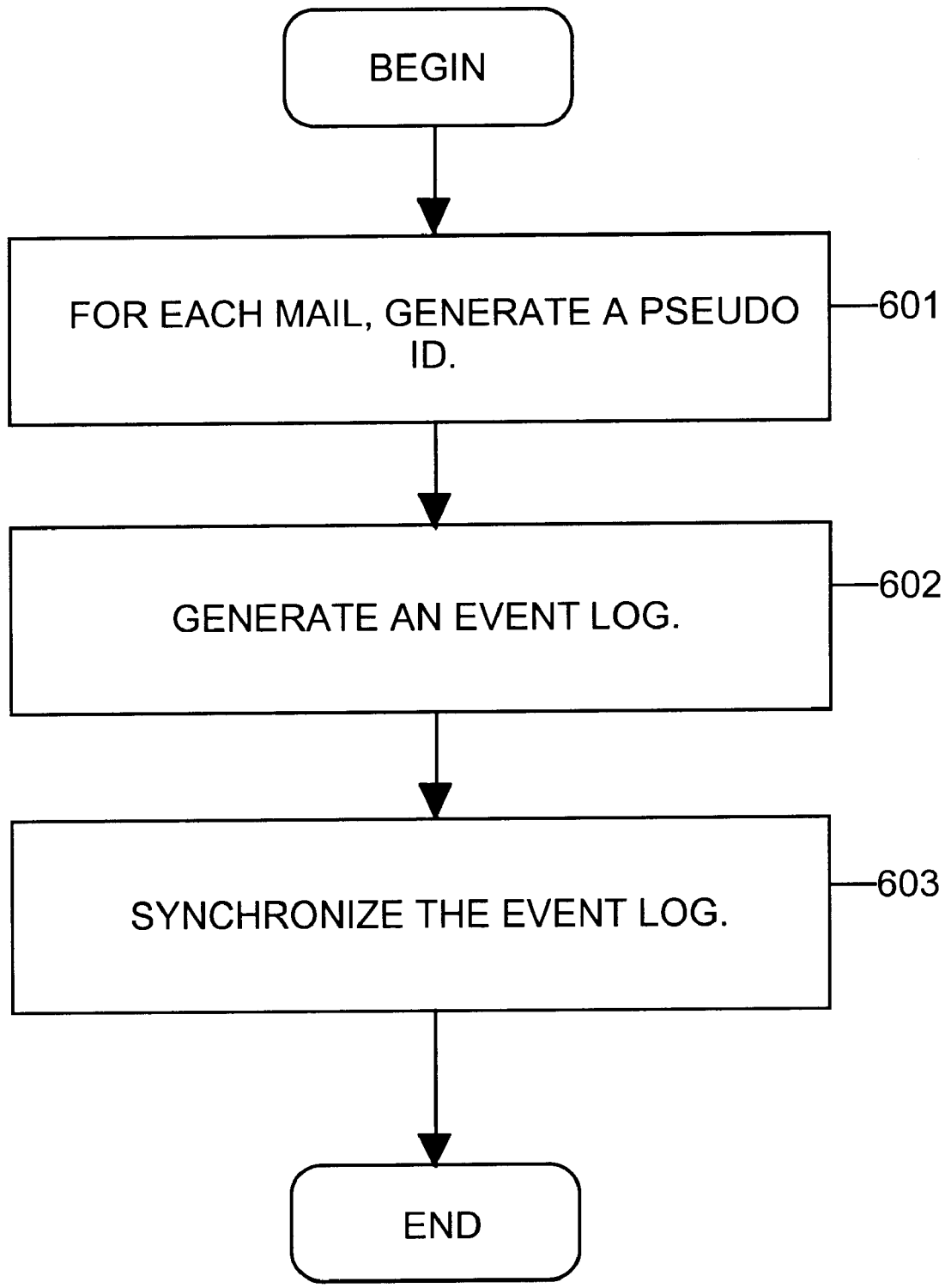
FIG. 6a illustrates the general steps followed by the mail synchronizer of the present invention.

FIG. 6a illustrates the general steps followed by the e-mail synchronizer of the present invention. In step 601, for each address or mail, a pseudo ID is generated. More detailed description and steps followed by this portion is described in FIG. 6b in the accompanying text. In step 602, once a pseudo ID is generated for each address or mail, an event log is generated per each address book or mail box. A more detailed description is provided in FIGS. 6c, 6d, 6e and 6f in the accompanying text. Once event logs are generated, they are synchronized in step 603. A more detailed description is provided in FIGS. 9a through 9e.

Figure 6B:
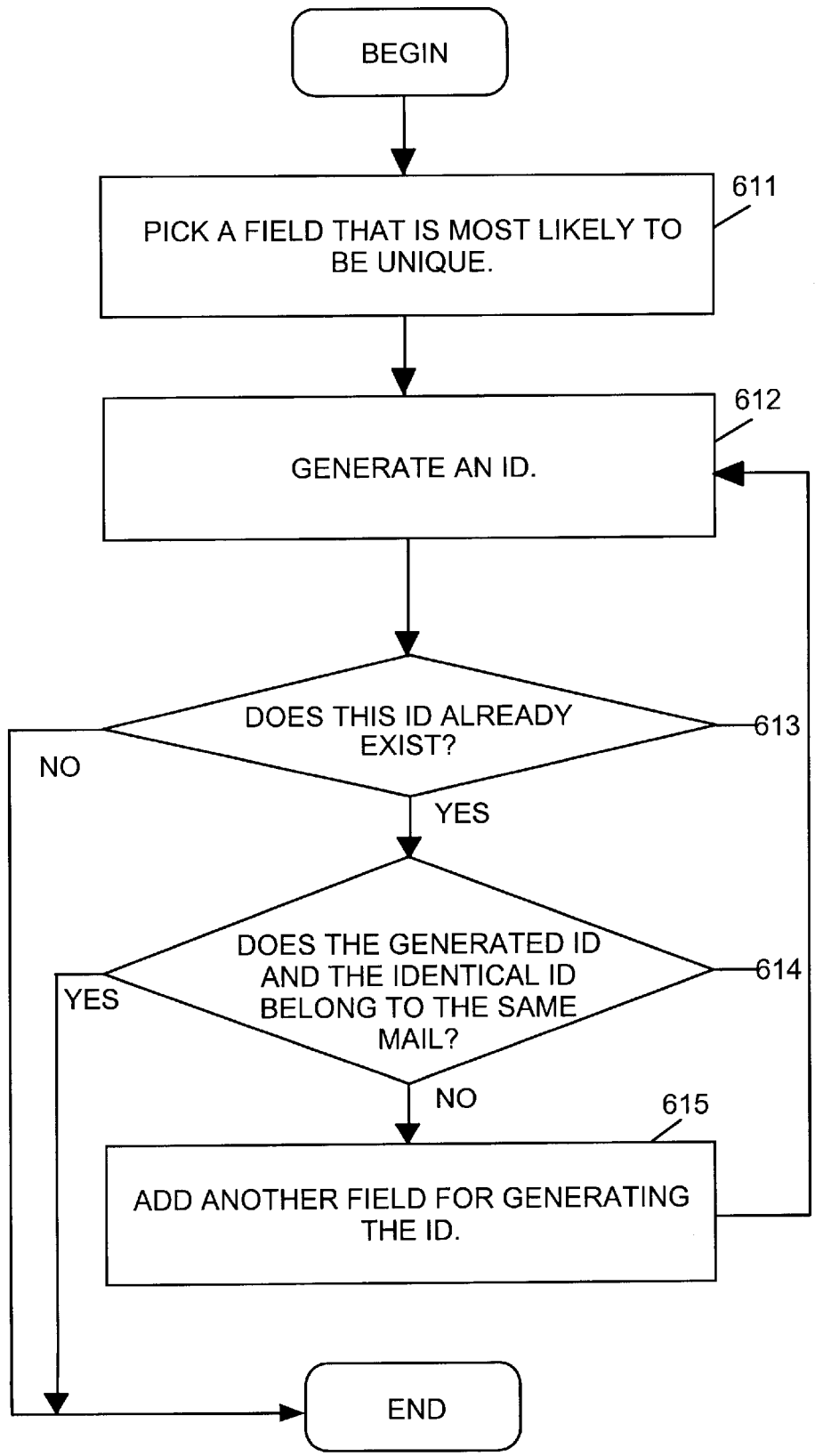
FIG. 6b describes the general steps followed by the present invention in generating a pseudo unique ID for each mail in a mail box to be synchronized with another mail box.

FIG. 6b describes the general steps followed by the present invention in generating a pseudo unique ID for each address or mail in an address book or mail box to be synchronized with another address book or mail box. In step 611, an attribute in each mail which is most likely to be unique is selected. An example of such an attribute is the mail message reception time. In step 612, an ID is generated from the selected attributes for each address or mail. For example, in a typical or mail system such as for CC: Mail, a message has the following attributes: message type, folder name, sender, recipient, subject, receiving time, priority, receipt request, and size. The receiving time may be selected first for generating a pseudo unique ID. The attributes may be selected in the following order if the receiving time is not unique: sender, subject, size, recipient, folder name, message type, priority and receipt request.

In step 613, if this ID already exists, it is determined whether or not the generated ID and the identical ID belong to the same address or mail in step 614. If the generated ID and the identical ID do not belong to the same address or mail, then in step 615, another attribute is added to the mail in order to generate another ID. Back in step 612, another ID is then generated and the process is repeated until each address or mail in the address book or mail box has a pseudo unique ID.

Although the above process does not guarantee to generate a unique ID for each address/message/folder, the process will not destroy the synchronization process. If a user copies an address or message to the same folder, this will produce two identical addresses or messages. Because all their attributes are the same, the two address or messages will have the same Id. For any operation such as delete, update or new (copy) operation performed on any one of these identical addresses or messages, the operation may be applied to any other address or message having the same ID at the synchronization site. Because the operations are performed to addresses or messages having the same identical attributes, the result is the same. After a delete or an update operation, every address or message becomes unique because the duplicated addresses or messages are deleted by the delete operation and the update operation causes identical addresses or messages (which have not been deleted) to have different attribute values through the updated attributes.

Figure 6C:
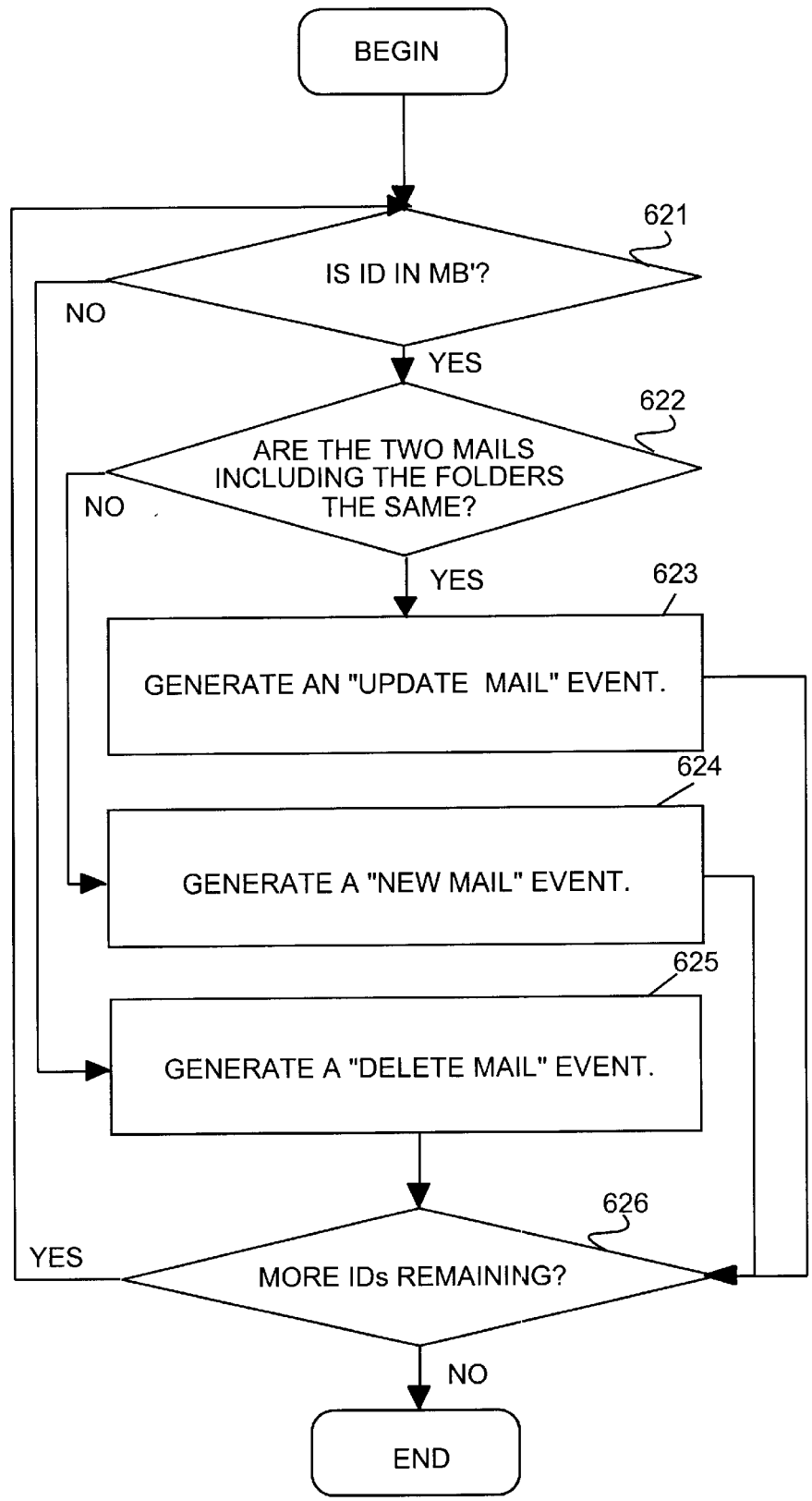
FIG. 6c describes the general steps followed by the present invention in generating an event log for a mail.
Figure 6D:
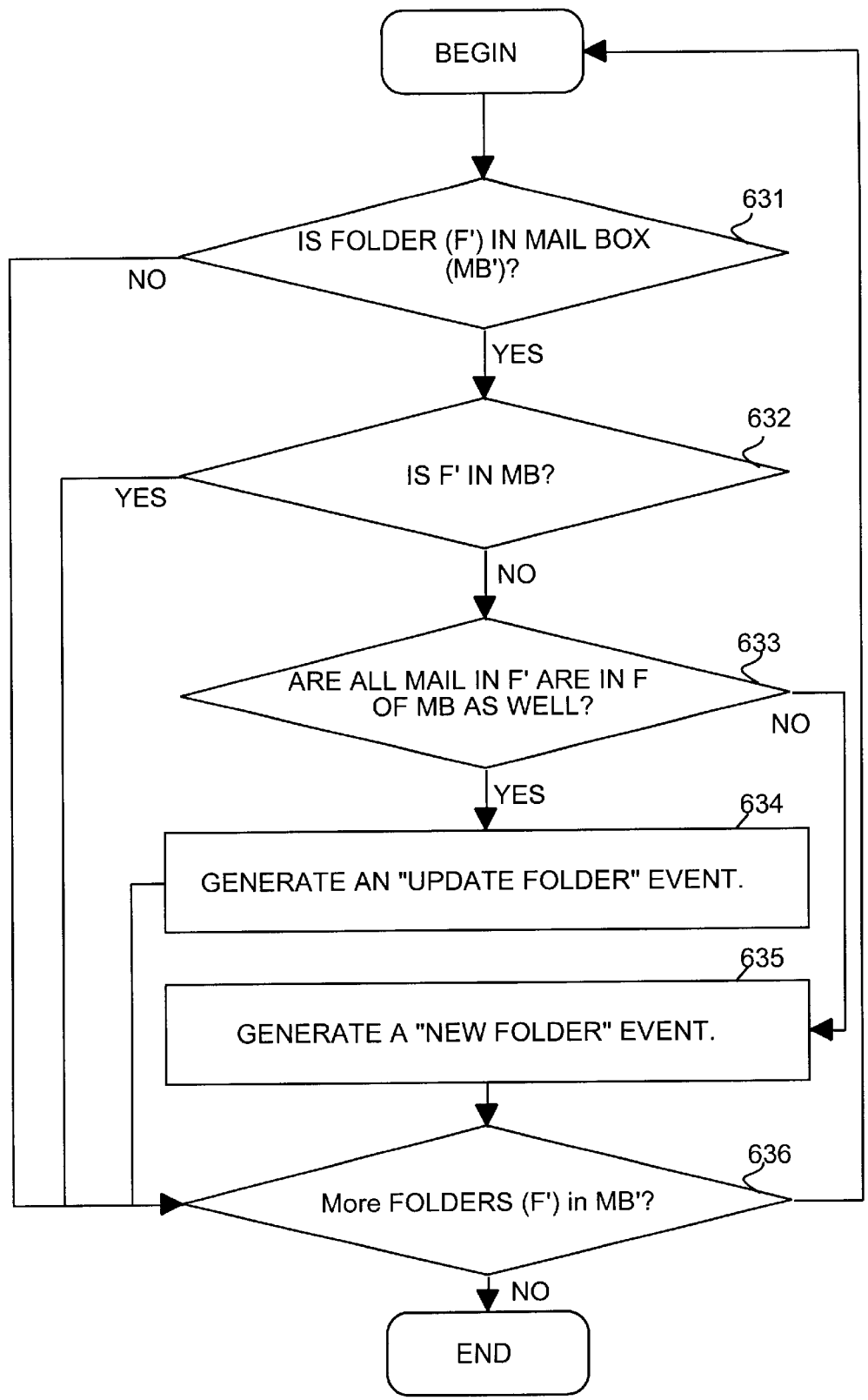
FIGS. 6d and 6e illustrate the general steps followed by the present invention in generating an event log for folders.

FIGS. 6c and 6d describe the general steps followed by the present invention in generating an event log for an address or a mail. In step 621 of FIG. 6c, for each ID' in MB0', it is determined if ID' is in MB0. If ID' for the address or mail generated by the steps followed and described in FIG. 6b is in MB0 and the two address entries or mails (including their folders) are the same in step 622, then it is determined whether there are more ID's to be checked in step 625. Otherwise, if ID' for the address or mail is in MB0 but the two addresses or mails are not the same, then an "update mail" event is generated for that address or mail for the event log in step 623. Otherwise, if ID' for the address or mail is not in MB0, then a "new mail" event is generated for that particular address or mail for the event log in step 624. If there are more ID's remaining for an event to be generated for the event log, then the process repeats itself until there are no more ID's remaining for which an event log entry must be generated.

In step 626 of FIG. 6d, for each ID in MB0, it is determined if ID is in MB0'. If ID is not in MB0', then a "delete mail" event is generated in step 627. Otherwise, if ID is in MB0', then the process repeats itself from step 628 until there are no more ID's remaining for which an event log entry must be generated.

Figure 6E:
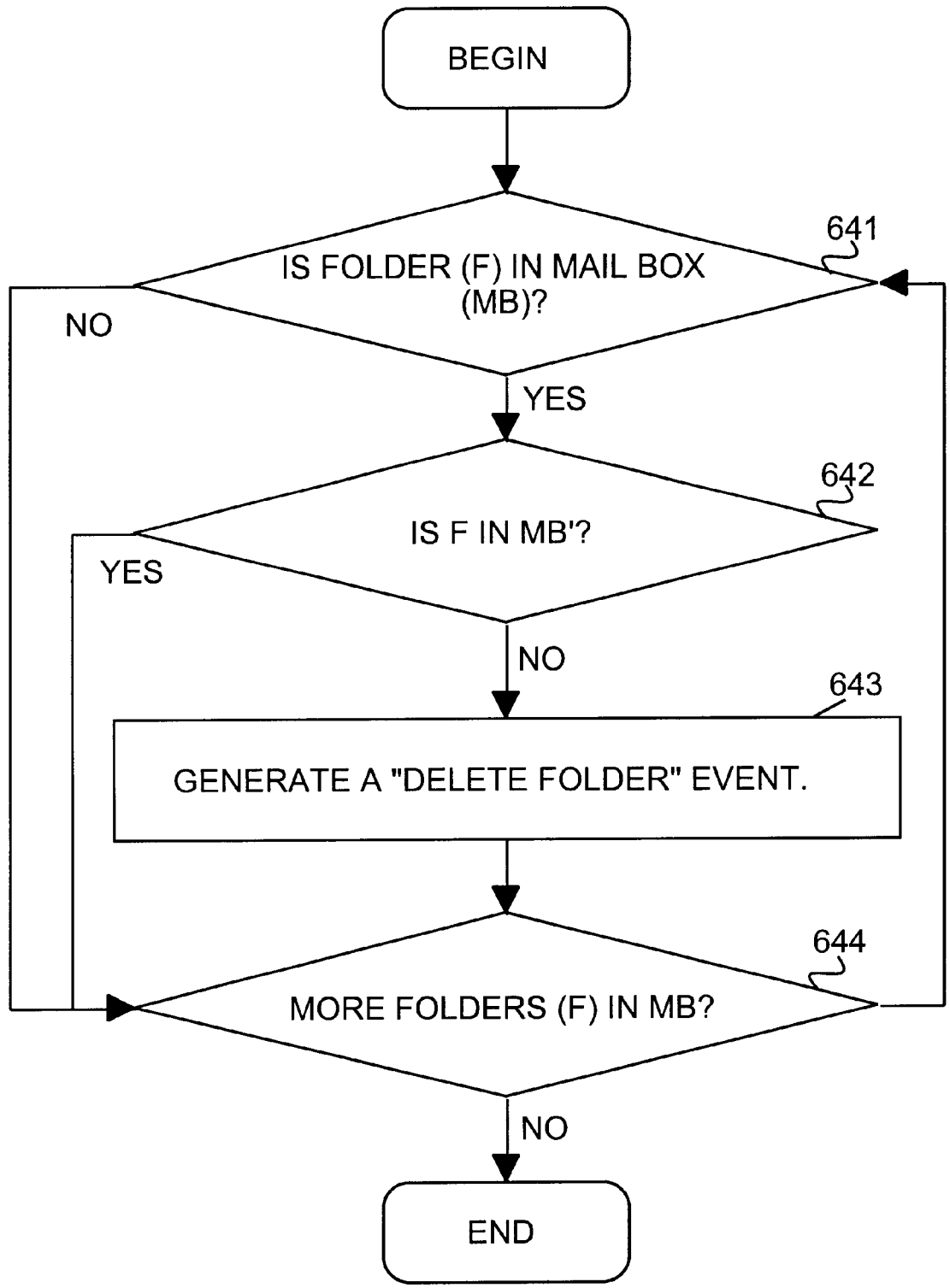

FIGS. 6e and 6f illustrate the general steps followed by the present invention in generating an event log for folders. In step 631 of FIG. 6e, if the folder F' for which an event for the event log is to be generated is in address book or mail box MB', but not in MB and all address or mail in F' are in F of MB as well, then an "update folder" event is generated for the event log for that particular folder F' in step 634. If folder F' is in address book or mail box MB' but not in MB and all mail in F' are not in F of MB as well, then a "new folder" event is generated for that event log for that particular folder F' in step 635. In step 636, if there are more folders F' in MB' then the whole process is repeated until there are no more folders F' in MB'.

In FIG. 6f, in step 641, if folder F is in address book or mail box MB but not in MB', then a "delete folder" event is generated for the event log for that particular folder F in step 643. In step 644, if there are more folders F remaining in MB then the whole process is repeated until there are no more folders M remaining in MB without an event generated for the event log.

Figure 7A:
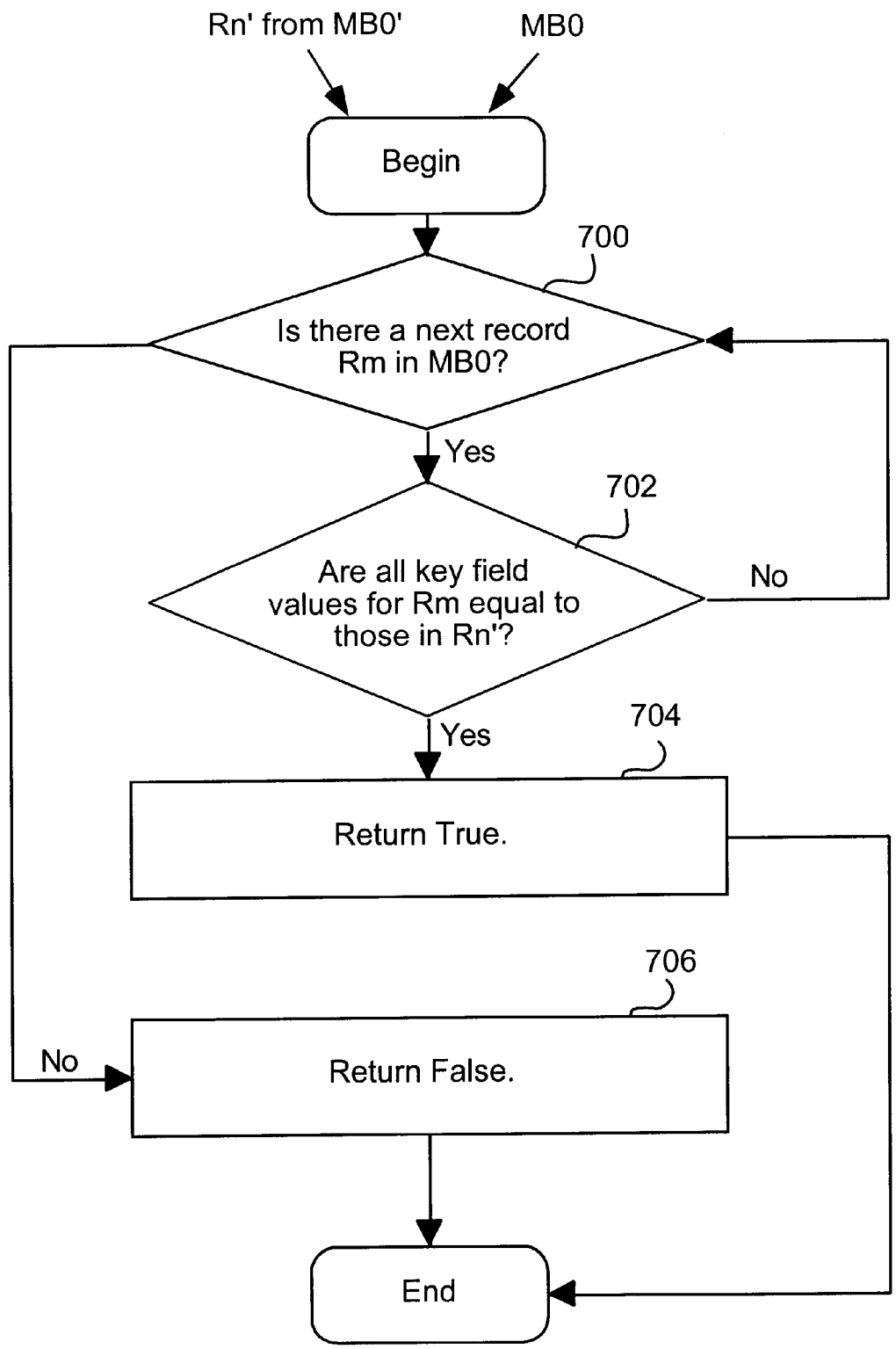
FIG. 7a is a flow chart describing the general steps followed by a SUID mechanism.
Figure 7B:
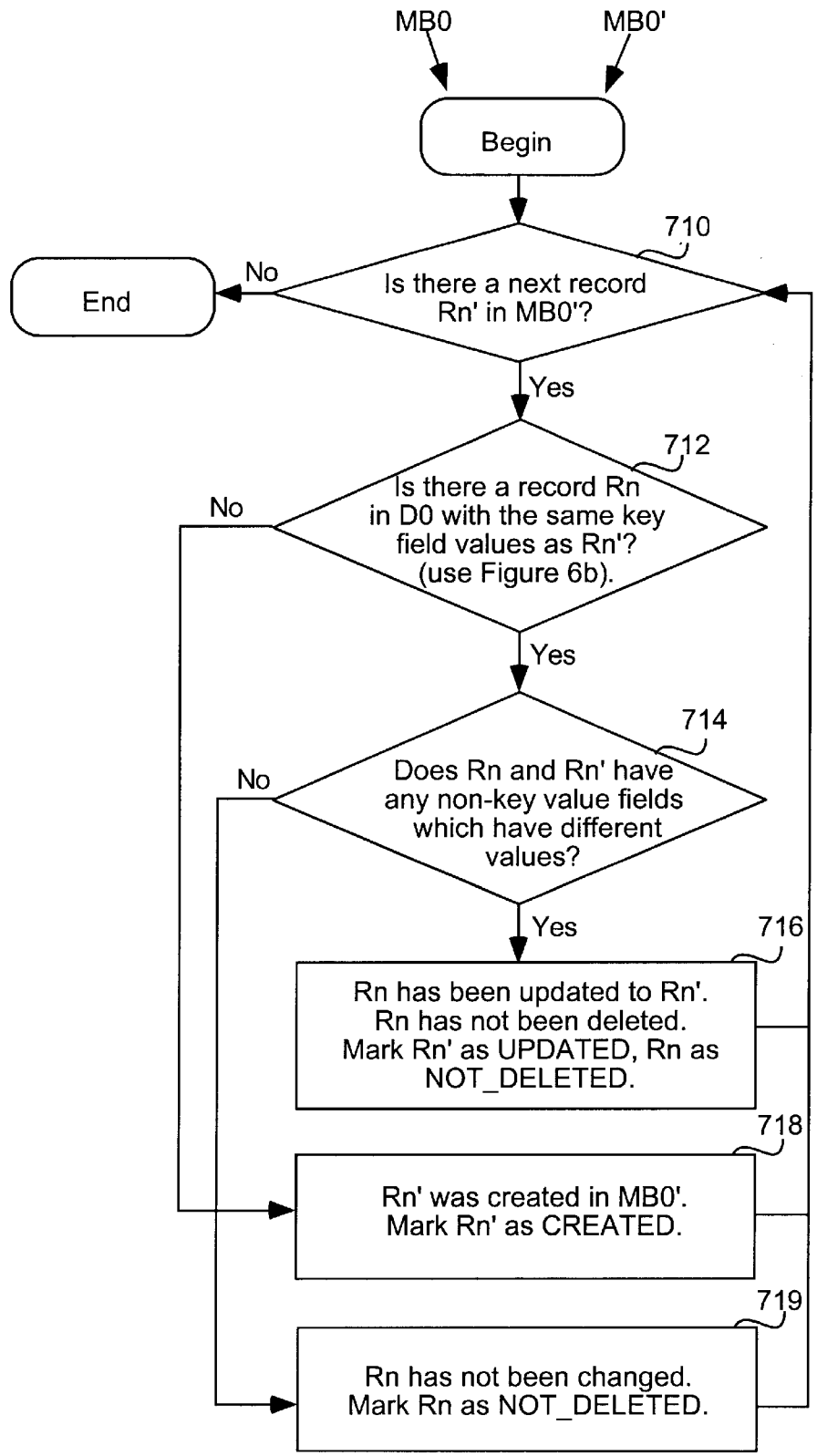
FIGS. 7b and 7c are flow charts describing the general steps followed by a Change Detection mechanism.

FIGS. 7a and 7b are flow diagrams describing the general steps followed by the Change Detection mechanism referenced in FIG. 2d. Change Detection mechanism 230 deduces all the changes that have occurred in a given address book or mail box since the last synchronization. This is accomplished by first saving a copy of the address book or mail box at the end of a synchronization. At the next synchronization, the addresses/messages/folders are compared in the modified address book or mail box (e.g. MB0') with the saved address book or mail box (e.g. MB0), detecting the changes which must have happened since the last synchronization. In the case where the synchronization is run for the first time, there are no addresses/messages/folders in the saved address book or mail box (e.g. MB0), and Change Detection mechanism 230 concludes that all current addresses/messages/folders have been created.

The steps followed by Change Detection mechanism 230 begins where first, address books or mail boxes MB0 and MB0' are input to Change Detection mechanism 230. In step 710, if there is a next addresses/message/folder Rn' in mail box MB0', then in step 712, it is determined if there is an address/message/folder Rn in MB0 with the same Key Attribute values as Rn' (this is determined using the steps illustrated in the flow diagram of FIG. 6). If there is an address/message/folder Rn in MB0 with the same Key Attribute values as Rn' and in step 714, if Rn and Rn' have non-key value attributes which have different values, then in step 716, it is determined that Rn has been UPDATED to Rn' and Rn' is marked as UPDATED. In addition, since Rn has been UPDATED, it is determined that Rn has not been deleted and Rn is marked NOT_DELETED.

If addresses/messages/folders Rn and Rn' have the same values for all their Key Attributes and non-Key Attributes, then it is determined that Rn' has not been changed and Rn is marked as NOT_DELETED. In step 719, if there are no addresses/messages/folders Rn in MB0 with the same Key Attribute values as Rn', then Rn' is a new address/message/folder created in MB0' and Rn is marked CREATED. If there is a next address/message/folder Rn' in MB0', then return to step 710 until there are no more addresses/messages/folders Rn' in new address book or mail box MB0'.

After all the messages/folders in mail box MB0' have been processed, all the address/messages/folders in MB0' become marked as either UPDATED or CREATED, and some addresses/messages/folders in MB0 become marked as NOT_DELETED.

In FIG. 7b, in step 720, for each address/message/folder Rn' in new address book or mail box MB0', if Rn' is marked UPDATED then in step 722, Rn' is added to Change List as Update. Otherwise, if Rn' is marked CREATED, then in step 724, Rn' is added to Change List as CREATED. In step 726, if there is a next address/message/folder Rn' in the new mail box MB0', then the next address/message/folder Rn' in the new address book or mail box MB0' is processed until there are no more addresses/messages/folders Rn' left to be processed. In step 728, for each address/message/folder Rn in the saved address book or mail box MB0, if Rn is not marked NOT_DELETED, then Rn is added to Change List as DELETED. The process is repeated until all addresses/messages/folders Rn in the saved address book or mail box MB0 are processed.

A Change List CL0 for original address book or mail box MB0 and modified address book or mail box MB0' reflecting the changes made from MB0 to MB0' has now been generated by Change Detection mechanism 230. (Refer to the exemplary CL0 data structure in FIG. 5c and FIG. 7d for illustration.) There are two conditions which may be encountered by Error Correction mechanism 234 which require Change Detection mechanism 230 to generate a Change List by working with Error Correction mechanisms one and two. The two conditions and Error Correction mechanisms one and two are described in more detail in the descriptions accompanying FIGS. 8a through 8d below.

Figure 7C:
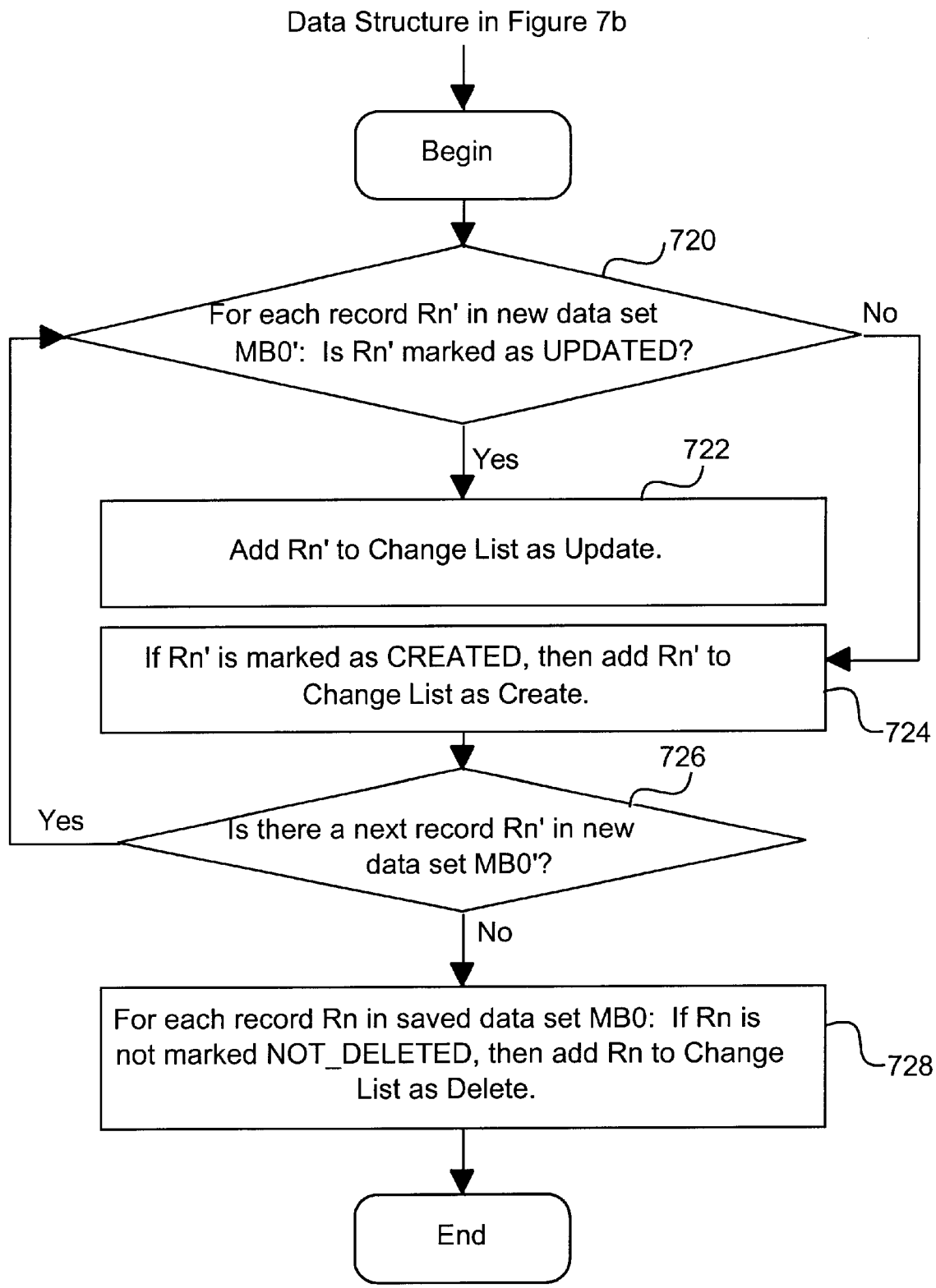
Figure 7D:
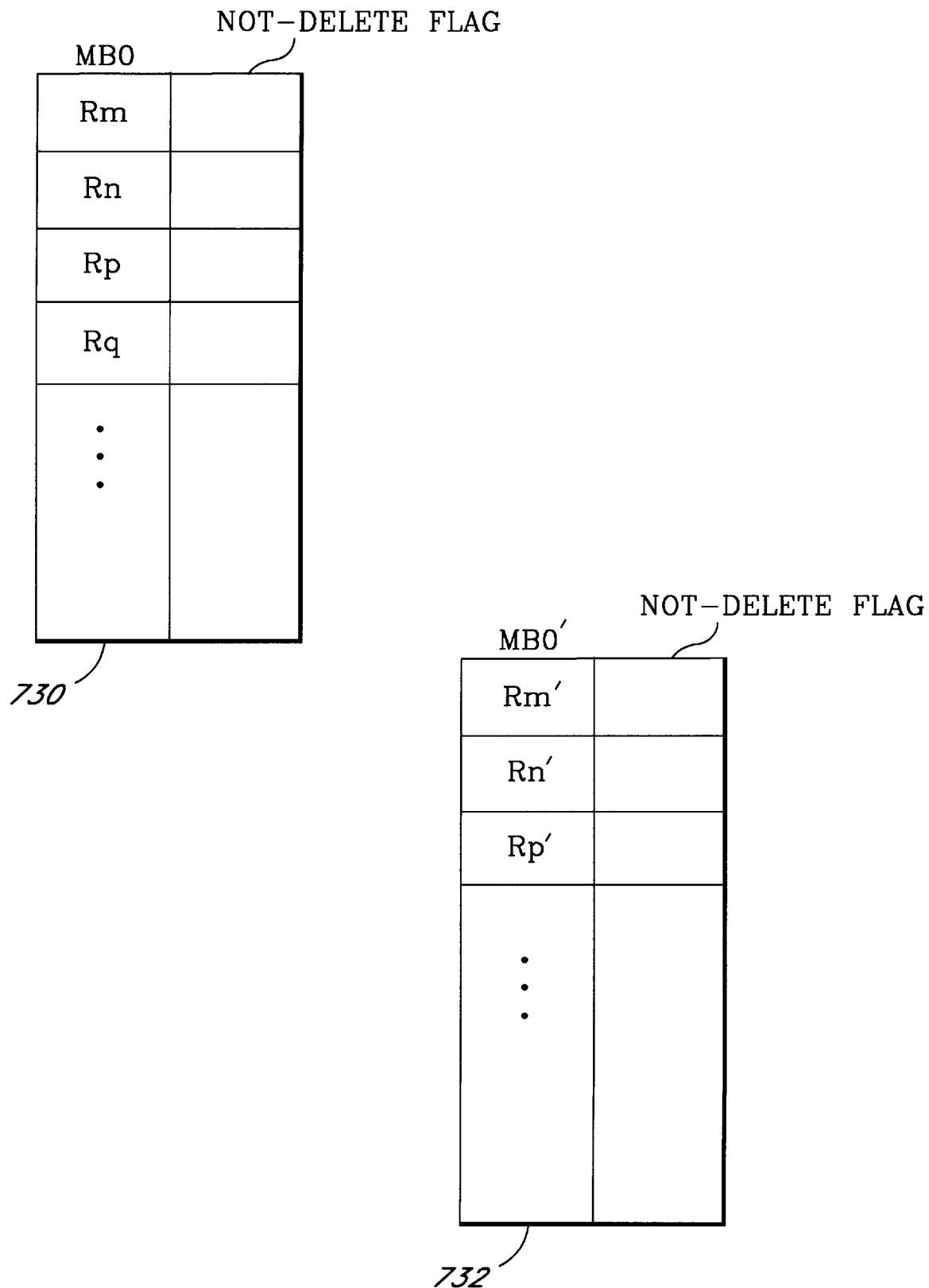
FIG. 7d illustrates an exemplary data structure modified by the steps described in FIG. 7b.

FIG. 7c illustrates an exemplary Change List data structure modified by the steps described in the flow diagram of FIG. 7a. Data structure 730 contains a list of addresses/messages/folders Rm, Rn, Rp, Rq, etc. (contained in mail box MB0) as well as a corresponding list of NOT_DELETE flags. Data structure 732 contains a list of addresses/messages/folders Rm', Rn', Rp', etc. (contained in mail box MB0') as well as a list of corresponding NOT_DELETE flags.

FIGS. 8a through 8d are flow charts describing the general steps followed by Error Correction mechanism 234 referenced in FIG. 2d. In the Figures, the functions of Error Correction mechanism 234 is divided into two parts and will be referred to as Error Correction mechanisms one and two.

There are two error conditions which may be encountered by Error Correction mechanism 234. Error case 1 is where a record's Key Attribute changes in address book or mail box MB0'. Error case 2 is where more than one address/message/folder is sharing the same Key Attribute values (a non-unique identifier case).

In error case 1, the correct result to be produced by Change Detection mechanism 230 is that Rn' is Updated. Since the Key Attribute is changed during the synchronization process, assuming the changed Key Attributes are still unique, Change Detection mechanism 230 deduces that Rn was Deleted, and Rn' was Created. A Delete and a Create is equivalent to an Update. Since Rn' also contains all the unmodified attributes in Rn, as well as any attributes a user or an application normally chooses not to synchronize. Thus no correction is needed. The case where Rn's Key Attributes are the same as one or more other record's Key Attributes is handled as an error case 2 described below.

For error case 2, Change Detection mechanism 230 deduces incorrect Updates and Creates. For example, assuming that addresses/messages/folders R1 and R2 have the same Key Attribute values and that R1' and R2' are unchanged, i.e. R1' has all the same attributes as R1 and R2' as R2. If Change Detection mechanism 230 is run on R2' before R1', it is possible for pseudo unique id generator 200 to erroneously determine that R1 has been updated to R2' and that R2 has been updated to R1'. The correct determination which should be made by pseudo unique id generator 200 is that neither R1 nor R2 has changed. Similarly, if R1' is unchanged but R2' has changed, it is possible for Change Detection mechanism 230 to determine that R1 has been updated to R2' and R2 has been updated to R1'. In either case, after results are produced by Change Detection mechanism 230, if R1 or R2 contains attributes not normally synchronized, R1's unsynchronized attributes would be exchanged with R2's unsynchronized attributes.

The invention corrects error case 2 using two procedures. In one procedure, pseudo unique id generator 200 first looks for a duplicate in MB0. If a duplicate exists in MB0, it is marked DUPLICATE_EXISTS as well as NOT_DELETED. In subsequent searches, pseudo unique id generator 200 ignores any addresses/messages/folders in MB0 already marked as DUPLICATE_EXISTS. Pseudo unique id generator 200 will then return one of three possible results, DUPLICATE, CONFLICT, or NOT_FOUND. DUPLICATE is returned when there exists, for example, an address/message/folder Rx in MB0, for which all attributes match with address/message/folder Rn' in MB0'. CONFLICT is returned when there exists a record, for example, Rx in MB0, for which all Key Attributes match with address/message/folder Rn' in MB0' but one or more other attributes are different. NOT_FOUND is returned when there is no address/message/folder in MB0 for which all Key Attributes matches with those for Rn' in MB0'. This error correction mechanism for SUID mechanism will herein be referred to as Error Correction one.

The second procedure for correcting an error case 2 is as follows. In Error Correction one, when a CONFLICT is found, the conflict address/message/folder Rx in MB0 is also marked as CONFLICT_EXISTS, and an internal reference to address/message/folder Rn' is stored in MB0' for which Rx is a conflict. For future address/messages/folders seen in Error Correction one, if a DUPLICATE is found for an address/message/folder already marked as CONFLICT_EXISTS, address/message/folder Rx is marked in MB0 as DUPLICATE_EXISTS. Rn' is then retrieved and steps 700 to 706 of the flow diagram illustrated in FIG. 7a is performed on Rn' by Change Detection mechanism 230. Change Detection mechanism 230's error correction mechanism will herein be referred to as Error Correction two. Error Correction one and two work together as described below.

Figure 8A:
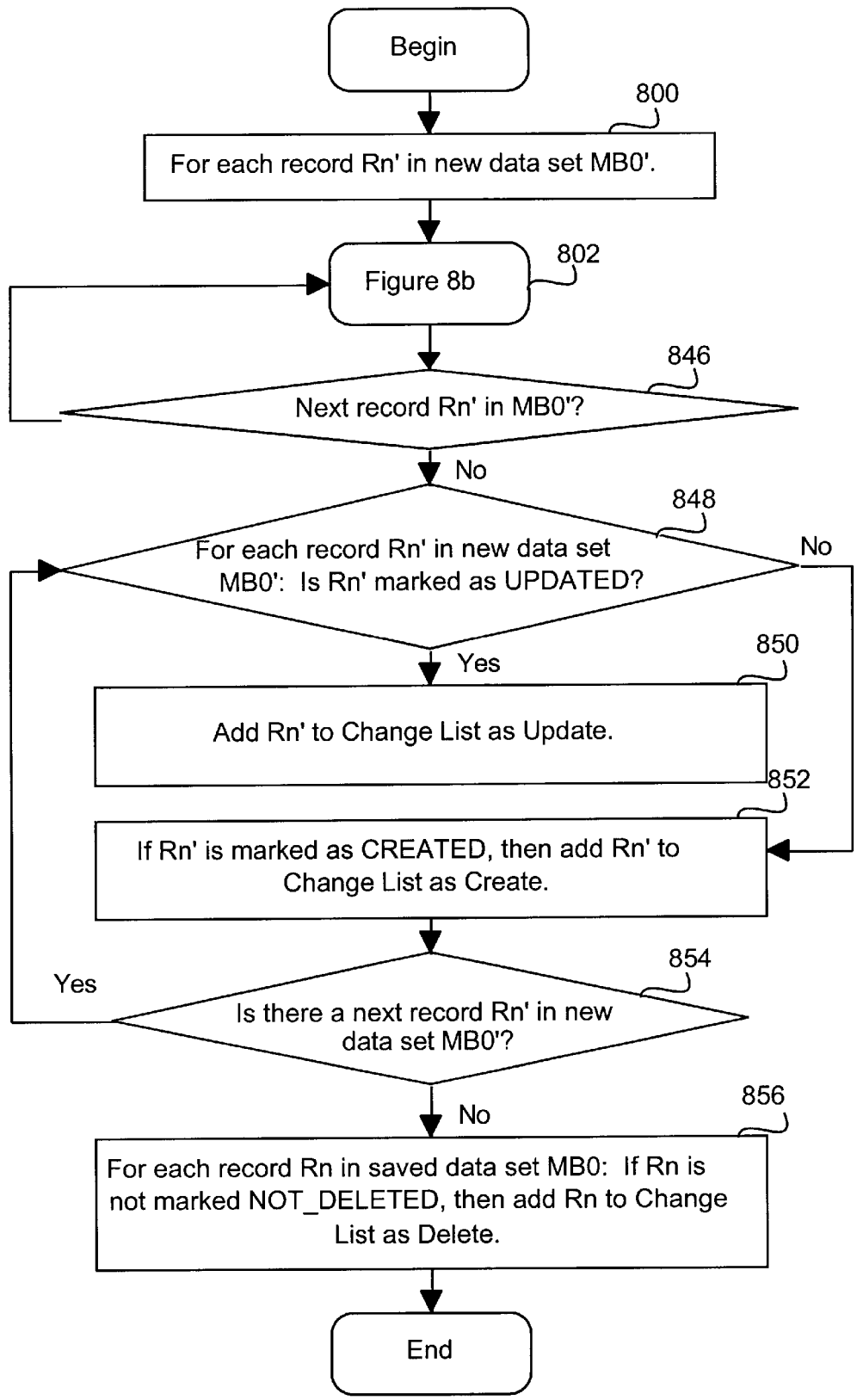
FIGS. 8a–8d are flow charts describing the general steps followed by an Error Correction mechanism.
Figure 8B:
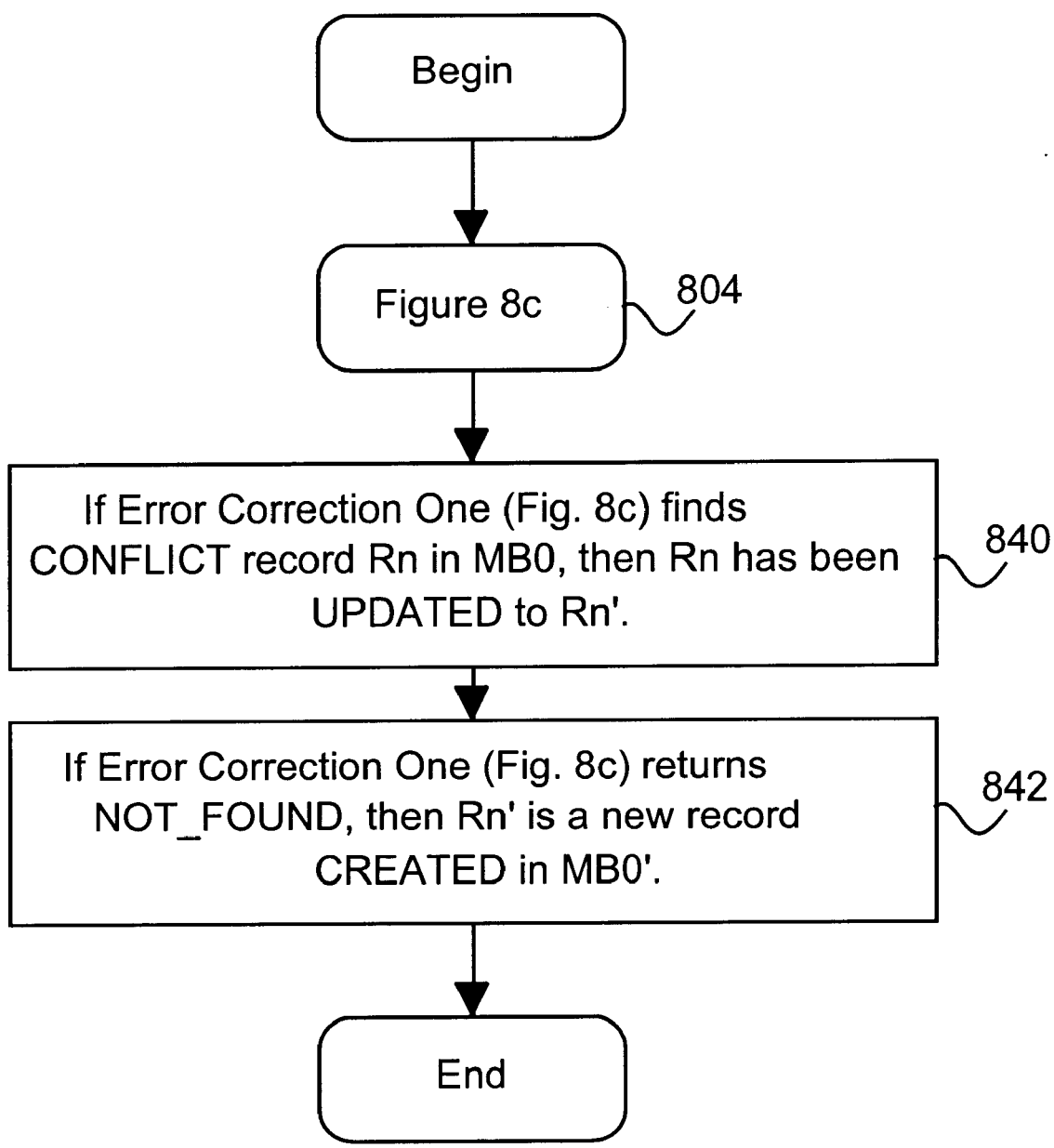

In FIG. 8a, Error Correction mechanism two takes as input, address book or mail boxes MB0 and MB0'. In step 800, for each address/message/folder Rn' in new address book or mail box MB0', the general steps illustrated in FIG. 8b are performed on Rn'. In FIG. 8b, the general steps illustrated in FIG. 8c is first performed with input of Rn'.

Figure 8C:
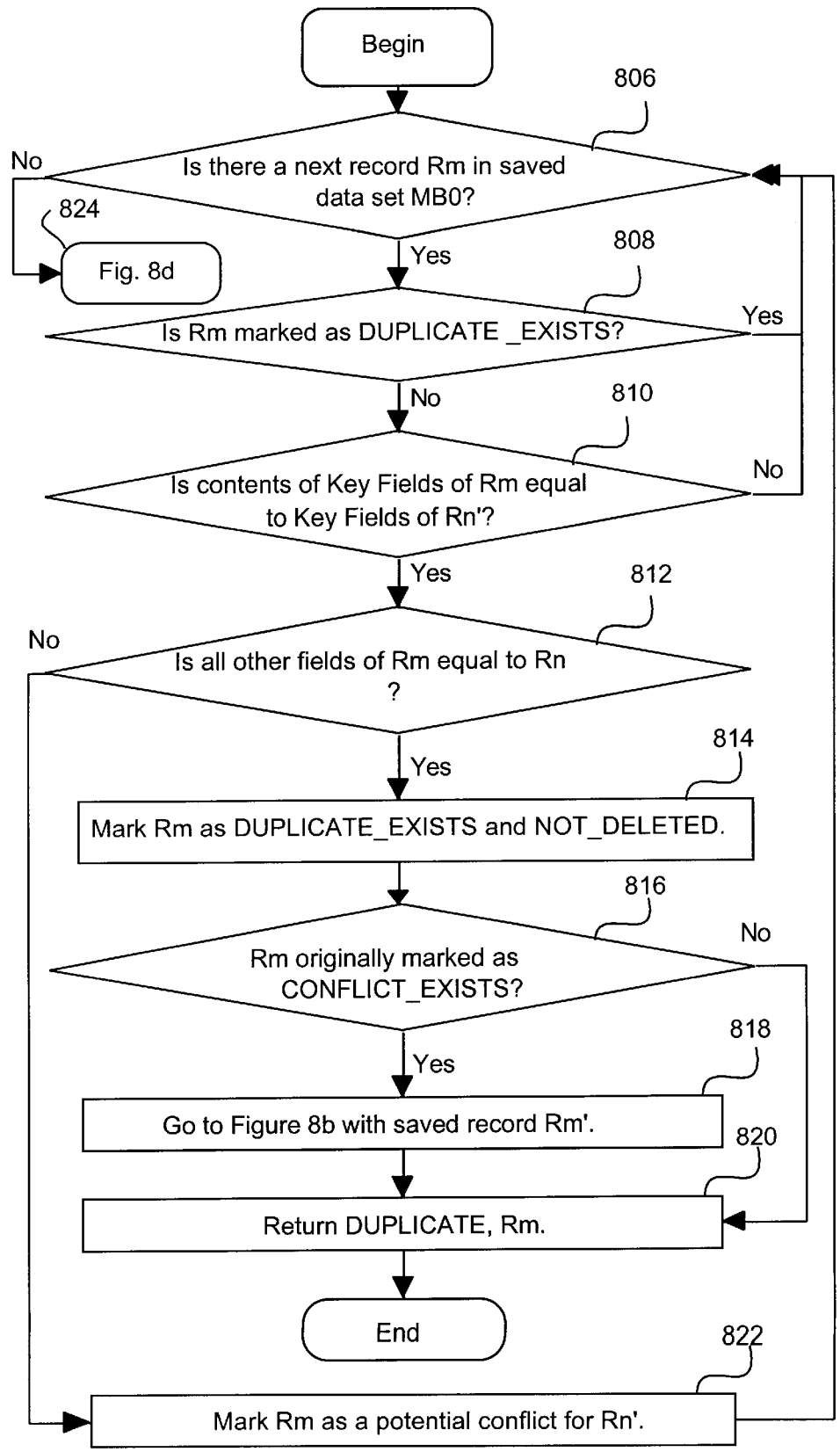
Figure 8D:
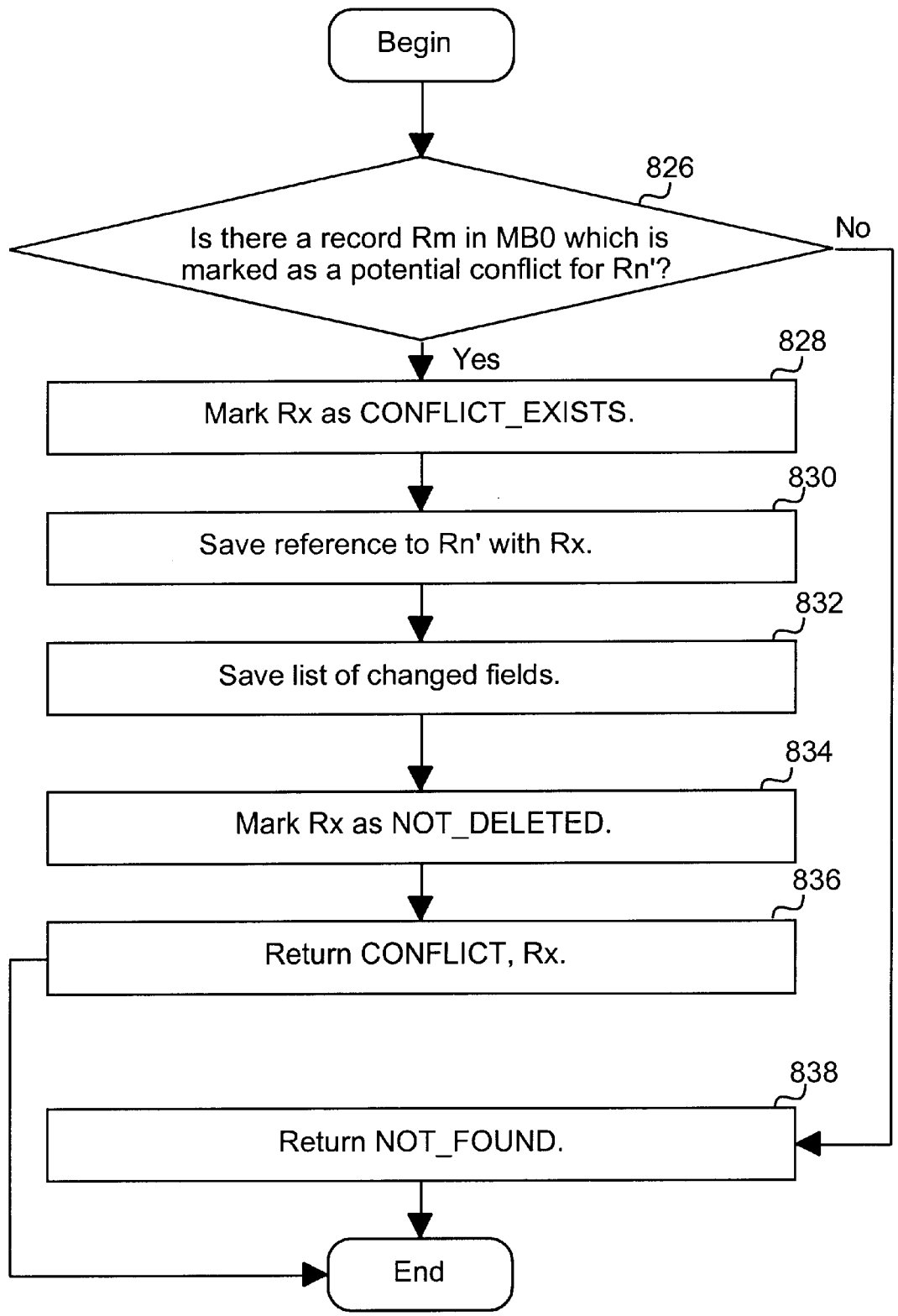
Figure 8E:
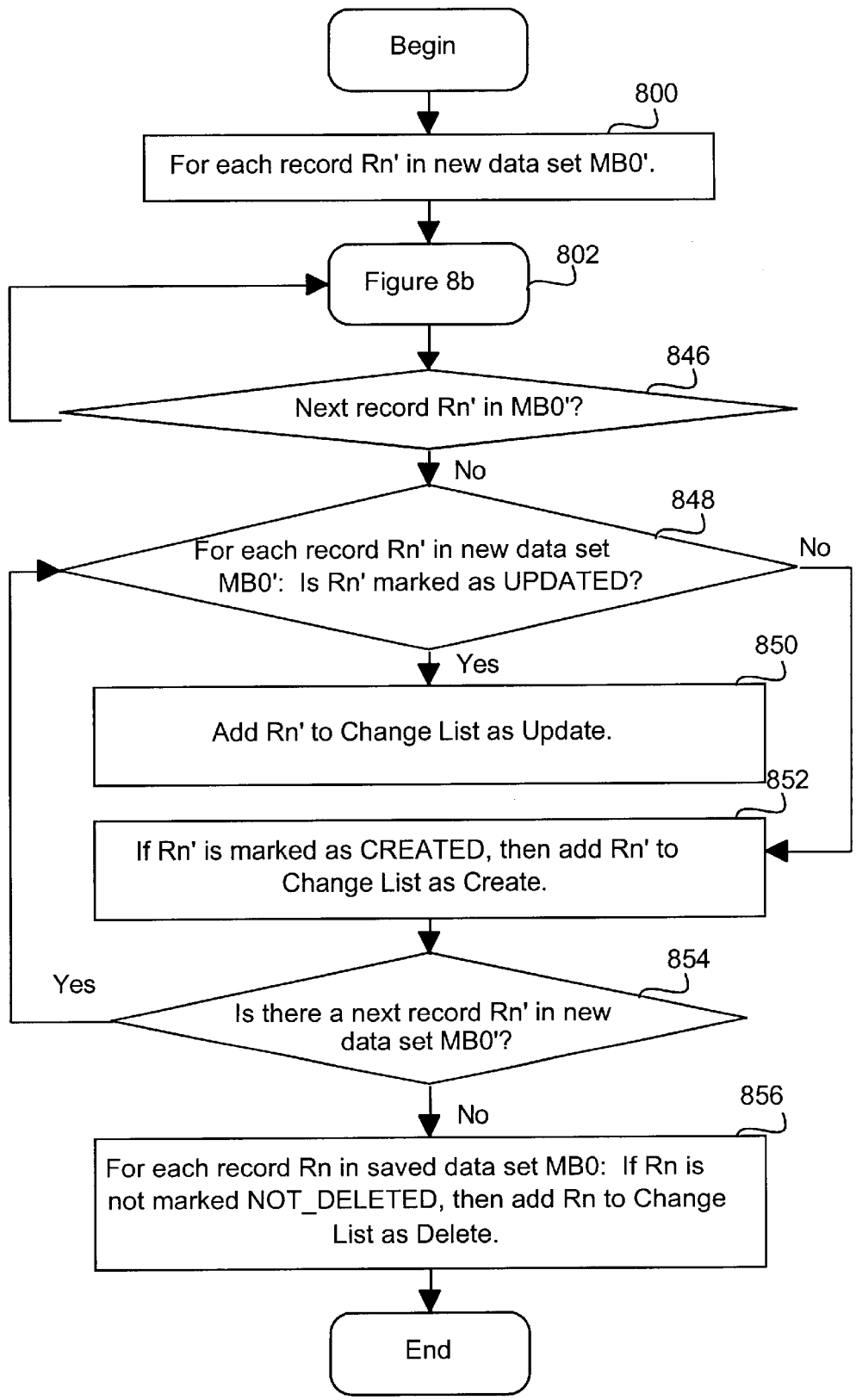

FIGS. 8c and 8d illustrate the general steps followed by Error Correction one. In FIG. 8c, in step 806, given input Rn' in MB0', for each address/message/folder Rm in saved address book or mail box MB0, it is determined in step 808, if Rm is marked as DUPLICATE_EXISTS. If Rm is marked as DUPLICATE_EXISTS, then the next address/message/folder Rm in MB0 is processed back in step 806. Otherwise, in step 810, if the contents of the Key Attributes in Rm are equal to the contents of the Key Attributes in Rn', and in step 812, if all other attributes of Rm are equal to Rn', then in step 814, Rm is marked with DUPLICATE_EXISTS and NOT_DELETED. In step 816, if Rm was originally marked CONFLICT_EXISTS, then the steps in the flow diagram of FIG. 8b are followed with the saved address/message/folder Rm' as input. In step 820, DUPLICATE is returned for address/message/folder Rm.

Back in step 812, if the contents of the Key Attributes of Rm are equal to the contents of the Key Attributes of Rn' but one or more non-key attributes of Rm are not equal to Rn', then in step 822, Rm is marked as a potential conflict for Rn'. Back in step 806 the process illustrated in FIG. 8c are repeated until all address/messages/folders Rm in saved address book or mail box MB0 are processed. After all address/messages/folders Rm are processed, the general steps illustrated in FIG. 8d are performed in step 824.

In FIG. 8d, in step 826, if there is an address/message/folder Rm which is a potential conflict for Rn', then in step 828, Rm is marked as CONFLICT_EXISTS, in step 830. Rm is also marked with a reference to Rn' reflecting the address/message/folder with which Rm has a conflict. In step 832, a list of changed attributes are saved. In step 834, Rm is marked as NOT_DELETED. In step 836, CONFLICT for address/message/folder Rm is returned. Back in step 826, if there are no address/messages/folders Rm which is a potential conflict for Rn' as determined in FIG. 8c, then NOT_FOUND is returned. The Key Attributes may also have no values. This is a valid entry and multiple address/messages/folders with no values for the Key Attributes are handled the same way as described above.

Back in FIG. 8b, in step 840, if Error Correction one (described in the flow diagrams of FIGS. 8c and 8d) finds CONFLICT for message/folder Rn in MB0, then it is determined that Rn has been UPDATED to Rn'. Otherwise, in step 842, if Error Correction one returns NOT_FOUND, then it is determined that Rn' is a new address/message/folder CREATED in MB0'.

Back in FIG. 8a, after all the address/messages/folders in mail box MB0' have been processed through steps 800, 802 and 846, all address/messages/folders in MB0' have been marked as either UPDATED or CREATED, and some address/messages/folders in MB0 have been marked as NOT_DELETED. In step 848, for each address/message/folder Rn' in new address book or mail box MB0', if Rn' is marked UPDATED, then in step 850, Rn' is added to the Change List as UPDATED. Otherwise, in step 852, if Rn' is marked CREATED, then Rn' is added to the Change List as CREATED. After steps 848 through 854 are performed for all addresses/messages/folders Rn' in new address book or mail box MB0' step 856 is performed. In step 856, for each address/message/folder Rn in saved address book or mail box MB0, if Rn is not marked NOT_DELETED then Rn is added to the Change List (CL0) as DELETED. A list of changes (Change List) from address book or mail box MB0 to address book or mail box MB0' is therefore generated by Change Detection mechanism 230 and by Error Correction mechanism 234.

FIGS. 9a through 9e are flow charts describing the general steps followed by the Synchronization mechanism referred to in FIG. 2d. Addresses/Messages/Folders Rn and Rm are exemplary addresses/messages/folders in address book or mail box MB0 and addresses/messages/folders Rx and Ry are exemplary addresses/messages/folders in mail box MB1.

Error Correction mechanisms one and two generate a list of changes when comparing a changed mail box MB0' to a saved address book or mail box MB0. When synchronizing address books or mail boxes MB0' and MB1', Error Correction two, first processes address books or mail boxes MB0' and MB0, producing Change List 0 (CL0), and then processes address books or mail boxes MB1' and MB1, producing Change List 1 (CL1). Address books or mail boxes MB0 and MB1 may or may not be data from the same application or have the same format. However, address books or mail boxes MB0 and MB1 are equivalent (i.e. synchronized) since they are saved at the end of the last synchronization and there may be only one address book or mail box saved.

Given accurate Change Lists CL0 and CL1 as produced by the present invention, techniques to modify MB0' and MB1' so that they become equivalent would be readily understood by those skilled in the art. FIGS. 9a through 9e and FIGS. 10a and 10b illustrate an exemplary method.

Figure 9A:
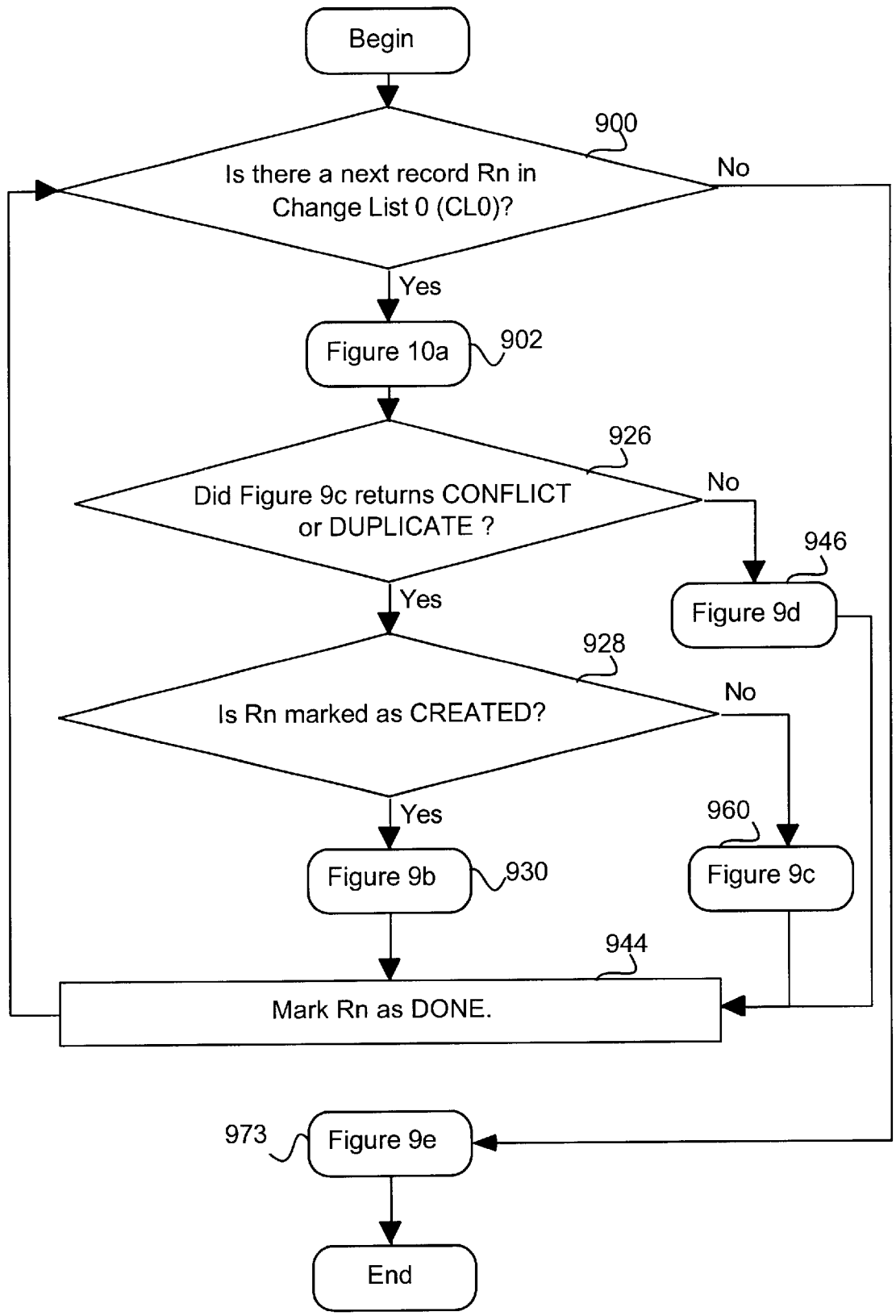
FIGS. 9a–9e, and 10a and 10b are flow charts describing the general steps followed by a Synchronization mechanism.
Figure 9B:
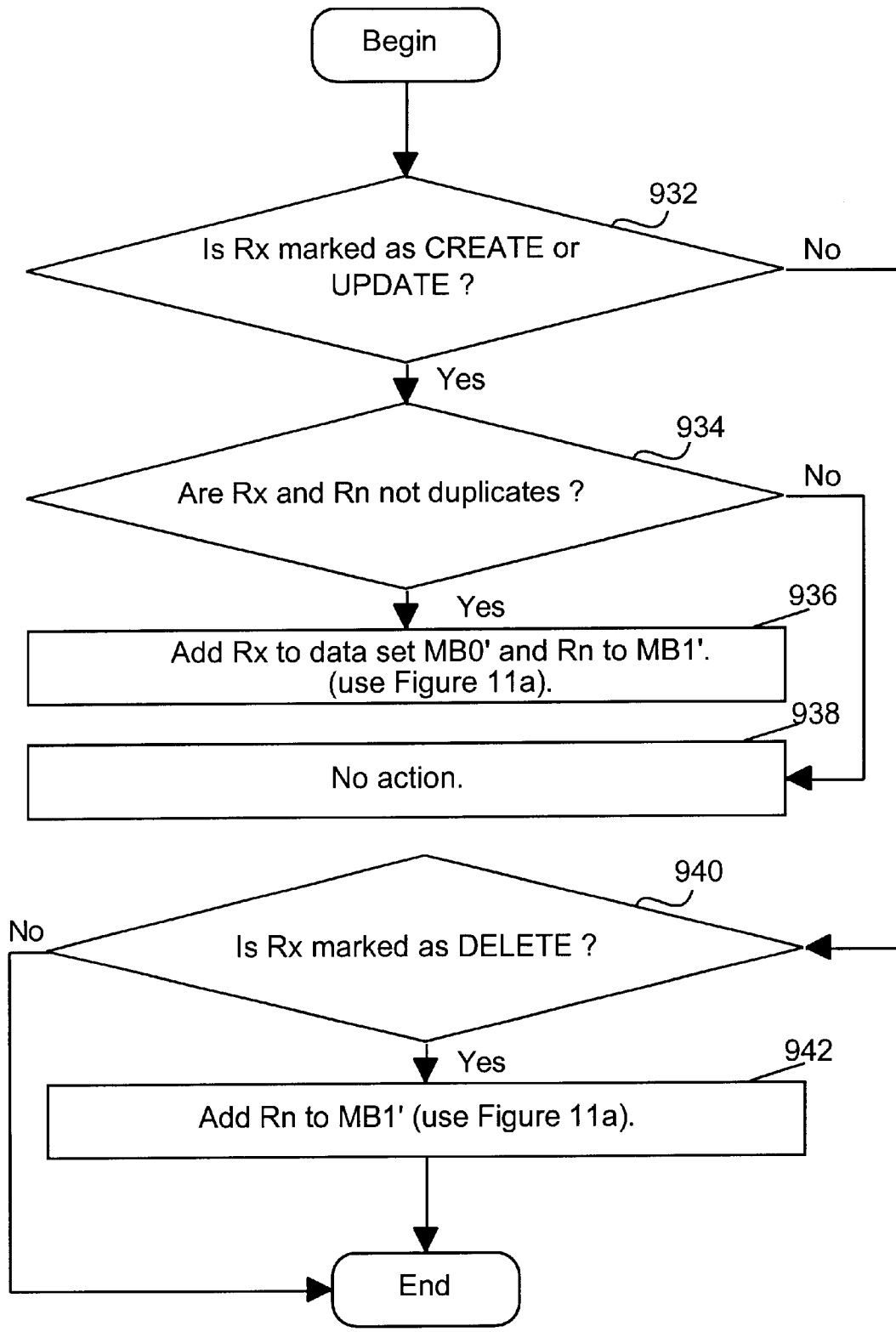
Figure 10A:
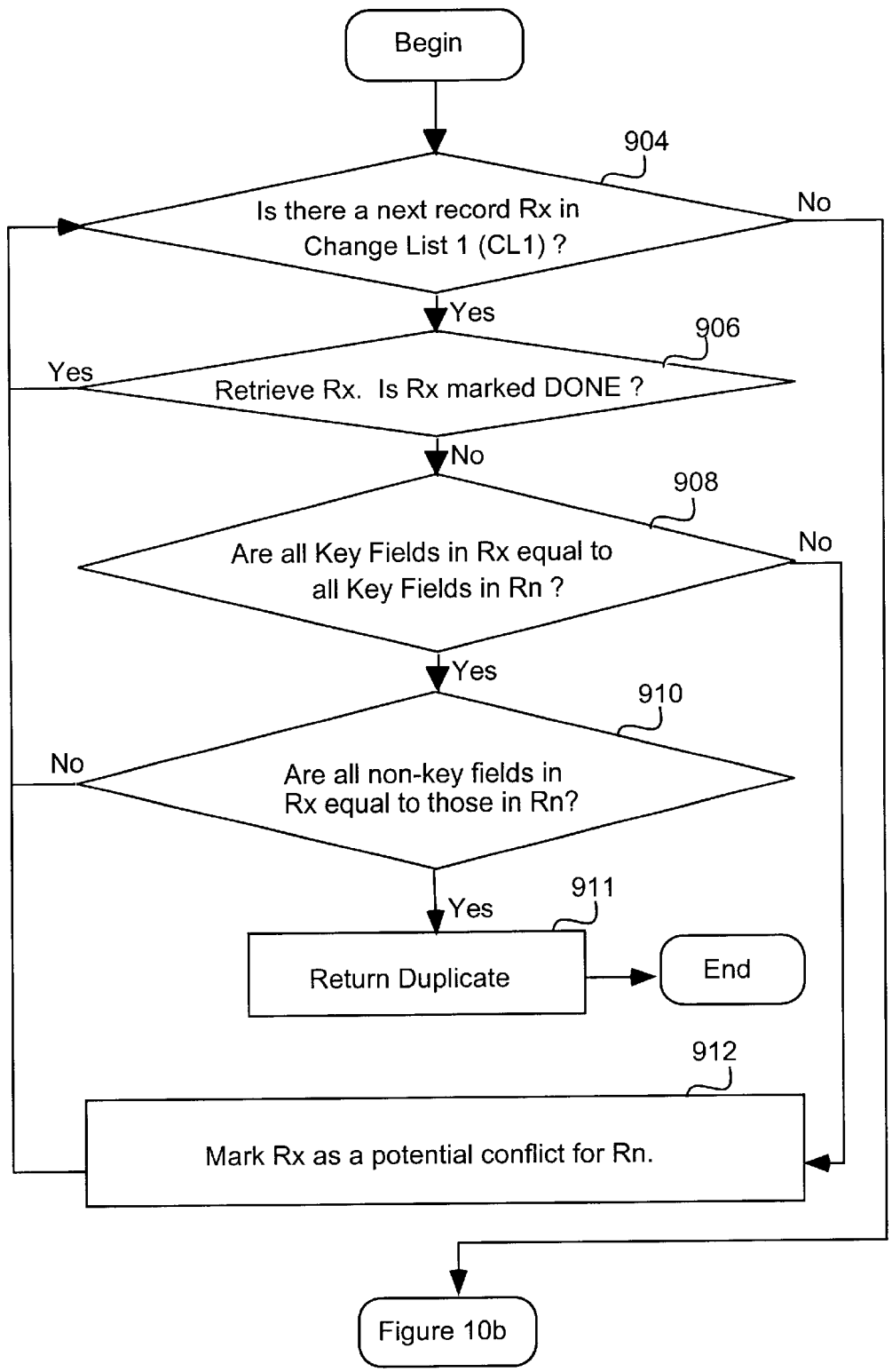
Figure 10B:
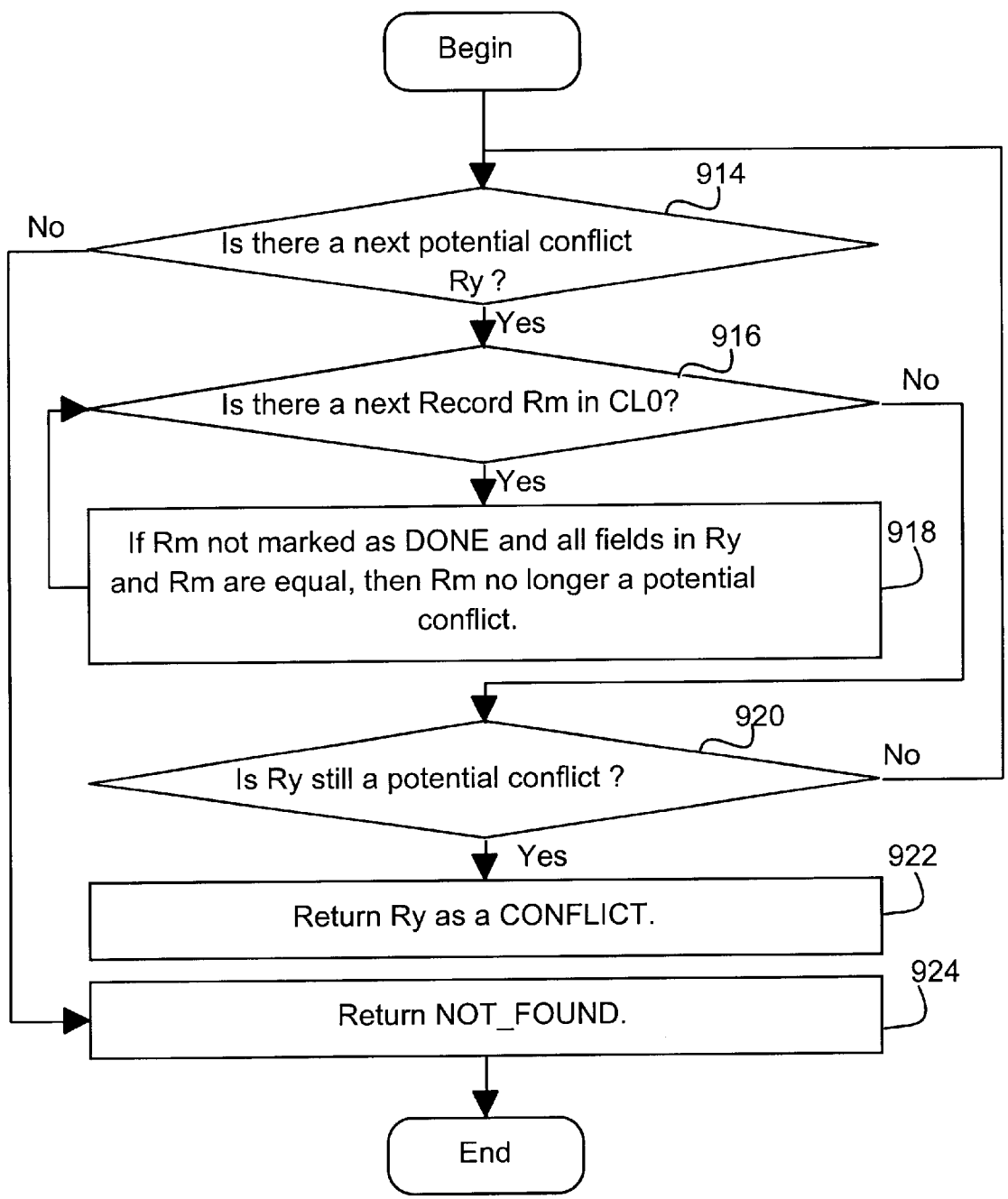

In FIG. 9a in step 902, the general steps illustrated in FIG. 10a and 10b are first performed for address/message/folder Rn given Change List CL1.

In FIG. 10a, for each address/message/folder Rx in CL1 in step 904, if Rx is not marked DONE in step 906, then in step 908, it is determined if all Key Attributes in Rx are equal to all Key Attributes in Rn. If all Key Attributes in Rx are equal to all Key Attributes in Rn, and in step 910, if all non-key attributes in Rx are equal to those in Rn, then a flag indicating that a duplicate exists (DUPLICATE) is returned for Rx in step 911. Otherwise, if one or more key attributes in Rx are not equal to those in Rn, then the process returns to step 904 to retrieve the next address/message/folder Rx in CL1. Back in step 908, if one or more non-key Attributes are not equal to those in Rn, then in step 912, Rx is marked as a potential conflict for Rn. This process is repeated from step 904 to step 912 until all addresses/messages/folders Rx in CL1 are processed.

When all addresses/messages/folders Rx are processed, the general steps illustrated in FIG. 10b are performed. In steps 914 and 916, for each potential conflict Ry, each addresses/message/folder Rm in CL0 is processed. In step 918, if Rm is not marked DONE and if all attributes in Ry and Rm are equal, then Rm is no longer marked as a potential conflict. Back in step 916, if there are no more addresses/messages/folders Rm in CL0, then in step 920, if Ry is still a potential conflict, then in step 922 CONFLICT for Ry is returned. If all potential conflicts Ry are processed or if there are no potential conflicts Ry, then in step 924, NOT_FOUND is returned to indicate that there are no conflicts.

If operations illustrated in FIGS. 10a and 10b return a result of CONFLICT or DUPLICATE, and in step 928, if Rn is marked as CREATE, then it is determined in step 932 (of FIG. 9b) whether Rx is marked as either CREATE or as UPDATE. If Rx is marked as either CREATE or UPDATE, and in step 934 if Rx and Rn are not duplicates, then in step 936, Rx is added to MB0' (using the steps illustrated in FIG. 11a) and Rn is added to MB1' (using the steps illustrated in FIG. 11a). Back in step 934, if Rx and Rn are duplicates, then in step 938 no action is taken. Back in step 932, if Rx is not marked as CREATE or UPDATE, and in step 940 if Rx is instead marked as DELETE, then in step 942, Rn is added to MB1' (using the steps illustrated in FIG. 11a). In step 944, Rn is marked as DONE, and the next address/message/folder Rn in CL0 is processed.

Figure 9C:
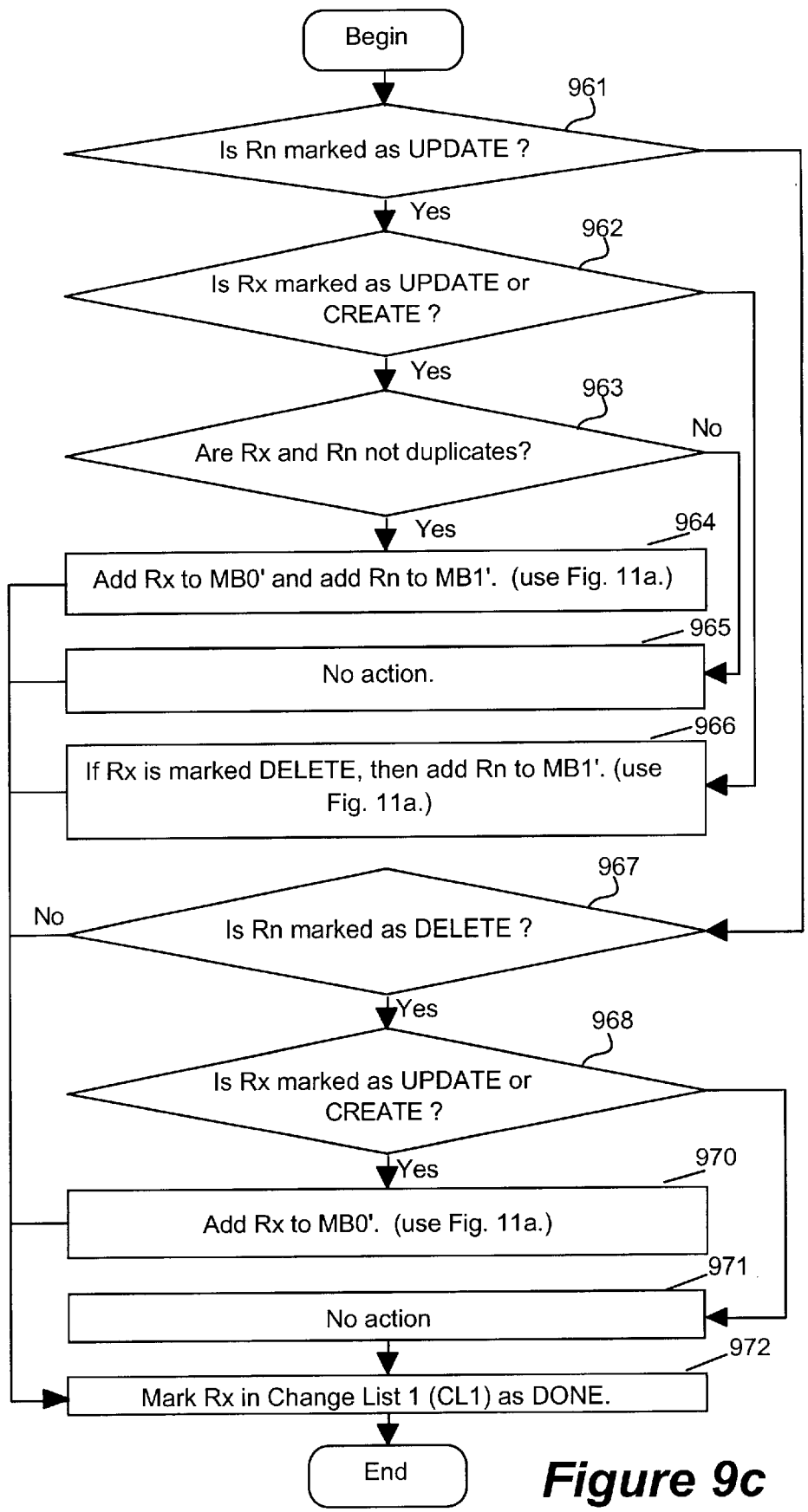
Figure 9D:
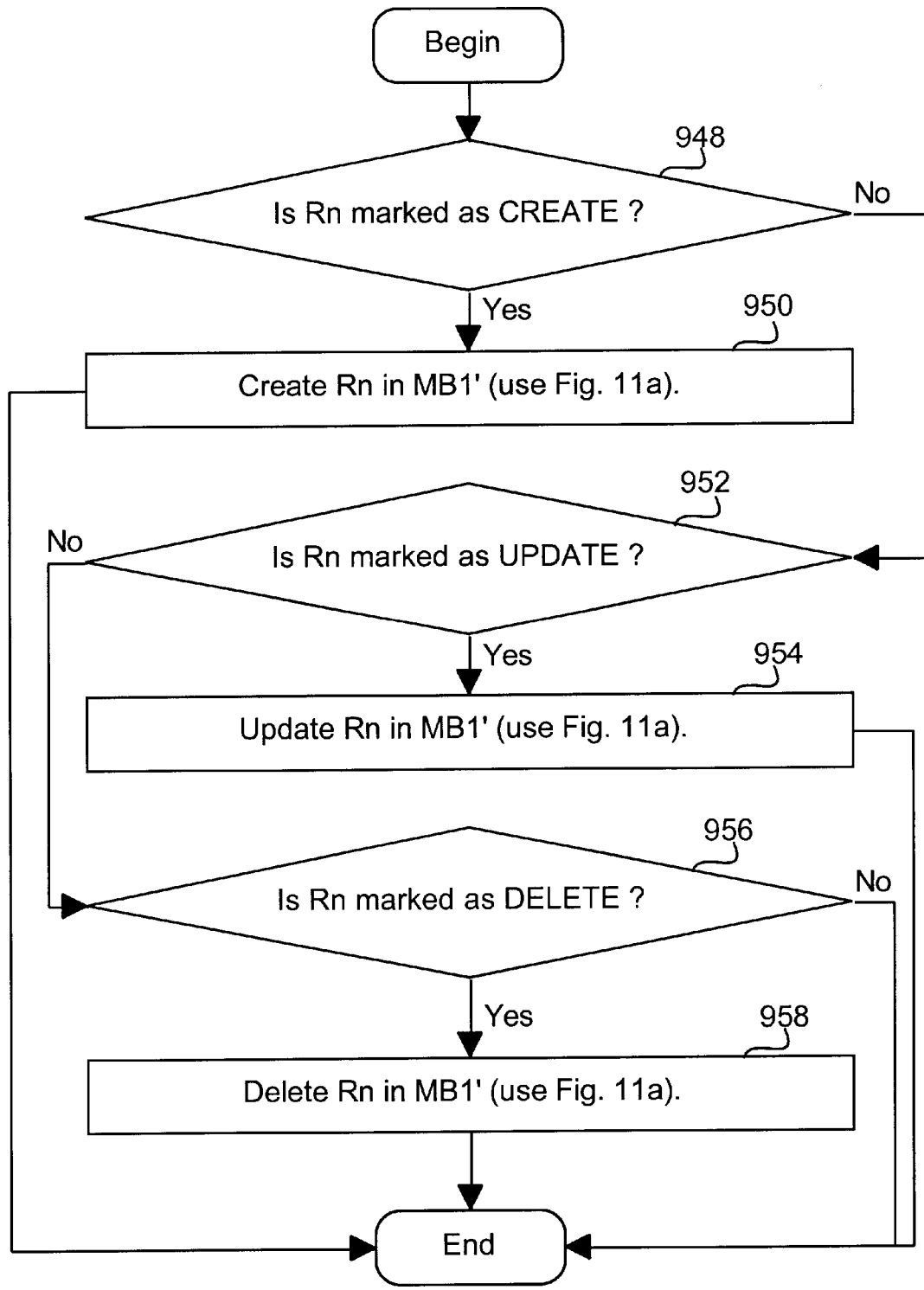

Back in step 926, if the result from the operations illustrated in FIGS. 10a and 10b is neither CONFLICT or DUPLICATE, then the general steps illustrated in FIG. 9d are performed. In step 948, if Rn is marked CREATE, then in step 950, Rn is created in MB1' (using the steps illustrated in FIG. 11a). Otherwise, in step 952, if Rn is marked UPDATE, then in step 954 Rn is updated in MB1' (using the steps illustrated in FIG. 11a). If Rn is not marked UPDATE or CREATE, and in step 956 if Rn is marked DELETE, then in step 958 Rn is deleted in MB1' (using the steps illustrated in FIG. 11a). In step 944, Rn is marked as DONE and the next address/message/folder Rn in CL0 is processed. Back in step 928, if Rn is not marked as CREATE, then the general steps illustrated in FIG. 9c are followed.

In FIG. 9c, in step 961, if Rn is marked UPDATE, then in step 962, it is determined if Rx is marked UPDATE or CREATE. If Rx is marked UPDATE or CREATE, then in step 963 if Rx and Rn are not duplicates, then in step 964 Rx is added to MB0' (using the steps illustrated in FIG. 11a) and Rn is added to MB1' (using the steps illustrated in FIG. 11a). In step 972, Rx in CL1 is marked as DONE.

Back in step 963, if Rx and Rn are duplicates, then in step 965, no action is taken. In step 972, Rx in CL1 is marked as DONE. Back in step 962, if Rx is neither marked as UPDATE nor as CREATE, and in step 966, if Rx is marked DELETE, then Rn is added to MB1' (using the steps illustrated in FIG. 11a). In step 972, Rx in CL1 is marked as DONE.

Back in step 961, if Rn is not marked as UPDATE, then in step 967, it is determined if Rn is marked as DELETE. If Rn is not marked as DELETE, then in step 972, Rx in CL1 is marked as DONE. If Rn is marked as DELETE, and in step 968, if Rx is marked UPDATE or CREATE then in step 970, Rx is added to MB0'. If Rx is not marked as UPDATE or CREATE, then in step 971, no action is taken. In step 972, Rx in CL1 is marked as DONE. When the process in FIG. 9c is completed, Rn in CL0 is marked as DONE back in step 944 of FIG. 9a. Back in step 900 of FIG. 9a, if there are no more addresses/messages/folders Rn in CL0, then the general steps illustrated in FIG. 9e are followed.

Figure 9E:
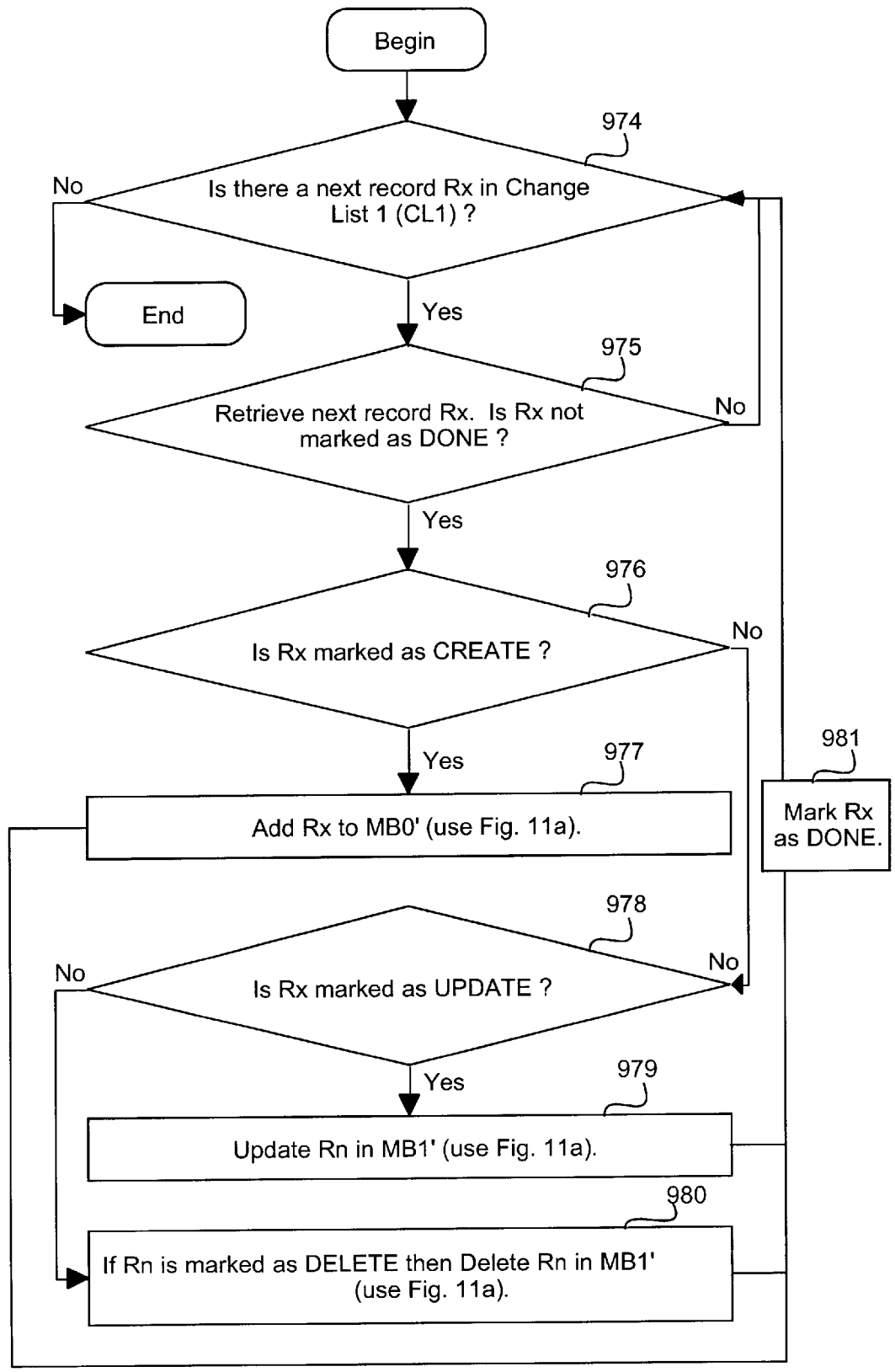

In FIG. 9e, for each address/message/folder Rx in CL1, if Rx is not marked as DONE in step 975, then in step 976 it is determined if Rx is marked as CREATE. If Rx is marked as CREATE, then in step 977, Rx is added to MB0' (using the steps illustrated in FIG. 11a). In step 981, Rx is marked as DONE. Back in step 976, if Rx is not marked as CREATE, then in step 978 it is determined if Rx is marked as UPDATE. If Rx is marked as UPDATE, then in step 979 Rx is updated in MB0' (using the steps illustrated in FIG. 11a). In step 981, Rx is marked as DONE. Back in step 978, if Rx is not marked as UPDATE, and if Rx is marked as DELETE in step 980, then Rx is deleted in MB0' (using the steps illustrated in FIG. 11a). In step 981, Rx is marked as DONE. The steps from step 974 to step 980 are repeated until all addresses/messages/folders Rx in CL1 are processed. At this point, the addresses/messages/folders in MB0' and MB1' are equivalent, i.e. synchronized.

With the availability of a complete history of the changed data as produced above, it is possible to make automatic decisions for conflict resolution. In addition, there is little danger of incorrectly overwriting or deleting data. This allows synchronization to run unobtrusively in the background without having to ask a user to confirm before overwriting or deleting data.

Figure 11A:
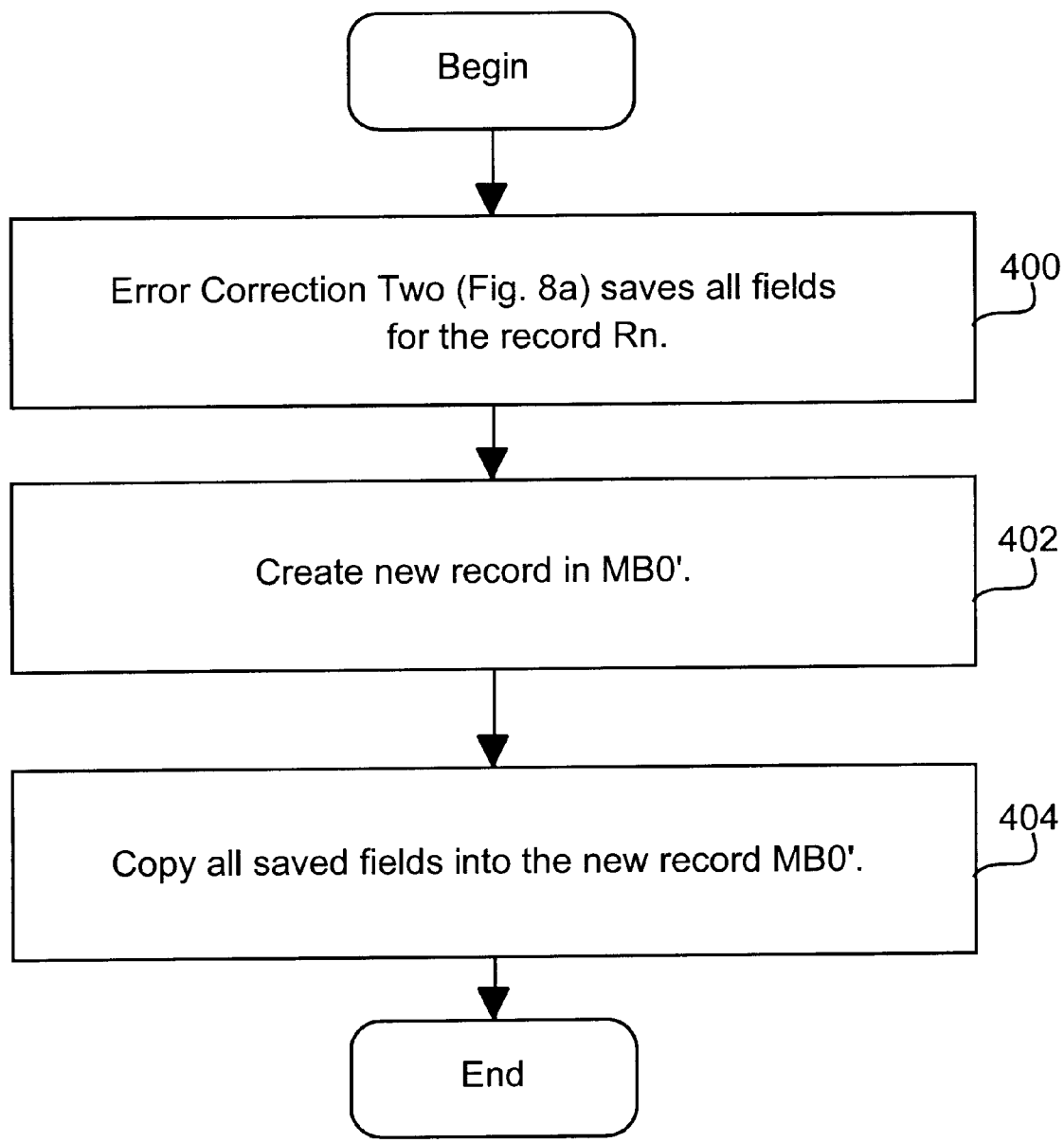
FIGS. 11a–11c are flow charts describing the general steps followed by a Change Existing Data mechanism.
Figure 11B:
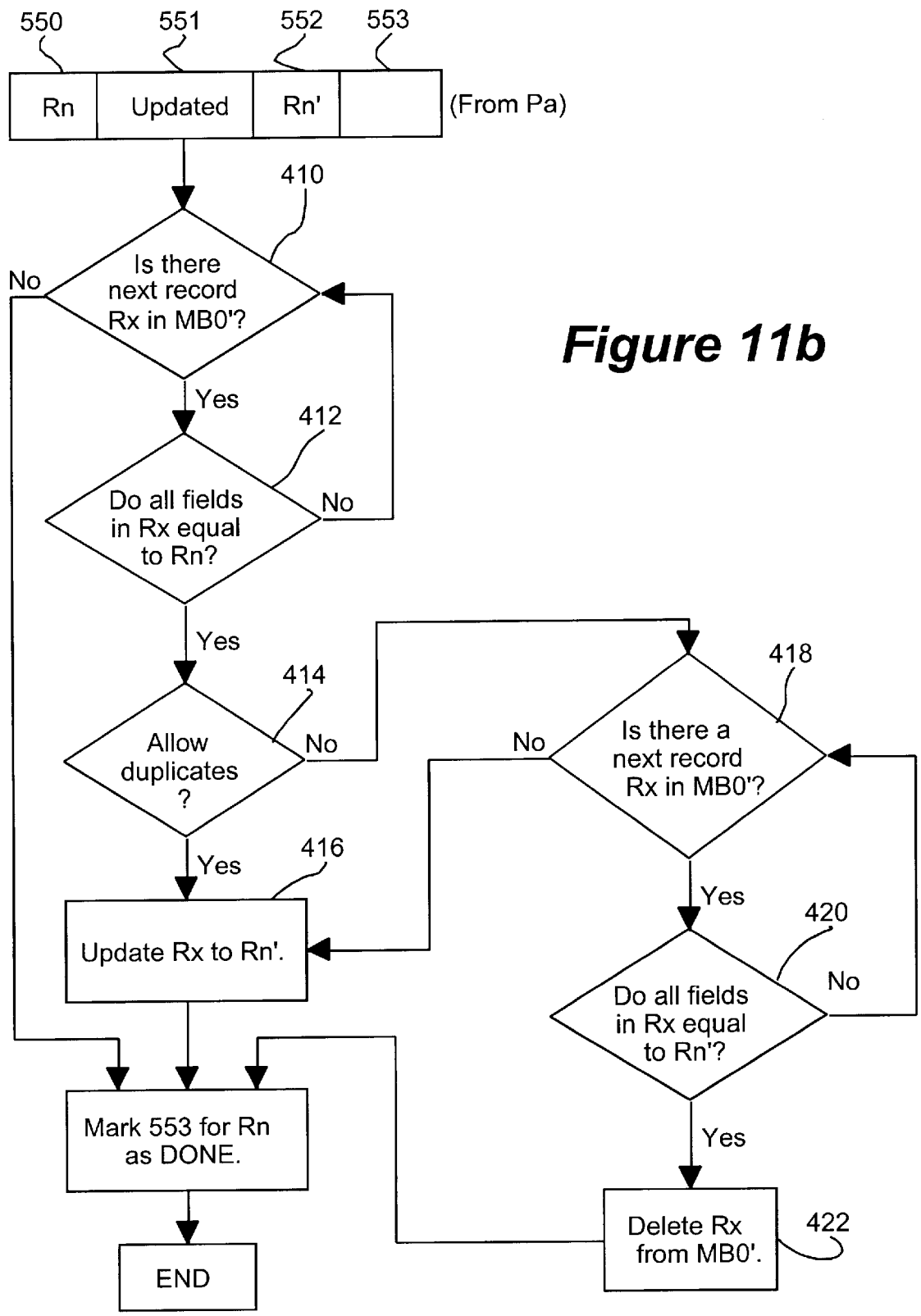
Figure 11C:
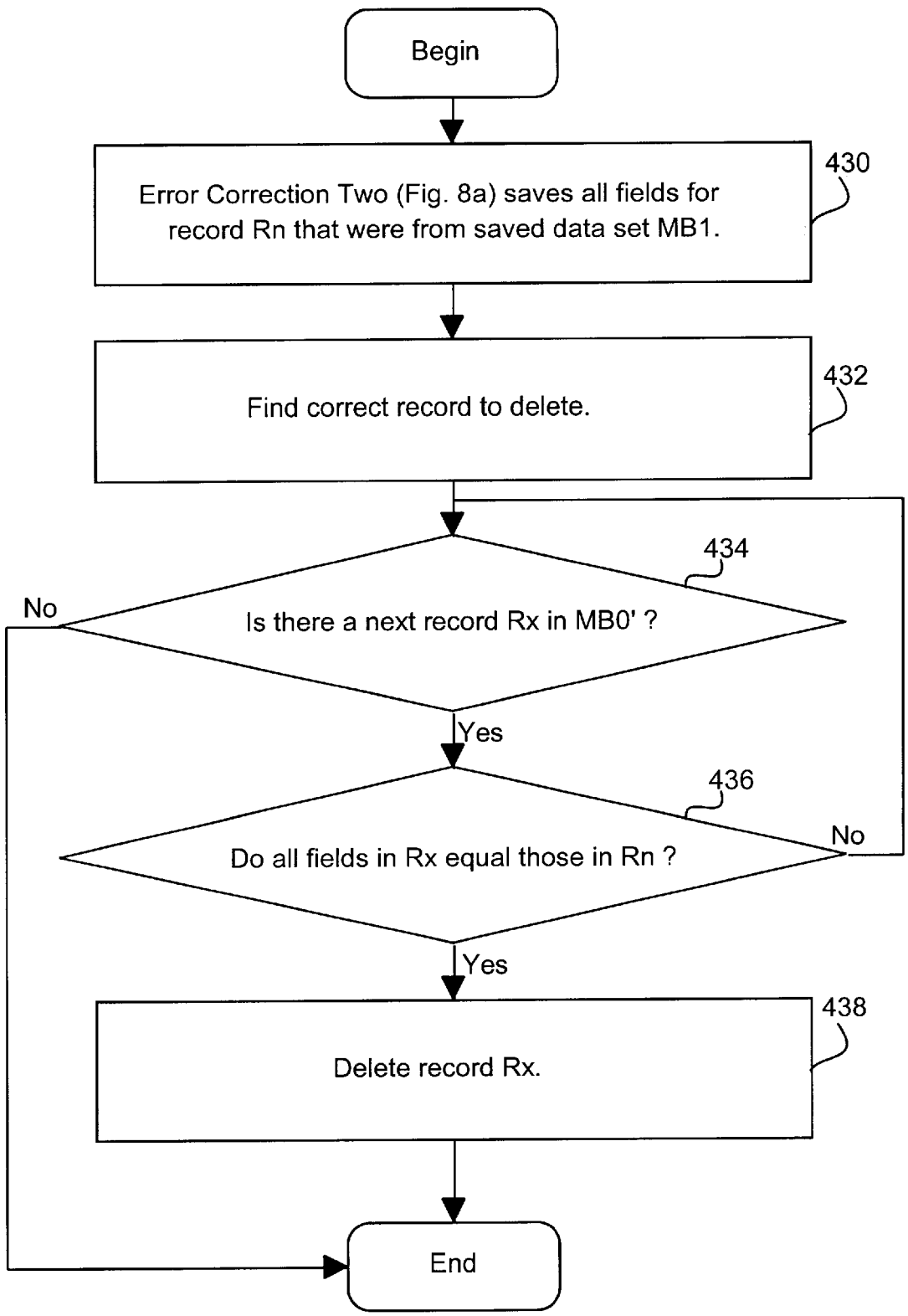

FIGS. 11a through 11c are flow diagrams describing the general steps followed by the Change Existing Data mechanism referred to in FIG. 2d. Although the details for importing and exporting data is application specific and well understood, making the required changes to the address book or mail boxes without unique address/message/folder identifiers is non-trivial. Such case is resolved by Change Existing Data mechanism 238.

Change Existing Data mechanism 238 can change an existing address book or mail box such as MB0' in three ways: Create a record, Update a record, and Delete a record. A method for each is described in detail in FIG. 11a, 11b and 11c with instructions on specific information regarding each address/message/folder which must be retained by Error Correction mechanism two.

FIG. 11a illustrates the general steps by which an address/message/folder Rn is Created in MB0'. In step 400, Error Correction mechanism two saves all attributes for address/message/folder Rn. In step 402, a new address/message/ folder is then created in MB0'. In step 404, all saved attributes are copied into the newly created address/message/folder in MB0'.

FIG. 11b illustrates the general steps by which an address/message/folder Rn is updated in MB0'. Error Correction Mechanism two saves all original attributes for address/message/folder Rn, as well as all attributes in Rn', the new values for Rn. This is described in FIGS. 8d and 8e, and the resulting Change Log entry is shown in FIG. 11b. First the correct address/message/folder to update is searched by comparing original address/message/folder Rn with all addresses/messages/folders in MB0', until an address/message/folder Rx is found for which all of Rx's attributes are equal to those in Rn in steps 410, 412 and 414. Then the attributes of Rx are updated with the attributes in Rn' in step 416. If duplicate addresses/messages/folders (where all attributes are the same) are not allowed or desired in MB0', an extra step is needed before updating Rx. In addition to searching for Rx above, all addresses/messages/folders in MB0' are also searched in steps 418 and 420 to find a duplicate for Rn'. If a duplicate exists, then there is no need to update Rx to Rn', since this will result in two addresses/messages/folders with exactly the same attributes. The correct action here is to delete Rx from MB0' in step 422. Finally, in step 424, Rn is marked DONE (in 553).

FIG. 11c illustrates the general steps by which an address/message/folder Rn is Deleted in MB0'. In step 430, Error Correction mechanism two saves all attributes for address/message/folder Rn that were from the saved address book or mail box MB1. In step 432, the correct address/message/folder to delete is searched. In step 434, for each address/message/folder Rx in MB0', it is determined in step 436 if all attributes in Rx equal the attributes in Rn. If all attributes in Rx are equal to those in Rn then in step 438, address/message/folder Rx is deleted. Otherwise, the next address/message/folder Rx in MB0' is retrieved for similar processing back in step 434.

It is important to match all attributes in step 436 before deleting. If only the Key Attributes are examined, it is possible to delete the wrong address/message/folder if more than one address/message/folder has the same value in their Key Attributes. In addition, it is pertinent for Error Correction mechanism two to save the attribute values for address/message/folder Rn from the saved address book or mail box MB1. This is due to the fact that some attributes in Rn may have changed in MB1' before the entire address/message/folder is deleted. A request to Delete a address/message/folder in MB0' can only come from running Error Correction mechanism two on MB1' and MB1. In addition, the Delete operation illustrated in FIG. 11c would only be used if the equivalent address/message/folder Rx in MB0' has not been changed, and thus guarantees that the Delete operation would find the correct address/message/folder to delete.

FIG. 12 is a table 440 illustrating the Synchronization mechanism 236 of the present invention. Column 442 of table 440 indicates case numbers. Column 444 indicates the changes in address book or mail box MB0. Column 446 indicates the changes in address book or mail box MB1. Column 448 indicates the result of the changes in address book or mail box MB0. Column 450 indicates the result of the changes in address book or mail box MB1. R1+ indicates that R1 has been added (i.e. created) to the data set. R1– indicates that R1 has been deleted from the data set. R1–>R1' indicates that R1 has been changed (i.e. updated) to R1'.

Change Detection mechanism 230 produces the cases as described in column 444 for changes to address book or mail box MB0 and column 446 for changes to address book or mail box MB1. Columns 448 and 450 describe what Synchronization mechanism 236 must perform given CL0 and CL1. More specifically, column 448 describes the action resulting in the changes to address book or mail box MB0 and column 450 describes the action resulting in the changes to address book or mail box MB1. If the additional inputs to Synchronization mechanism 236 are MB0 and MB1, then all actions described in columns 448 and 450 must be performed. If the additional inputs are MB0' and MB1', then only those actions which are circled must be performed. It is assumed for the sake of illustration that all addresses/messages/folders R1, R2, R3, etc., have unique Key Attribute values.

FIG. 13 is a table 460 illustrating cases which may occur if there are addresses/messages/folders with the same Key Attribute values. These addresses/messages/folders are referred to as RR1, RR2, RR3, etc., and RR1', RR2', RR3', etc., and have the same Key Attribute values (e.g. same name in a phone book of records). Columns 462 through 470 indicate the same entries as those described for the table in FIG. 12.

What has been described is a method and an apparatus for a storage efficient mechanism such that users can address E-mail off-line on their SmartPhones, without devoting a large amount of storage space for a database or having to frequently consult a remote database for extra E-mail related information such as by looking up E-mail addresses on a network server. The method and the apparatus of the present invention involves storing a subset of a large address book containing E-mail addresses locally on a SmartPhone (herein referred to as a personal address book). The advantage of storing the E-mail addresses locally on the SmartPhone is that users can address and compose E-mail off-line. This reduces connection time and cost required to send messages. Periodically, the data in the personal address book is synchronized with data in a master address book. The present invention therefore provides an easy-to-use method for generating a default personal address book automatically and an efficient method for keeping a personal address book synchronized with a master database.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

What is claimed is:

1. An apparatus for scaling large electronic or mail databases for devices with limited storage, said apparatus comprising:
    a storage device which contains,
        a mail subsetter configured to automatically generate a personal address book containing a first set of address entries, said first set of address entries obtained from at least one data source, and
        a mail synchronizer configured to synchronize said first set of address entries with a second set of address entries, said mail synchronizer configured to produce the same synchronization results regardless of whether one or both of said first and second sets of address entries are modified prior to synchronization, said mail synchronizer coupled to said mail subsetter; and a processor for running said mail subsetter and said mail synchronizer coupled to said processor.

2. The apparatus of claim 1 wherein said mail subsetter comprises:

a device address book image containing said first set of addresses;

a creation mechanism configured to create said personal address book and said device address book image and coupled to said personal address book; and an update mechanism configured to update said personal address book from a data source using said mail synchronizer and by processing new mail and coupled to said personal address book.

3. The apparatus of claim 2 wherein said device address book image is a subset of said personal address book.

4. The apparatus of claim 2 wherein said data source is a personal information manager.

5. The apparatus of claim 2 wherein said data source is a master address book.

6. The apparatus of claim 2 wherein said data source is user input through manual entry of data.

7. The apparatus of claim 1 wherein said mail synchronizer comprises:

a pseudo unique identification generator configured to generate an identification for each said message/folder;

an event log generator configured to generate an event for an event log for each said mail/folder with said identification, said event log generator coupled to said pseudo unique identification generator; and a synchronization mechanism configured to synchronize said first set of mail and said second set of mail to be equivalent, said synchronization mechanism coupled to said event log.

8. The apparatus of claim 1 wherein said synchronization mechanism comprises a change detection mechanism configured to generate a change list for said first and second sets of mail, said change list listing the changes made at a message/folder level to said first and second sets of data.

9. The apparatus of claim 1 wherein said change detection mechanism further comprises:

a semi-unique identification mechanism configured to identify whether a message/folder in a given mail box is a duplicate of a corresponding message/folder in a modified mail box by using the contents of individual fields in a record; and an error correction mechanism configured to identify said duplicate which was not identified by said semi-unique identification mechanism.

10. The apparatus of claim 1 further comprising a change existing mail mechanism configured to identify a message/folder to update or delete without requiring said message/folder in said first and second set of mail to contain system assigned unique identifiers.

11. An apparatus for scaling large electronic mail databases for devices with limited storage, said apparatus comprising:

storage means which contains, means for automatically generating a personal address book containing a first set of address entries, said set address entries obtained from at least one data source, and means for synchronizing said first set address entries and a second set of address entries equivalent by using the information in said change list generated by said change detection mechanism, said means for synchronizing producing the same synchronization results regardless of whether one both of said first and second sets of address entries are modified prior to synchronization, said means for synchronizing coupled to said means for generating; and means for running said means for automatically generating and said means for synchronizing, said means for running coupled to said storage means.

12. The apparatus of claim 11 wherein said means for generating comprises of:

means for containing said first set of address entries;

means for creating said personal address book and said means for containing said first set of address entries and coupled to said personal address book; and means for updating said personal address book from said at least one data source using said means for synchronizing and by processing new mail and coupled to said personal address book.

13. The apparatus of claim 12 wherein said means for containing said first set of address entries is a subset of said personal address book.

14. The apparatus of claim 12 wherein said data source is a personal information manager.

15. The apparatus of claim 12 wherein said data source is a master address book.

16. The apparatus of claim 12 wherein said data source is user input through manual entry of data.

17. The apparatus of claim 11 wherein said means for making further comprises:

means for identifying whether a message/folder in a given mail box is a duplicate of a corresponding message/folder in a modified mail box by using the contents of individual fields in a record; and means for identifying said duplicate which was not identified by said semi-unique identification mechanism.

18. The apparatus of claim 11 further comprising means for correctly identifying a message/folder to update or delete without requiring said message/folder in said first and second set of address entries to contain system assigned unique identifiers.

19. A system for scaling large electronic mail databases for devices with limited storage, said system comprising:

a storage device which contains, mail subsetter configured to automatically generate a default personal address book containing a first set of address entries, said first set of address entries obtained from at least one data source, and a mail synchronizer configured to synchronize said first set of address entries with a second set of address entries; and a processor for running said mail subsetter and said mail synchronizer, said processor coupled to said storage device.

20. The system of claim 19 wherein said mail subsetter comprises of:

a device address book image containing said first set of addresses;

a creation mechanism configured to create said personal address book and said device address book image and coupled to said personal address book; and an update mechanism for updating said personal address book from a data source using said mail synchronizer and by processing new mail and coupled to said personal address book.

21. The system of claim 20 wherein said device address book image is a subset of said personal address book.

22. The system of claim 20 wherein said data source is a personal information manager.

23. The system of claim 20 wherein said data source is a master address book.

24. The system of claim 20 wherein said data source is user input through manual entry of data.

25. The system of claim 19 wherein said mail synchronizer comprises:

a pseudo unique identification generator configured to generate an identification for each said message/folder;

an event log generator configured to generate an event for an event log for each said mail/folder with said identification, said event log generator coupled to said pseudo unique identification generator; and a synchronization mechanism configured to synchronize said first set of mail and said second set of mail to be equivalent, said synchronization mechanism coupled to said event log.

26. The system of claim 19 wherein said synchronization mechanism comprises a change detection mechanism configured to generate a change list for said first and second sets of mail, said change list listing the changes made at a message/folder level to said first and second sets of data.

27. The system of claim 19 wherein said change detection mechanism further comprises:

a semi-unique identification mechanism configured to identify whether a message/folder in a given mail box is a duplicate of a corresponding message/folder in a modified mail box by using the contents of individual fields in a record; and an error correction mechanism configured to identify said duplicate which was not identified by said semi-unique identification mechanism.

28. The system of claim 19 further comprising a change existing mail mechanism configured to identify a message/folder to update or delete without requiring said message/folder in said first and second set of mail to contain system assigned unique identifiers.

29. A method for scaling large electronic mail databases for a client system with limited storage, said method comprising the steps of:

automatically generating a personal address book containing a first set of address entries, said first set of address entries obtained from at least one data source; and synchronizing said first set of address entries with a second set of address entries using a first change list generated for said first set of address entries and a second change list generated for said second set of address entries, said step of synchronizing producing the same synchronization results regardless of whether one or both of said first and second sets of address entries are modified prior to synchronization.

30. The method of claim 29 wherein said step for generating comprises of:

creating said personal address book and said first set of address entries; and updating said personal address book from said at least one data source using said step for synchronizing and by processing new mail.

31. The method of claim 30 wherein said data source is a personal information manager.

32. The method of claim 30 wherein said data source is a master address book.

33. The method of claim 30 wherein said data source is user input through manual entry of data.

34. The method of claim 30 further comprising the step of obtaining user settings for said personal address book.

35. The method of claim 34 further comprising the step of selecting data fields to be included in said device address book.

36. The method of claim 35 further comprising the step of selecting a ranking profile for ranking each address entry in said personal address book.

37. The method of claim 36 further comprising the step of sorting address entries in said personal address book by said ranking profile.

38. The method of claim 37 further comprising the step of opening a mailbox to retrieve new message.

39. The method of claim 37 wherein said new message is in a folder.

40. The method of claim 39 further comprising the step of updating ranking of an address entry for said new message in said personal address book if said address entry is found in said personal address book, said address being a new address entry if not found in said personal address book.

41. The method of claim 40 further comprising the step of obtaining information regarding said new address entry from said data source.

42. The method of claim 41 further comprising the step of adding said information and an information source identification to said personal address book, said information source identification referencing said data source.

43. The method of claim 42 further comprising the step of creating a device address book image for said client system.

44. The method of claim 43 further comprising the step of determining storage space available on said client system.

45. The method of claim 44 further comprising the step of adding address and field information to said device address book image from said personal address book, number of said address and field entries added to said device address book image depending upon said storage space available on said client system.

46. The method of claim 45 further comprising the step of creating a device address book equivalent to said device address book image, said device address book residing in said host system coupled to said client system.

47. The method of claim 46 further comprising the step of synchronizing said device address book and said device address book image with said personal address book every time said personal address book is changed.

48. A system for scaling large electronic mail databases for devices with limited storage, including code stored on a computer-readable medium and executable by a computer, comprising:

a mail subsetter code configured to automatically generate a personal address book containing a first set of address entries, said first set of address entries obtained from at least one data source, and a mail synchronizer code configured to synchronize said first set of address entries with a second set of address entries, said mail synchronizer configured to produce the same synchronization results regardless of whether one or both of said first and second set of address entries are modified prior to synchronization, said mail synchronizer code coupled to said mail subsetter code.

49. The method of claim 29 wherein said first set of address entries is a subset of said personal address book.

50. The method of claim 29 wherein said step of synchronizing further comprises the step of generating a first change list comprising a list of changes made to said first set of address entries and a second change list comprising a list of changes made to said second set of address entries.

51. The method of claim 29 wherein said step of generating further comprising the steps of:

identifying whether a message/folder in a given mail box is a duplicate of another message/folder in a modified mail set, said first set of mail and said second set of mail being said given mail box and said first set of mail and said second set of mail with changes being said modified mail set; and identifying said duplicate which was not identified is said step of identifying a record.

52. The method of claim 29 wherein said step of synchronizing further comprising the step of changing messages/folders in said first set of mail and messages/folders in said second set of mail for synchronizing messages/folders in said first set of mail and said second set of mail.

* * * * *